United States Patent
Gallagher et al.

(10) Patent No.: US 8,090,371 B2
(45) Date of Patent: *Jan. 3, 2012

(54) NETWORK CONTROLLER MESSAGING FOR RELEASE IN AN UNLICENSED WIRELESS COMMUNICATION SYSTEM

(75) Inventors: Michael D. Gallagher, San Jose, CA (US); Jahangir Mohammed, Santa Clara, CA (US); Joseph G. Baranowski, Morgan Hill, CA (US); Jianxiong Shi, Fremont, CA (US); Milan Markovic, Pleasanton, CA (US); Thomas G. Elam, Belmont, CA (US); Kenneth M. Kolderup, Los Gatos, CA (US); Madhu C. Shekhar, San Jose, CA (US); Mark Powell, San Jose, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 470 days.

This patent is subject to a terminal disclaimer.

(21) Appl. No.: 12/192,536

(22) Filed: Aug. 15, 2008

(65) Prior Publication Data
US 2008/0299977 A1    Dec. 4, 2008

Related U.S. Application Data

(60) Division of application No. 11/226,617, filed on Sep. 13, 2005, now Pat. No. 7,606,568, which is a continuation of application No. 10/688,470, filed on Oct. 17, 2003, now Pat. No. 7,127,250.

(60) Provisional application No. 60/419,785, filed on Oct. 18, 2002.

(51) Int. Cl.
*H04W 36/00* (2009.01)
*H04W 4/00* (2009.01)

(52) U.S. Cl. ............... 455/436; 455/426.1; 370/331; 370/338

(58) Field of Classification Search .............. 455/448, 455/552.1, 422.1, 426.1, 432.1, 432.2, 435.1, 455/436–446; 370/331, 338
See application file for complete search history.

(56) References Cited

U.S. PATENT DOCUMENTS

| | | | |
|---|---|---|---|
| 5,101,501 A | 3/1992 | Gilhousen et al. | |
| 5,109,528 A | 4/1992 | Uddenfeldt | |
| 5,226,045 A | 7/1993 | Chuang | |

(Continued)

FOREIGN PATENT DOCUMENTS

EP    0936777    8/1999

(Continued)

OTHER PUBLICATIONS

U.S. Appl. No. 11/107,538, filed Apr. 14, 2005, Mattson, Geoffrey, et al.

(Continued)

*Primary Examiner* — Brandon Miller
(74) *Attorney, Agent, or Firm* — Adeli & Tollen LLP

(57) ABSTRACT

An unlicensed wireless service is adapted to generate the interface protocols of a licensed wireless service to provide transparent transition of communication sessions between a licensed wireless service and an unlicensed wireless service. In one embodiment, a mobile station includes level 1, level 2, and level 3 protocols for licensed wireless service and an unlicensed wireless service. An indoor base station and indoor network controller provide protocol conversion for the unlicensed wireless service into a standard base station controller interface of the licensed wireless service.

26 Claims, 31 Drawing Sheets

U.S. PATENT DOCUMENTS

| | | | |
|---|---|---|---|
| 5,235,632 A | 8/1993 | Raith |
| 5,260,944 A | 11/1993 | Tomabechi |
| 5,260,988 A | 11/1993 | Schellinger et al. |
| 5,267,261 A | 11/1993 | Blakeney, II et al. |
| 5,327,578 A | 7/1994 | Breeden et al. |
| 5,333,175 A | 7/1994 | Ariyavisitakul et al. |
| 5,367,558 A | 11/1994 | Gillig et al. |
| 5,390,233 A | 2/1995 | Jensen et al. |
| 5,392,331 A | 2/1995 | Patsiokas et al. |
| 5,406,615 A | 4/1995 | Miller, II et al. |
| 5,428,601 A | 6/1995 | Owen |
| 5,442,680 A | 8/1995 | Schellinger et al. |
| 5,448,619 A | 9/1995 | Evans et al. |
| 5,475,677 A | 12/1995 | Arnold et al. |
| 5,488,649 A | 1/1996 | Schellinger |
| 5,507,035 A | 4/1996 | Bantz et al. |
| 5,509,052 A | 4/1996 | Chia et al. |
| 5,515,420 A | 5/1996 | Urasaka et al. |
| 5,533,027 A | 7/1996 | Akerberg et al. |
| 5,594,782 A | 1/1997 | Zicker et al. |
| 5,610,969 A | 3/1997 | McHenry et al. |
| 5,634,193 A | 5/1997 | Ghisler |
| 5,640,414 A | 6/1997 | Blakeney, II et al. |
| 5,659,598 A | 8/1997 | Byrne et al. |
| 5,659,878 A | 8/1997 | Uchida et al. |
| 5,664,005 A | 9/1997 | Emery et al. |
| 5,673,307 A | 9/1997 | Holland et al. |
| 5,675,629 A | 10/1997 | Raffel et al. |
| 5,724,658 A | 3/1998 | Hasan |
| 5,732,076 A | 3/1998 | Ketseoglou et al. |
| 5,745,852 A | 4/1998 | Khan et al. |
| 5,758,281 A | 5/1998 | Emery et al. |
| 5,796,727 A | 8/1998 | Harrison et al. |
| 5,796,729 A | 8/1998 | Greaney et al. |
| 5,812,522 A | 9/1998 | Lee et al. |
| 5,815,525 A | 9/1998 | Smith et al. |
| 5,818,820 A | 10/1998 | Anderson et al. |
| 5,822,681 A | 10/1998 | Chang et al. |
| 5,822,767 A | 10/1998 | MacWilliams et al. |
| 5,825,759 A | 10/1998 | Liu |
| 5,852,767 A | 12/1998 | Sugita |
| 5,862,345 A | 1/1999 | Okanoue et al. |
| 5,870,677 A | 2/1999 | Takahashi et al. |
| 5,887,020 A | 3/1999 | Smith et al. |
| 5,887,260 A | 3/1999 | Nakata |
| 5,890,055 A | 3/1999 | Chu et al. |
| 5,890,064 A | 3/1999 | Widergen et al. |
| 5,903,834 A | 5/1999 | Wallstedt et al. |
| 5,915,224 A | 6/1999 | Jonsson |
| 5,926,760 A | 7/1999 | Khan et al. |
| 5,936,949 A | 8/1999 | Pasternak et al. |
| 5,940,512 A | 8/1999 | Tomoike |
| 5,946,622 A | 8/1999 | Bojeryd |
| 5,949,773 A | 9/1999 | Bhalla et al. |
| 5,960,341 A | 9/1999 | LeBlanc et al. |
| 5,960,361 A | 9/1999 | Chen |
| 5,960,364 A | 9/1999 | Dent |
| 5,987,010 A | 11/1999 | Schnizlein |
| 5,995,828 A | 11/1999 | Nishida |
| 6,016,318 A | 1/2000 | Tomoike |
| 6,035,193 A | 3/2000 | Buhrmann et al. |
| 6,052,592 A | 4/2000 | Schellinger et al. |
| 6,101,176 A | 8/2000 | Honkasalo et al. |
| 6,112,080 A | 8/2000 | Anderson et al. |
| 6,112,088 A | 8/2000 | Haartsen |
| 6,119,000 A | 9/2000 | Stephenson et al. |
| 6,130,886 A | 10/2000 | Ketseoglou et al. |
| 6,134,227 A | 10/2000 | Magana |
| 6,138,019 A | 10/2000 | Trompower et al. |
| 6,167,279 A | 12/2000 | Chang et al. |
| 6,226,515 B1 | 5/2001 | Pauli et al. |
| 6,229,792 B1 | 5/2001 | Anderson et al. |
| 6,236,852 B1 | 5/2001 | Veerasamy et al. |
| 6,243,581 B1 | 6/2001 | Jawanda |
| 6,256,511 B1 | 7/2001 | Brown et al. |
| 6,263,211 B1 | 7/2001 | Brunner et al. |
| 6,269,086 B1 | 7/2001 | Magana et al. |
| 6,320,873 B1 | 11/2001 | Nevo et al. |
| 6,327,470 B1 | 12/2001 | Ostling |
| 6,359,872 B1 | 3/2002 | Mahany et al. |
| 6,374,102 B1 | 4/2002 | Brachman et al. |
| 6,381,457 B1 | 4/2002 | Carlsson et al. |
| 6,389,059 B1 | 5/2002 | Smith et al. |
| 6,393,007 B1 | 5/2002 | Haartsen |
| 6,415,158 B1 | 7/2002 | King et al. |
| 6,426,819 B1 | 7/2002 | Crimmins et al. |
| 6,430,395 B2 | 8/2002 | Arazi et al. |
| 6,445,921 B1 | 9/2002 | Bell |
| 6,463,307 B1 | 10/2002 | Larsson et al. |
| 6,498,934 B1 | 12/2002 | Muller |
| 6,539,237 B1 | 3/2003 | Sayers et al. |
| 6,542,516 B1 | 4/2003 | Vialen et al. |
| 6,553,219 B1 | 4/2003 | Vilander et al. |
| 6,556,822 B1 | 4/2003 | Matsumoto |
| 6,556,825 B1 | 4/2003 | Mansfield |
| 6,556,830 B1 | 4/2003 | Lenzo |
| 6,574,266 B1 | 6/2003 | Haartsen |
| 6,587,444 B1 | 7/2003 | Lenzo |
| 6,600,925 B1 | 7/2003 | Rams |
| 6,633,614 B1 | 10/2003 | Barton et al. |
| 6,633,761 B1 | 10/2003 | Singhal |
| 6,643,512 B1 | 11/2003 | Ramaswamy |
| 6,647,426 B2 | 11/2003 | Mohammed |
| 6,658,250 B1 | 12/2003 | Ganesan et al. |
| 6,665,276 B1 | 12/2003 | Culbertson et al. |
| 6,675,009 B1 | 1/2004 | Cook |
| 6,680,923 B1 | 1/2004 | Leon |
| 6,711,400 B1 | 3/2004 | Aura |
| 6,766,160 B1 | 7/2004 | Lemilainen et al. |
| 6,788,656 B1 | 9/2004 | Smolentzov et al. |
| 6,801,519 B1 | 10/2004 | Mangal |
| 6,801,772 B1 | 10/2004 | Townend et al. |
| 6,801,777 B2 | 10/2004 | Rusch |
| 6,807,417 B2 | 10/2004 | Sallinen et al. |
| 6,823,154 B2 | 11/2004 | Koga et al. |
| 6,824,048 B1 | 11/2004 | Itabashi et al. |
| 6,826,154 B2 | 11/2004 | Subbiah et al. |
| 6,829,227 B1 | 12/2004 | Pitt |
| 6,842,462 B1 | 1/2005 | Ramjee et al. |
| 6,842,621 B2 | 1/2005 | Labun et al. |
| 6,845,095 B2 | 1/2005 | Krishnarajah et al. |
| 6,850,503 B2 | 2/2005 | Dorenbosch |
| 6,853,851 B1 | 2/2005 | Rautiola et al. |
| 6,895,255 B1 | 5/2005 | Bridgelall |
| 6,909,705 B1 | 6/2005 | Lee et al. |
| 6,922,559 B2 | 7/2005 | Mohammed |
| 6,925,074 B1 | 8/2005 | Vikberg et al. |
| 6,937,862 B2 | 8/2005 | Back et al. |
| 6,957,249 B2 | 10/2005 | Salo et al. |
| 6,970,719 B1 | 11/2005 | McConnell et al. |
| 6,993,359 B1 | 1/2006 | Nelakanti et al. |
| 7,009,952 B1 | 3/2006 | Razavilar et al. |
| 7,028,186 B1 | 4/2006 | Stenman et al. |
| 7,039,025 B1 | 5/2006 | Menon et al. |
| 7,065,353 B1 | 6/2006 | Bolinth et al. |
| 7,099,339 B1 | 8/2006 | Wang et al. |
| 7,107,055 B2 | 9/2006 | Gallagher et al. |
| 7,127,250 B2 | 10/2006 | Gallagher et al. |
| 7,171,205 B2 | 1/2007 | Gallagher et al. |
| 7,197,309 B2 | 3/2007 | Gallagher et al. |
| 7,200,112 B2 * | 4/2007 | Sundar et al. ................ 370/230 |
| 7,200,383 B2 | 4/2007 | Eronen |
| 7,200,399 B2 | 4/2007 | Gallagher et al. |
| 7,209,744 B2 | 4/2007 | Gallagher et al. |
| 7,212,819 B2 | 5/2007 | Gallagher et al. |
| 7,215,961 B2 | 5/2007 | Gallagher et al. |
| 7,231,046 B1 | 6/2007 | Einola et al. |
| 7,245,916 B2 | 7/2007 | Gallagher et al. |
| 7,272,397 B2 | 9/2007 | Gallagher et al. |
| 7,283,821 B2 | 10/2007 | Gallagher et al. |
| 7,283,822 B2 | 10/2007 | Gallagher et al. |
| 7,308,263 B2 | 12/2007 | Gallagher et al. |
| 7,324,818 B2 | 1/2008 | Gallagher et al. |
| 7,349,698 B2 | 3/2008 | Gallagher et al. |
| 7,369,854 B2 * | 5/2008 | Gallagher et al. ............ 455/436 |
| 7,369,859 B2 | 5/2008 | Gallagher et al. |
| 7,420,964 B2 | 9/2008 | Narvanen et al. |

| | | |
|---|---|---|
| 7,606,568 B2 | 10/2009 | Gallagher et al. |
| 7,773,993 B2 * | 8/2010 | Gallagher et al. ............ 455/436 |
| 7,953,423 B2 | 5/2011 | Gallagher et al. |
| 2001/0029186 A1 | 10/2001 | Canyon et al. |
| 2001/0031645 A1 | 10/2001 | Jarrett |
| 2001/0046860 A1 | 11/2001 | Lee |
| 2001/0049790 A1 | 12/2001 | Faccin et al. |
| 2002/0009199 A1 | 1/2002 | Ala-Laurila et al. |
| 2002/0045459 A1 | 4/2002 | Morikawa |
| 2002/0059516 A1 | 5/2002 | Turtiainen et al. |
| 2002/0065099 A1 | 5/2002 | Bjorndahl |
| 2002/0066036 A1 | 5/2002 | Makineni et al. |
| 2002/0075844 A1 | 6/2002 | Hagen |
| 2002/0080797 A1 | 6/2002 | Kim |
| 2002/0082015 A1 | 6/2002 | Wu |
| 2002/0085516 A1 * | 7/2002 | Bridgelall ................. 370/329 |
| 2002/0086682 A1 | 7/2002 | Naghian |
| 2002/0101848 A1 | 8/2002 | Lee et al. |
| 2002/0102974 A1 | 8/2002 | Raith |
| 2002/0118674 A1 | 8/2002 | Faccin et al. |
| 2002/0123325 A1 | 9/2002 | Cooper |
| 2002/0131387 A1 * | 9/2002 | Pitcher et al. ................. 370/338 |
| 2002/0131396 A1 | 9/2002 | Knuutila et al. |
| 2002/0132630 A1 | 9/2002 | Arazi et al. |
| 2002/0142761 A1 | 10/2002 | Wallstedt et al. |
| 2002/0147008 A1 | 10/2002 | Kallio |
| 2002/0147016 A1 | 10/2002 | Arazi et al. |
| 2002/0150091 A1 | 10/2002 | Lopponen et al. |
| 2002/0155829 A1 | 10/2002 | Proctor, Jr. et al. |
| 2002/0160811 A1 | 10/2002 | Jannette et al. |
| 2002/0161905 A1 | 10/2002 | Haverinen et al. |
| 2002/0166068 A1 | 11/2002 | Kilgore |
| 2002/0174335 A1 | 11/2002 | Zhang et al. |
| 2002/0191556 A1 | 12/2002 | Krishnarajah et al. |
| 2002/0191575 A1 | 12/2002 | Kalavade et al. |
| 2002/0196840 A1 | 12/2002 | Anderson et al. |
| 2002/0197984 A1 | 12/2002 | Monin et al. |
| 2003/0007475 A1 | 1/2003 | Tsuda et al. |
| 2003/0026269 A1 | 2/2003 | Paryani |
| 2003/0031151 A1 | 2/2003 | Sharma et al. |
| 2003/0043773 A1 | 3/2003 | Chang |
| 2003/0087653 A1 | 5/2003 | Leung |
| 2003/0092445 A1 | 5/2003 | Timonen et al. |
| 2003/0112789 A1 | 6/2003 | Heinonen et al. |
| 2003/0119480 A1 | 6/2003 | Mohammed |
| 2003/0119489 A1 | 6/2003 | Mohammed |
| 2003/0119490 A1 | 6/2003 | Mohammed |
| 2003/0119527 A1 | 6/2003 | Labun et al. |
| 2003/0119548 A1 | 6/2003 | Mohammed |
| 2003/0130008 A1 | 7/2003 | Rajaniemi et al. |
| 2003/0139180 A1 | 7/2003 | McIntosh et al. |
| 2003/0142673 A1 | 7/2003 | Patil et al. |
| 2003/0172264 A1 | 9/2003 | Dillon |
| 2003/0176181 A1 | 9/2003 | Boesjes |
| 2003/0176186 A1 | 9/2003 | Mohammed |
| 2003/0193952 A1 | 10/2003 | O'Neill |
| 2003/0202486 A1 | 10/2003 | Anton et al. |
| 2003/0210199 A1 | 11/2003 | Sward et al. |
| 2003/0217132 A1 | 11/2003 | Batten et al. |
| 2003/0219022 A1 | 11/2003 | Dillon et al. |
| 2003/0219024 A1 | 11/2003 | Purnadi et al. |
| 2003/0226017 A1 | 12/2003 | Palekar et al. |
| 2003/0235186 A1 | 12/2003 | Park |
| 2004/0003060 A1 | 1/2004 | Asoh et al. |
| 2004/0008649 A1 | 1/2004 | Wybenga et al. |
| 2004/0009749 A1 | 1/2004 | Arazi et al. |
| 2004/0010620 A1 | 1/2004 | Salo et al. |
| 2004/0013099 A1 | 1/2004 | O'Neill |
| 2004/0025018 A1 | 2/2004 | Haas et al. |
| 2004/0037312 A1 | 2/2004 | Spear |
| 2004/0053623 A1 | 3/2004 | Hoff et al. |
| 2004/0057408 A1 | 3/2004 | Gray |
| 2004/0063451 A1 | 4/2004 | Bonta et al. |
| 2004/0068571 A1 | 4/2004 | Ahmavaara |
| 2004/0068653 A1 | 4/2004 | Fascenda |
| 2004/0072593 A1 | 4/2004 | Robbins et al. |
| 2004/0077346 A1 | 4/2004 | Krenik et al. |
| 2004/0077354 A1 | 4/2004 | Jason et al. |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0116120 A1 | 6/2004 | Mohammed et al. |
| 2004/0147223 A1 | 7/2004 | Cho |
| 2004/0171378 A1 | 9/2004 | Rautila |
| 2004/0192211 A1 | 9/2004 | Gallagher et al. |
| 2004/0202132 A1 | 10/2004 | Heinonen et al. |
| 2004/0203346 A1 | 10/2004 | Myhre et al. |
| 2004/0203737 A1 | 10/2004 | Myhre et al. |
| 2004/0203800 A1 | 10/2004 | Myhre et al. |
| 2004/0203815 A1 | 10/2004 | Shoemake et al. |
| 2005/0064896 A1 | 3/2005 | Rautiola et al. |
| 2005/0101245 A1 | 5/2005 | Ahmavaara |
| 2005/0101329 A1 | 5/2005 | Gallagher |
| 2005/0147077 A1 | 7/2005 | Sutinen |
| 2005/0181805 A1 | 8/2005 | Gallagher et al. |
| 2005/0186948 A1 | 8/2005 | Gallagher et al. |
| 2005/0198199 A1 | 9/2005 | Dowling |
| 2005/0207395 A1 | 9/2005 | Mohammed |
| 2005/0239441 A1 | 10/2005 | Eronen |
| 2005/0239453 A1 | 10/2005 | Vikberg et al. |
| 2005/0250522 A1 | 11/2005 | Gilbert |
| 2005/0255879 A1 | 11/2005 | Shi et al. |
| 2005/0260982 A1 | 11/2005 | Ko et al. |
| 2005/0265279 A1 | 12/2005 | Markovic et al. |
| 2005/0266853 A1 | 12/2005 | Gallagher et al. |
| 2005/0271008 A1 | 12/2005 | Gallagher et al. |
| 2005/0272424 A1 | 12/2005 | Gallagher et al. |
| 2005/0272449 A1 | 12/2005 | Gallagher et al. |
| 2006/0009201 A1 | 1/2006 | Gallagher et al. |
| 2006/0009202 A1 | 1/2006 | Gallagher et al. |
| 2006/0019656 A1 | 1/2006 | Gallagher et al. |
| 2006/0019657 A1 | 1/2006 | Gallagher et al. |
| 2006/0019658 A1 | 1/2006 | Gallagher et al. |
| 2006/0019667 A1 | 1/2006 | Hicks, III |
| 2006/0025143 A1 | 2/2006 | Gallagher et al. |
| 2006/0025144 A1 | 2/2006 | Gallagher et al. |
| 2006/0025145 A1 | 2/2006 | Gallagher et al. |
| 2006/0025146 A1 | 2/2006 | Gallagher et al. |
| 2006/0025147 A1 | 2/2006 | Gallagher et al. |
| 2006/0079258 A1 | 4/2006 | Gallagher et al. |
| 2006/0079259 A1 | 4/2006 | Gallagher et al. |
| 2006/0079273 A1 | 4/2006 | Gallagher et al. |
| 2006/0079274 A1 | 4/2006 | Gallagher et al. |
| 2006/0094416 A1 | 5/2006 | Endo et al. |
| 2006/0094431 A1 | 5/2006 | Saifullah et al. |
| 2006/0098598 A1 | 5/2006 | Gallagher et al. |
| 2006/0099935 A1 | 5/2006 | Gallagher et al. |
| 2006/0111113 A1 | 5/2006 | Waris |
| 2006/0239277 A1 | 10/2006 | Gallagher et al. |
| 2007/0293222 A1 | 12/2007 | Vikberg et al. |
| 2008/0057908 A1 | 3/2008 | Gallagher et al. |
| 2008/0299976 A1 | 12/2008 | Gallagher et al. |
| 2008/0299977 A1 | 12/2008 | Gallagher et al. |
| 2008/0311916 A1 | 12/2008 | Gallagher et al. |
| 2008/0318599 A1 | 12/2008 | Gallagher et al. |
| 2009/0082012 A1 | 3/2009 | Gallagher et al. |
| 2009/0082022 A1 | 3/2009 | Gallagher et al. |

FOREIGN PATENT DOCUMENTS

| | | |
|---|---|---|
| EP | 1207708 | 5/2002 |
| EP | 1556958 | 7/2005 |
| EP | 1749372 | 2/2007 |
| EP | 10176456 | 9/2010 |
| EP | 2293640 | 3/2011 |
| EP | 2293641 | 3/2011 |
| EP | 2309809 | 4/2011 |
| GB | 2282735 | 4/1995 |
| JP | 06-133358 | 5/1994 |
| JP | 09-130405 | 5/1997 |
| KR | 2001-0053160 | 6/2001 |
| WO | WO 92/04796 | 3/1992 |
| WO | WO 95/10922 | 4/1995 |
| WO | WO 97/24004 | 7/1997 |
| WO | WO 99/48312 | 9/1999 |
| WO | WO 99/48315 | 9/1999 |
| WO | WO 99/57876 | 11/1999 |
| WO | WO 99/67967 | 12/1999 |
| WO | WO 00/28762 | 5/2000 |

| | | |
|---|---|---|
| WO | WO 00/51387 | 8/2000 |
| WO | WO 02/45456 | 6/2002 |
| WO | WO 02/062094 | 8/2002 |
| WO | WO 03/039009 | 5/2003 |
| WO | WO 03/092312 | 11/2003 |
| WO | WO 03/101025 | 12/2003 |
| WO | WO 2004/002051 | 12/2003 |
| WO | WO 2004/034219 | 4/2004 |
| WO | WO 2004/036770 | 4/2004 |
| WO | WO 2004/039111 | 5/2004 |
| WO | WO 2005/006597 | 1/2005 |
| WO | WO 2005/107169 | 11/2005 |
| WO | WO 2005/107297 | 11/2005 |
| WO | WO 2005/114918 | 12/2005 |
| WO | WO 2006/053102 | 5/2006 |

OTHER PUBLICATIONS

U.S. Appl. No. 11/110,222, filed Apr. 20, 2005, Gallagher, Michael, et al.
U.S. Appl. No. 11/068,445, filed Feb. 24, 2005, Gupta, Rajeev, et al.
U.S. Appl. No. 11/080,714, filed Mar. 14, 2005, Agrawal, Satish, et al.
Non-Final Office Action of U.S. Appl. No. 10/116,311, Feb. 9, 2006 (mailing date), Mohammed, Jahangir.
Non-Final Office Action of U.S. Appl. No. 10/115,767, Dec. 22, 2005 (mailing date), Mohammed, Jahangir.
Non-Final Office Action of U.S. Appl. No. 10/116,023, Apr. 13, 2006 (mailing date), Mohammed, Jahangir.
Non-Final Office Action of U.S. Appl. No. 10/115,835, Jul. 25, 2005 (mailing date), Mohammed, Jahangir.
Final Office Action of U.S. Appl. No. 10/116,186, Feb. 1, 2006 (mailing date), Mohammed, Jahangir.
Non-Final Office Action of U.S. Appl. No. 10/251,901, May 5, 2005 (mailing date), Gallagher, Michael, et al.
Non-Final Office Action of U.N. Appl. No. 10/688,470, Dec. 15, 2005 (mailing date), Gallagher, Michael, et al.
Notice of Allowance of U.S. Appl. No. 10/688,470, Jul. 19, 2006 (mailing date), Gallagher, Michael, et al.
Non-Final Office Action of U.S. Appl. No. 11/004,439, Apr. 21, 2006 (mailing date), Gallagher, Michael, et al.
Requirement for Restriction of U.S. Appl. No. 11/129,134, Aug. 28, 2009 (mailing date), Gallagher, Michael, et al.
Notice of Allowance of U.S. Appl. No. 11/225,870, Feb. 16, 2007 (mailing date), Gallagher, Michael, et al.
Non-Final Office Action of 11/225,870, Oct. 17, 2006 (mailing date), Gallagher, Michael, et al.
Non-Final Office Action of 11/225,870, May 30, 2006 (mailing date), Gallagher, Michael, et al.
Notice of Allowance of U.S. Appl. No. 11/225,398, Feb. 9, 2007 (mailing date), Gallagher, Michael, et al.
Non-Final Office Action of U.S. Appl. No. 11/225,398, Sep. 27, 2006 (mailing date), Gallagher, Michael, et al.
Non-Final Office Action of U.S. Appl. No. 11/225,398, Apr. 5, 2006 (mailing date), Gallagher, Michael, et al.
Notice of Allowance of U.S. Appl. No. 11/225,872, Apr. 16, 2007 (mailing date) Gallagher, Michael, et al.
Non-Final Office Action of U.S. Appl. No. 11/225,872, Sep. 20, 2006 (mailing date), Gallagher, Michael, et al.
Non-Final Office Action of U.S. Appl. No. 11/225,872, May 8, 2006 (mailing date), Gallagher, Michael, et al.
Notice of Allowance of U.S. Appl. No. 11/225,871, Jun. 27, 2007 (mailing date), Gallagher, Michael, et al.
Non-Final Office Action of U.S. Appl. No. 11/225,871, Mar. 21, 2007 (mailing date), Gallagher, Michael, et al.
Non-Final Office Action of U.S. Appl. No. 11/225,871, Dec. 4, 2006 (mailing date), Gallagher, Michael, et al.
Non-Final Office Action of U.S. Appl. No. 11/225,871, Mar. 30, 2006 (mailing date), Gallagher, Michael, et al.
Final Office Action of U.S. Appl. No. 11/225,871, Aug. 18, 2006 (mailing date), Gallagher, Michael, et al.
Notice of Allowance of U.S. Appl. No. 11/226,617, Jun. 8, 2009 (mailing date), Gallagher, Michael, et al.
Non-Final Office Action of U.S. Appl. No. 11/226,617, Nov. 12, 2008 (mailing date), Gallagher, Michael, et al.
Final Office Action of U.S. Appl. No. 11/226,617, Aug. 14, 2007 (mailing date), Gallagher, Michael, et al.
Non-Final Office Action of U.S. Appl. No. 11/226,617, Feb. 13, 2007 (mailing date), Gallagher, Michael, et al.
Non-Final Office Action of U.S. Appl. No. 11/226,617, Nov. 2, 2006 (mailing date), Gallagher, Michael, et al.
Final Office Action of U.S. Appl. No. 11/226,617, Sep. 15, 2006 (mailing date), Gallagher, Michael, et al.
Non-Final Office Action of U.S. Appl. No. 11/226,617, Apr. 6, 2006 (mailing date), Gallagher, Michael, et al.
Non-Final Office Action of U.S. Appl. No. 11/226,610, Mar. 29, 2006 (mailing date), Gallagher, Michael, et al.
Final Office Action of U.S. Appl. No. 11/226,610, Aug. 18, 2006 (mailing date), Gallagher, Michael, et al.
Non-Final Office Action of U.S. Appl. No. 11/226,610, Feb. 13, 2007 (mailing date), Gallagher, Michael, et al.
Final Office Action of U.S. Appl. No. 11/226,610, Aug. 2, 2007 (mailing date), Gallagher, Michael, et al.
Notice of Allowance of U.S. Appl. No. 11/226,610, Nov. 28, 2007 (mailing date), Gallagher, Michael, et al.
Non-Final Office Action of U.S. Appl. No. 11/229,471, Jun. 19, 2006 (mailing date), Gallagher, Michael, et al.
Notice of Allowance of U.S. Appl. No. 11/229,471, Aug. 6, 2009 (mailing date), Gallagher, Michael, et al.
Non-Final Office Action of U.S. Appl. No. 11/228,853, Jun. 5, 2006 (mailing date), Gallagher, Michael, et al.
Non-Final Office Action of U.S. Appl. No. 11/228,853, Nov. 22, 2006 (mailing date), Gallagher, Michael, et al.
Notice of Allowance of U.S. Appl. No. 11/228,853, Feb. 23, 2007 (mailing date), Gallagher, Michael, et al.
Non-Final Office Action of U.S. Appl. No. 11/229,470, Jun. 6, 2006 (mailing date), Gallagher, Michael, et al.
Final Office Action of U.S. Appl. No. 11/229,470, Dec. 14, 2007 (mailing date), Gallagher, Michael, et al.
Non-Final Office Action of U.S. Appl. No. 11/229,470, Feb. 27, 2008 (mailing date), Gallagher, Michael, et al.
Notice of Allowance of U.S. Appl. No. 11/229,470, Jul. 29, 2009 (mailing date), Gallagher, Michael, et al.
Non-Final Office Action of U.S. Appl. No. 11/227,842, Jun. 5, 2006 (mailing date), Gallagher, Michael, et al.
Non-Final Office Action of U.S. Appl. No. 11/227,573, Apr. 6, 2006 (mailing date), Gallagher, Michael, et al.
Notice of Allowance of U.S. Appl. No. 11/227,841, May 4, 2006 (mailing date), Gallagher, Michael, et al.
Non-Final Office Action of U.S. Appl. No. 11/227,840, Apr. 21, 2006 (mailing date), Gallagher, Michael, et al.
Non-Final Office Action of U.S. Appl. No. 11/227,840, Sep. 20, 2006 (mailing date), Gallagher, Michael, et al.
Non-Final Office Action of U.S. Appl. No. 11/227,784, Mar. 28, 2006 (mailing date), Gallagher, Michael, et al.
Final Office Action of U.S. Appl. No. 11/227,784, Aug. 17, 2006 (mailing date), Gallagher, Michael, et al.
Non-Final Office Action of U.S. Appl. No. 11/227,784, Oct. 24, 2006 (mailing date), Gallagher, Michael, et al.
Notice of Allowance of U.S. Appl. No. 11/227,784, Jan. 24, 2007 (mailing date), Gallagher, Michael, et al.
Non-Final Office Action for U.S. Appl. No. 12/192,532, Feb. 4, 2009 (mailing date), Gallagher, Michael, et al.
Non-Final Office Action for U.S. Appl. No. 12/193,598, Feb. 19, 2009 (mailing date), Gallagher, Michael, et al.
Non-Final Office Action for U.S. Appl. No. 12/194,442, Mar. 16, 2009 (mailing date), Gallagher, Michael, et al.
Non-Final Office Action for U.S. Appl. No. 12/328,719, Jun. 11, 2009 mailing date), Gallagher, Michael, et al.
Non-Final Office Action for U.S. Appl. No. 12/328,732, Aug. 19, 2009 (mailing date), Gallagher, Michael, et al.
EP Office Action of EP03776436.2, Feb. 25, 2009 (mailing date), Kineto Wireless, Inc.
European Search Report of EP03776436.2, Jan. 30, 2009 (mailing date), Kineto Wireless, Inc.

EP Office Action of EP03776436.2, Aug. 26, 2009 (mailing date), Kineto Wireless, Inc.
EP Office Action of EP05749844.6, Apr. 15, 2008 (mailing date), Kineto Wireless, Inc.
EP Office Action of EP05749844.6, Jan. 27, 2009 (mailing date), Kineto Wireless, Inc.
EP Office Action of EP05749844.6, Aug. 21, 2009 (mailing date), Kineto Wireless, Inc.
International Search Report and Written Opinion for PCT/US2003/032855 (WO2004/036770), Apr. 21, 2004 (mailing date), Kineto Wireless, Inc.
International Search Report and Written Opinion for PCT/US2005/040689 (WO2006/053102), Mar. 13, 2006 (mailing date), Kineto Wireless, Inc.
International Preliminary Report on Patentability and Written Opinion for PCT/US2005/040689, May 15, 2007 (Issuance date), Kineto Wireless, Inc.
Erricson Press Release: "Ericsson presents the Mobile@Hometm concept," Mar. 21, 2001, http://www.ericsson.com/press/archive/2001Q1/20010321-0048.html, printed Jan. 6, 2004, pp. 1-2.
Claus Lindholt Hansen et al., "Mobile@Home- a NEW 1 Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
Wu, Jon C., et al., "Intelligent Handoff for Mobile Wireless Internet" *Mobile Networks and Applications*, Jan. 6, 2001 Kluwer Academic Publishers, Manufactured in the Netherlands (2001) 67-79.
ETSI TS 124 008 V5.6.0 (Dec. 2002) Digital cellular telecommunications system (Phase 2+); Universal Mobile Telecommunications System (UMTS); Mobile radio interface Layer 3 specification; Core network protocols; Stage 3; (3GPP TS 24.008 version 5.6.0 Release 5); ETSI Standards, European Telecommunications Standards Institute, Sophia-Antipolis, FR, Dec. 2002, pp. 293-317.
"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
*Digital Enhanced Cordless Telecommunications (DECT); Global System for Mobile Communications (GSM); DECT/GSM Interworking Profile (IWP); Access and Mapping* (protocol/procedure description for 3,1 kHz speech service): ETSI EN 300 370 V1.3.1 European Standard (Telecommunications Series), European Telecommunications Standards Institute, Sophia Antipolis, FR, Jan. 2001, 110 pages.
*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunications Standards Institute, Sophia Antipolis, FR, Sep. 1999, 23 pages.
*Digital Enhanced Cordless Telecommunications (DECT); DECT/UMTS Interworking Profile (IWP) Part 1: General Description and Overview*: ETSI TS 101 863-1 V1.1.2, Technical Specification European Telecommunications Standards Institute, Sophia Antipolis, FR, Nov. 2001, 38 pages.
*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996, 27 pages.
Updated portions of prosecution history of U.S. Appl. No. 11/129,134. Dec. 30, 2010, Gallagher, Michael D., et al.
Updated protions of prosecution history of U.S. Appl. No. 11/226,617, Sep. 21, 2009, Gallagher, Michael D., et al.
Updated portions of prosecution history of U.S. Appl. No. 11/226,610, Mar. 26, 2008, Gallagher, Michael D., et al.
Updated portions of prosecution history of U.S. Appl. No. 12/192,532, Jul. 2, 2010, Gallagher, Michael D., et al.
Updated portions of prosecution history of EP05749844, Nov. 11, 2010 (mailing date), Kineto Wireless, Inc.
European Search Report for EP10176456, Nov. 8, 2010 (completion date), Kineto Wireless, Inc.
International Search Report and Written Opinion for PCT/US2005/016767, Nov. 7, 2005 (mailing date), Kineto Wireless, Inc.
International Preliminary Report on Patentability for PCT/US2005/016767, Nov. 14, 2006 (issuance date), Nov. 14, 2006 (issuance date), Kineto Wireless, Inc.
Fitzek, Frank, "Unlicensed Mobile Access (UMA)", MOB 9-2: Radio Communications, Sep. 1, 2006, http://kom.aau.dk/~imr/RadioCommlll/2006/lec-9_2.pdf.
Updated portions of prosecution history of U.S. Appl. No. 11/129,134, Apr. 26, 2011, Gallagher, Michael, et al.
European Search Report for EP0184667, Mar. 22, 2011 (mailing date), Kineto Wireless, Inc.
European Search Report for EP10184688, Mar. 22, 2011 (mailing date), Kineto Woreless, Inc.

* cited by examiner

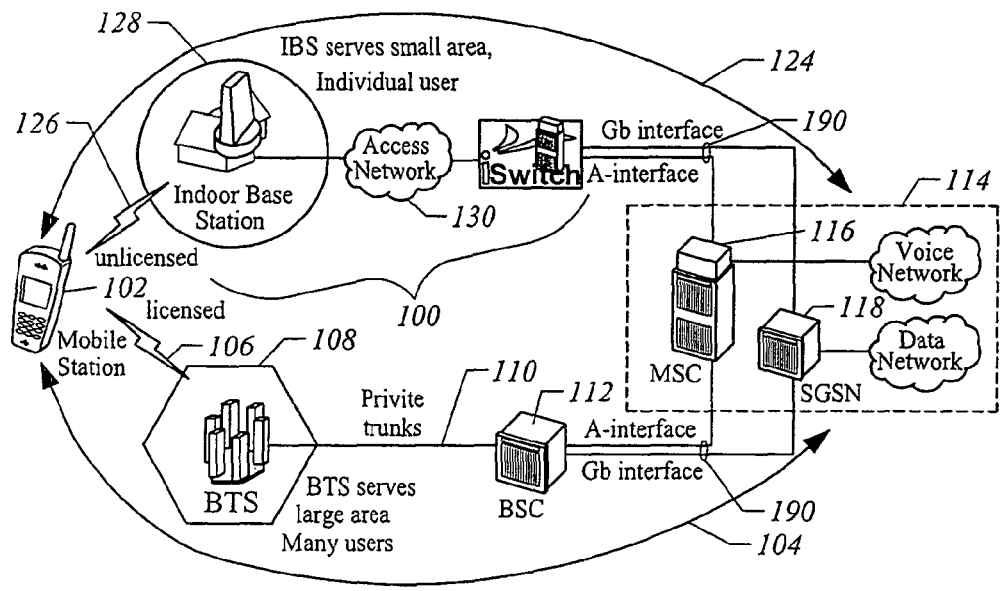
FIG. 1A
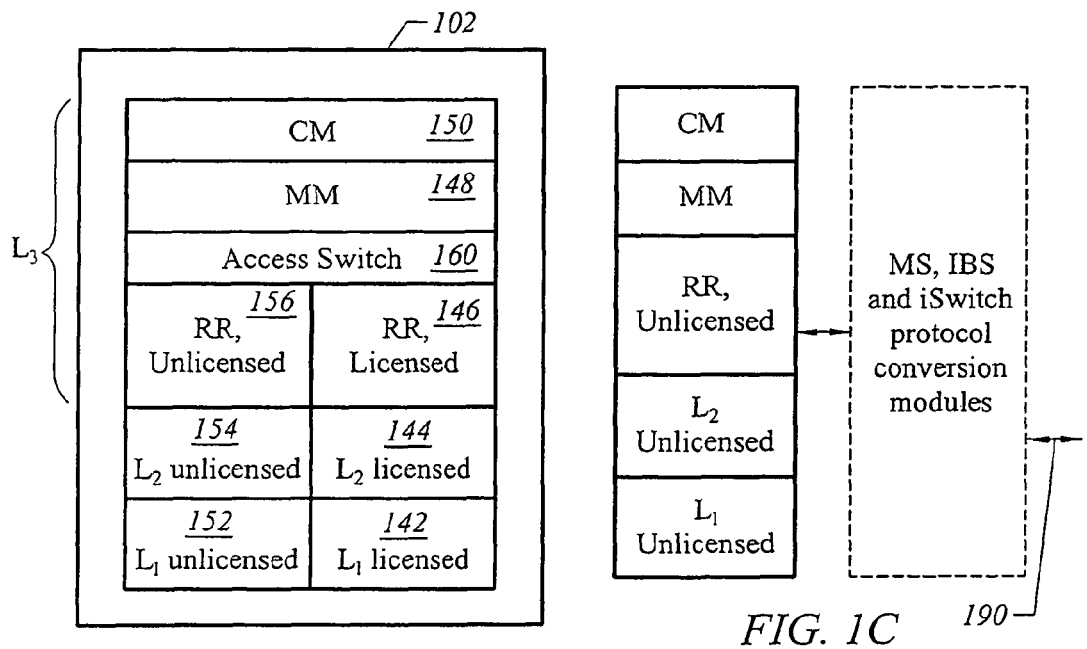
FIG. 1B
FIG. 1C

US 8,090,371 B2

NETWORK CONTROLLER MESSAGING FOR RELEASE IN AN UNLICENSED WIRELESS COMMUNICATION SYSTEM

CROSS REFERENCE TO RELATED APPLICATIONS

This Application is a Divisional Application of U.S. patent application Ser. No. 11/226,617 filed Sep. 13, 2005, which has issued as U.S. Pat. No. 7,606,568. The patent application Ser. No. 11/226,617 is a Continuation of the U.S. patent application Ser. No. 10/688,470, entitled "Apparatus and Method for Extending the Coverage Area of a Licensed Wireless Communication System Using an Unlicensed Wireless Communication System", filed Oct. 17, 2003, which has issued as U.S. Pat. No. 7,127,250. The patent application Ser. No. 10/688,470 claims the benefit of U.S. Provisional Application Ser. No. 60/419,785, entitled "Method for Extending the Coverage Area of a Licensed Wireless Communication System Using an Unlicensed Wireless Communications System," filed Oct. 18, 2002. The patent application Ser. No. 11/226,617, now issued as U.S. Pat. No. 7,606,568, the patent application Ser. No. 10/688,470, now issued as U.S. Pat. No. 7,127,250, and the Provisional Patent Application 60/419,785 are incorporated herein by reference.

This application is also related to commonly owned U.S. application Ser. No. 10/115,833, entitled "Unlicensed Wireless Communications Base Station to Facilitate Unlicensed and Licensed Wireless Communications with a Subscriber Device, and Method of Operation," filed Apr. 2, 2002; application Ser. No. 10/251,901, entitled "Apparatus for Supporting the Handover of a Telecommunication Session between a Licensed Wireless System and an Unlicensed Wireless System," filed Sep. 20, 2002; Provisional Application Ser. No. 60/447,575, entitled "Mobile Station Functionality in Support of a System for Extending the Coverage Area of a Licensed Wireless Communication System using an Unlicensed Wireless Communication," filed Feb. 14, 2003; and Provisional Application Ser. No. 60/468,336, entitled "Method for Installation of Broadband Customer Premise Equipment without User/Operator Configuration," filed May 5, 2003, the contents of each of which are hereby incorporated by reference.

FIELD OF THE INVENTION

This invention relates generally to telecommunications. More particularly, this invention relates to a technique for seamlessly integrating voice and data telecommunication services across a licensed wireless system and an unlicensed wireless system.

BACKGROUND OF THE INVENTION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station equipment is used to support communications on licensed frequencies. Base stations are typically installed approximately a mile apart from one another. As a result, the quality of service (voice quality and speed of data transfer) in wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required.

Currently, unlicensed wireless communication systems are deployed to increase the mobility of an individual using a landline. The mobility range associated with such systems is typically on the order of 100 meters or less. A common unlicensed wireless communication system includes a base station with a physical connection to a landline. The base station has a RF transceiver to facilitate communication with a wireless handset that is operative within a modest distance of the base station. Thus, this option provides higher quality services at a lower cost, but the services only extend a modest distance from the base station.

Thus, there are significant shortcomings associated with current landline systems and licensed wireless systems. For this reason, individuals commonly have one telephone number for landline communications and one telephone number for licensed wireless communications. This leads to additional expense and inconvenience for an individual. It would be highly desirable if an individual could utilize a single telephone number for both landline communications and licensed wireless communications. Ideally, such a system would allow an individual, through seamless handoffs between the two systems, to exploit the benefits of each system.

SUMMARY OF THE INVENTION

A method of integrating a licensed wireless system and an unlicensed wireless system includes initiating a wireless communication session in a first region serviced by a first wireless system and maintaining the wireless communication session in a second region serviced by a second wireless system. The first wireless system is selected from the group including a licensed wireless system and an unlicensed wireless system. The second wireless system is the unselected system from the group including the licensed wireless system and the unlicensed wireless system.

The invention also allows the subscriber to roam outside the range of the unlicensed base station without dropping communications. Instead, roaming outside the range of the unlicensed base station results in a seamless handoff (also referred to as a hand over) wherein communication services are automatically provided by the licensed wireless system.

In one embodiment of a system, a mobile station includes a first level 1, level 2, and level 3 protocols for a licensed wireless service. The mobile station also includes a second level 1, level 2, and level 3 protocols for an unlicensed wireless service. An indoor base station is operable to receive an unlicensed wireless channel from the mobile station when the mobile station is within an unlicensed wireless service area. An indoor network controller is coupled to the indoor base station and is adapted to exchange signals with a telecommunications network. The indoor network controller and indoor base station are configured to convert the second level 1, second level 2, and second level 3 protocols into a standard base station controller interface recognized by the telecommunications network. The mobile station, indoor base station, and indoor network controller are configured to establish a communication session on an unlicensed wireless channel using the base station controller interface when the mobile station is within the unlicensed wireless service area.

BRIEF DESCRIPTION OF THE FIGURES

The invention is more fully appreciated in connection with the following detailed description taken in conjunction with the accompanying drawings, in which:

FIG. 1A provides an overview of the indoor access network (IAN) mobile service solution in accordance with one embodiment of the present invention;

FIG. 1B illustrates protocol layers of a mobile set in accordance with one embodiment of the present invention;

FIG. 1C illustrates a method of protocol conversion in accordance with one embodiment of the present invention;

Like reference numerals refer to corresponding parts throughout the several views of the drawings.

DETAILED DESCRIPTION OF THE INVENTION

Figure 2:
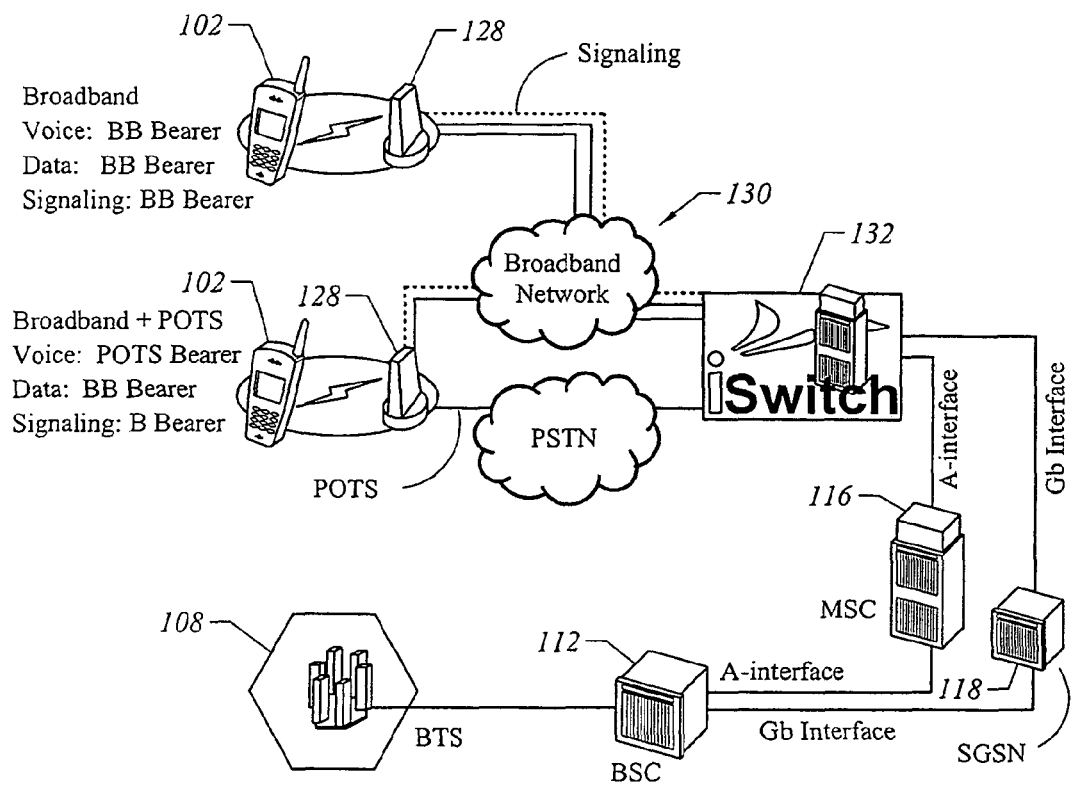
FIG. 2 illustrates two indoor access network (IAN) options in accordance with one embodiment of the present invention.

The present invention is directed towards seamlessly providing wireless services to a mobile station (MS) using both a licensed wireless system and an unlicensed wireless system. The unlicensed wireless system is a short-range wireless system, which may be described as an "indoor" solution. However, it will be understood through the application that the unlicensed wireless system includes unlicensed wireless systems that cover not only a portion of a building but also local outdoor regions, such as outdoor portions of a corporate campus serviced by an unlicensed wireless system. The mobile station may, for example, be a wireless phone, smart phone, personal digital assistant, or mobile computer. The "mobile station" may also, for example, be a fixed wireless device providing a set of terminal adapter functions for connecting Integrated Services Digital Network (ISDN) or Plain Old Telephone Service (POTS) terminals to the wireless system. Representative of this type of device is the Phonecell line of products from Telular Corporation of Chicago, Ill. Application of the present invention to this type of device enables the wireless service provider to offer so-called landline replacement service to users, even for user locations not sufficiently covered by the licensed wireless system. Throughout the following description, acronyms commonly used in the telecommunications industry for wireless services are utilized along with acronyms specific to the present invention. A table of acronyms specific to this application is included in Appendix I.

FIG. 1A illustrates an Indoor Access Network (IAN) system 100 in accordance with one embodiment of the present invention. As indicated by first arrow 104, a licensed wireless communication session is conducted with a mobile station (MB) 102 to a voice or data telecommunications network 114 (e.g., including a mobile switching center (MSC) 116 for voice data or a serving GPRS support node (SGSN) 118 for a data network). The first path 104 includes a wireless channel 106 of a licensed wireless system, a base transceiver station (BTS) 108, private trunks 110, and a base station controller (BSC) 112. The base station controller 112 communicates with telecommunications network 114 through a standard base station controller interface 190. For example, the base station controller 112 may communicate with the MSC via the GSM A-interface for circuit switched voice services and with the SGSN via the GSM Gb interface for packet data services (GPRS). Conventional licensed voice and data networks 114 include protocols to permit seamless handoffs from one recognized base station controller 112 to another base station controller 112 (not shown).

However, if the mobile station is within range of an indoor base station (IBS) 128, a wireless session is conducted using an unlicensed channel of an unlicensed wireless system. In one embodiment, the service area of indoor base station 128 is an indoor portion of a building, although it will be understood that the service region of indoor base station 128 may include an outdoor portion of a building or campus. As indicated by second arrow 124, the mobile station 102 may be connected to the telecommunications network 114 via a second data path 124 including an unlicensed wireless channel 126, an unlicensed wireless service indoor base station (IBS) 128, an access network 130, and an indoor network controller (INC) 132 (also described by the inventors of the present application as an "Iswitch") to voice/data network 114. The indoor network controller 132 also communicates with network 114 using a base station controller interface 190. As described below in more detail, indoor base station 128 and indoor network controller 132 may include software entities stored in memory and executing on one or more microprocessors (not shown in FIG. 1A) adapted to perform protocol conversion.

The unlicensed wireless channel 126 may be an unlicensed, free spectrum (e.g., spectrum around 2.4 GHz or 5 GHz). The unlicensed wireless service may have an associated communication protocol. As examples, the unlicensed wireless service may be a Bluetooth compatible wireless service, or a wireless local area network (LAN) service (e.g., the 802.11 IEEE wireless standard). This provides the user with potentially improved quality of service in the service regions of the unlicensed wireless service. Thus, when a subscriber is within range of the unlicensed base station, the subscriber may enjoy low cost, high speed, and high quality voice and data services. In addition, the subscriber enjoys extended service range since the handset can receive services deep within a building. This type of service range is not reliably provided by a licensed wireless system. However, the subscriber can roam outside the range of the unlicensed base station without dropping communications. Instead, roaming outside the range of the unlicensed base station results in a seamless handoff (also referred to as a hand over) wherein communication services are automatically provided by the licensed wireless system, as described in more detail in U.S. patent application Ser. No. 10/115,833, the contents of which are hereby incorporated by reference.

Mobile station 102 has a microprocessor and memory (not shown) that includes computer program instructions for executing wireless protocols for managing communication sessions. As illustrated in FIG. 1B, in one embodiment the mobile station 102 includes a layer 1 protocol layer 142, layer 2 protocol layer 144, and a layer 3 signaling protocol layer for the licensed wireless service that includes a radio resource (RR) sublayer 146, a mobility management (MM) sublayer 148, and a call management (CM) layer 150. It will be understood that the level 1, level 2, and level 3 layers may be implemented as software modules, which may also be described as software "entities." In accordance with a common nomenclature for licensed wireless services, layer 1 is the physical layer, i.e., the physical baseband for a wireless communication session. The physical layer is the lowest layer of the radio interface and provides functions to transfer bit streams over physical radio links. Layer 2 is the data link layer. The data link layer provides signaling between the mobile station and the base station controller. The RR-sublayer is concerned with the management of an RR-session, which is the time that a mobile station is in a dedicated mode, as well as the configuration of radio channel, power controller, discontinuing transmission and reception, and handovers. The mobility management layer manages issues that arise from the mobility of the subscriber. The mobility management layer may, for example, deal with mobile station location, security functions, and authentication. The call control management layer provides controls for end-to-end call establishment. These functions for a licensed wireless system are well known by those in the art of wireless communication.

In one embodiment of the present invention, the mobile station also includes an unlicensed wireless service physical layer 152 (i.e., a physical layer for unlicensed wireless service such as Bluetooth, Wireless local area network, or other unlicensed wireless channel). The mobile station also includes an unlicensed wireless service level 2 link layer 154. The mobile station also includes an unlicensed wireless service radio resource sublayer(s) 156. An access mode switch 160 is included for the mobile management 148 and call management layers 150 to access the unlicensed wireless service radio resource sublayer 156 and unlicensed wireless service link layer 154 when the mobile station 102 is within range of an unlicensed wireless service indoor base station 128

The unlicensed radio resource sublayer 156 and unlicensed link layer 154 may include protocols specific to the unlicensed wireless service utilized in addition to protocols selected to facilitate seamless handoff between licensed and unlicensed wireless systems, as described below in more detail. Consequently, the unlicensed radio resource sublayer 156 and unlicensed link layer 154 need to be converted into a format compatible with a conventional base station controller interface protocol 190 recognized by a MSC, SGSN, or other voice or data network.

Referring to FIG. 1C, in embodiment of the present invention, the mobile station 102, indoor base station 128 and indoor network controller 132 provide an interface conversion function to convert the level 1, level 2, and level 3 layers of the unlicensed service into a conventional base station subnetwork (BSS) interface 190 (e.g., an A-interface or a Gb-interface). As a result of the protocol conversion, a communication session may be established that is transparent to the voice network/data network 114, i.e., the voice/data network 114 uses its standard interface and protocols for the communication session as it would with a conventional communication session handled by a conventional base transceiver station. For example, in some embodiments the mobile station 102 and indoor network controller 132 are configured to initiate location update and service requests that ordinarily originate from a base station controller. As a result, protocols for a seamless handoff of services that is transparent to voice/data network 114 are facilitated. This permits, for example, a single phone number to be used for both the licensed wireless service and the unlicensed wireless service. Additionally, the present invention permits a variety of services that were traditionally offered only through licensed wireless services to be offered through an unlicensed wireless service. The user thus gets the benefit of potentially higher quality service when their mobile station is located within the area serviced by a high bandwidth unlicensed wireless service while also having access to conventional phone services.

The licensed wireless service may comprise any licensed wireless service having a defined BSS interface protocol 190 for a voice/data network 114. In one embodiment, the licensed wireless service is a GSM/GPRS radio access network, although it will be understood that embodiments of the present invention include other licensed wireless services. For this embodiment, the indoor network controller 132 interconnects to the GSM core network via the same base station controller interfaces 190 used by a standard GSM BSS network element. For example, in a GSM application, these interfaces are the GSM A-interface for circuit switched voice services and the GSM Gb interface for packet data services (GPRS). In a UMTS application of the invention, the indoor network controller 132 interconnects to the UMTS network using a UMTS Iu-cs interface for circuit switched voice services and the UMTS Iu-ps interface for packet data services. In a CDMA application of the invention, the indoor network controller 132 interconnects with the CDMA network using the CDMA A1 and A2 interfaces for circuit switched voice services and the CDMA A10 and A11 interfaces for packet data services.

In a GSM/GPRS embodiment, indoor network controller 132 appears to the GSM/GPRS core network as a GSM BSS network element and is managed and operated as such. In this architecture the principle elements of transaction control (e.g., call processing) are provided by higher network elements; namely the MSC 116 visitor location registry (VLR) and the SGSN. Authorized mobile stations are allowed access to the GSM/GPRS core network either directly through the GSM radio access network if they are outside of the service area of an indoor base station or via the indoor access network system 100 if they are within the service area of an indoor base station 128.

Since a communication session to the IAN system 100 is transparent to a voice or data network 114, the unlicensed wireless service may support all user services that are typically offered by the wireless service provider. In the GSM case, this preferably includes the following basic services: Telephony; Emergency call (e.g., E911 calling in North America); Short message, mobile-terminated point-to-point (MT/PP); Short message, mobile-originated point-to-point (MO/PP); GPRS bearer services; Handover (outdoor-to-indoor, indoor-to-outdoor, voice, data, SMS, SS). Additionally for GSM, this preferably includes the following supplementary services: Call Deflection; Calling Line Identification Presentation; Calling Line Identification Restriction; Connected Line Identification Presentation; Connected Line Identification Restriction; Call Forwarding Unconditional; Call Forwarding on Mobile Subscriber Busy; Call Forwarding on No Reply; Call Forwarding on Mobile Subscriber Not Reachable; Calling Name Presentation; Call Waiting; Call Hold; Multi Party Service; Closed User Group; Advice of Charge (Information); Advice of Charge (Charging); User-to-user signaling; Barring of All Outgoing Calls; Barring of Outgoing International Calls; Barring of Outgoing International Calls except those directed to the Home PLMN Country; Barring of All Incoming Calls; Barring of Incoming Calls when Roaming Outside the Home PLMN Country; Explicit Call Transfer; Support of Private Numbering Plan; Completion of calls to busy subscribers; Unstructured Supplementary Services Data; SIM Toolkit. Moreover, it preferably includes Regulatory and Other Services such as: lawfully authorized electronic surveillance (also known as "wiretap"); TTY (also known as Telecommunications Device for the Deaf); and Location services.

FIG. 2 illustrates embodiments of the access network 130 configuration for coupling the indoor base station 128 to the indoor network controller 132. In one embodiment, the access network is broadband only. In this architecture, all traffic between the indoor network controller 132 and the customer premise equipment (i.e., indoor base station and mobile station), including all voice service, data service and signaling traffic, is conveyed using a broadband access network. In a hybrid version, both Broadband and POTS are used. In this architecture, all data service and signaling traffic between the indoor network controller 132 and the customer premise equipment is conveyed using a broadband access network; however, voice traffic is conveyed using common PSTN bearer channels (e.g., POTS or Plain Old Telephone Service). We refer to this as the "hybrid architecture" in this application.

Figure 3:
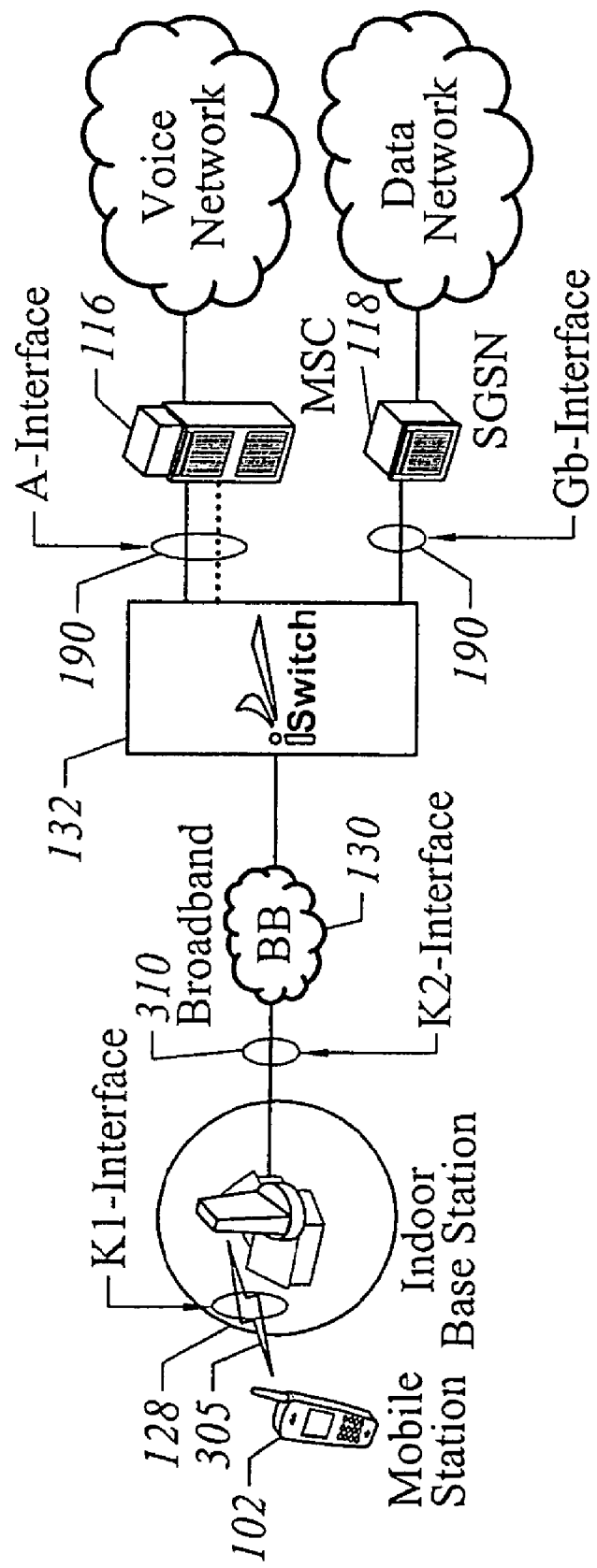
FIG. 3 illustrates an indoor access network (IAN) Broadband architecture in accordance with one embodiment of the present invention.

FIG. 3 illustrates one embodiment of an IAN broadband architecture. A K1 interface 305 between the mobile station 102 and the indoor base station 128 is illustrated along with a K2 interface 310 between the indoor base station 128 and indoor network controller 132.

Figure 4:
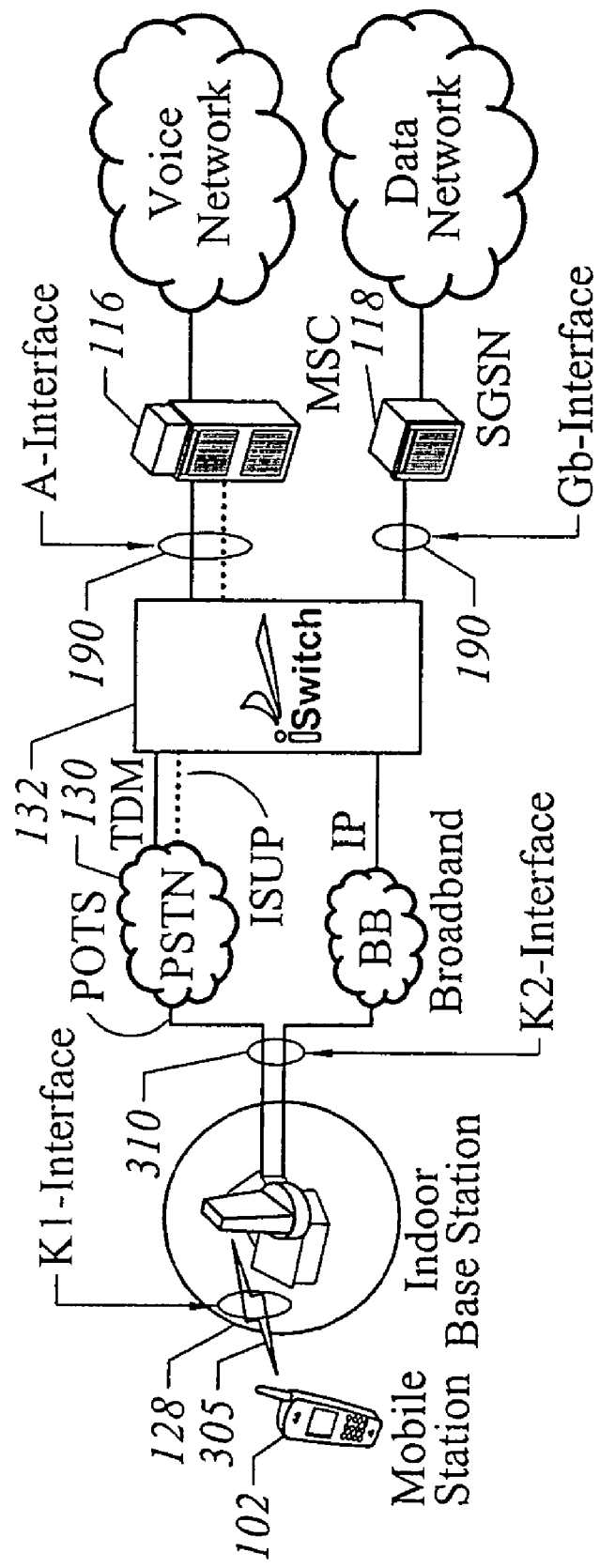
FIG. 4 illustrates an IAN Hybrid architecture in accordance with one embodiment of the present invention.

FIG. 4 illustrates an embodiment of a hybrid IAN architecture for GSM. The K1 interface 305 between the mobile station 102 and the indoor base station 128 and the K2 interface 310 between the indoor base station 128 and the indoor network controller 132 is illustrated. These interfaces and techniques for protocol conversion will be described below in more detail.

Figure 5:
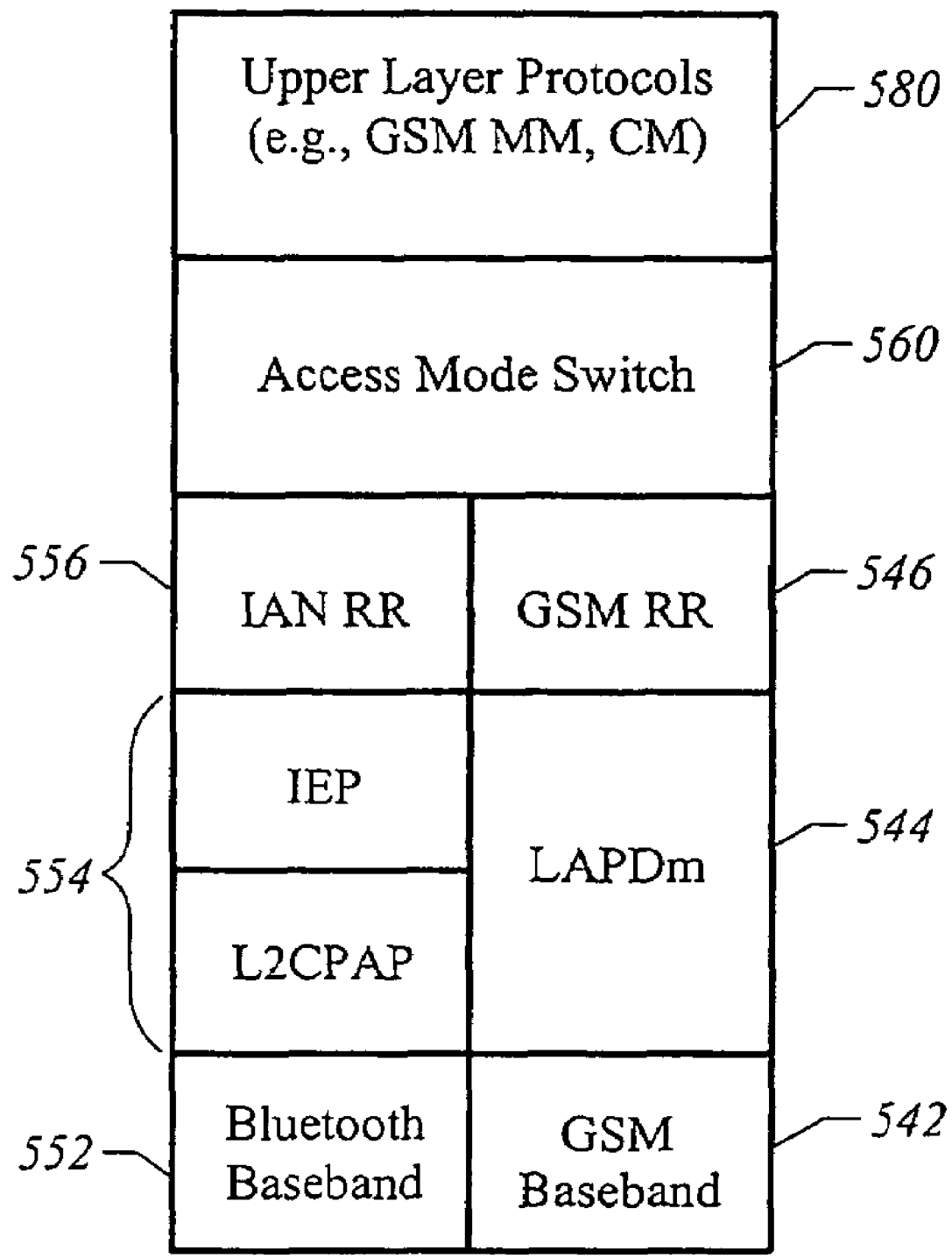
FIG. 5 illustrates components of a GSM mobile set for providing level 1, level 2, and level 3 layers for a licensed wireless service and an unlicensed wireless service in accordance with one embodiment of the present invention.

FIG. 5 provides an overview of a level 1, level 2, and level 3 GSM-related protocol architecture for one embodiment of mobile station 102. As illustrated, there are two logical radio resource (RR) management entities: the GSM RR entity 546 and the IAN RR entity 556. The protocol architecture includes a GSM baseband level 1 layer 542, GSM level 2 link layer 544, Bluetooth baseband level 1 layer 552, Bluetooth level 2 layers 554, access mode switch 560, and upper layer protocols 580. When the MS (mobile station) is operating in an IAN mode, the IAN RR entity 556 is the current "serving" RR entity providing service to the mobility management (MM) sublayer via the designated service access point (SAP) (RR-SAP) (shown in FIG. 6). The GSM RR entity is detached from the MM sublayer in this mode. The IAN RR entity 556 is a new set of functions. IAN-RR entity 556 is responsible for several tasks. First the IAN-RR entity 556 is responsible for discovery of IAN coverage and IAN registration. Second, the IAN-RR entity 556 is responsible for emulation of the GSM RR layer to provide the expected services to the MM layer; i.e., create, maintain and tear down RR connections. In one embodiment, all existing GSM 04.07 primitives defined for the RR-SAP apply. The plug-in of the IAN RR entity 556 is made transparent to the upper layer protocols in this way. Third, the IAN-RR entity 556 module is responsible for coordination with the GSM RR entity to manage access mode switching and handover.

Figure 6:
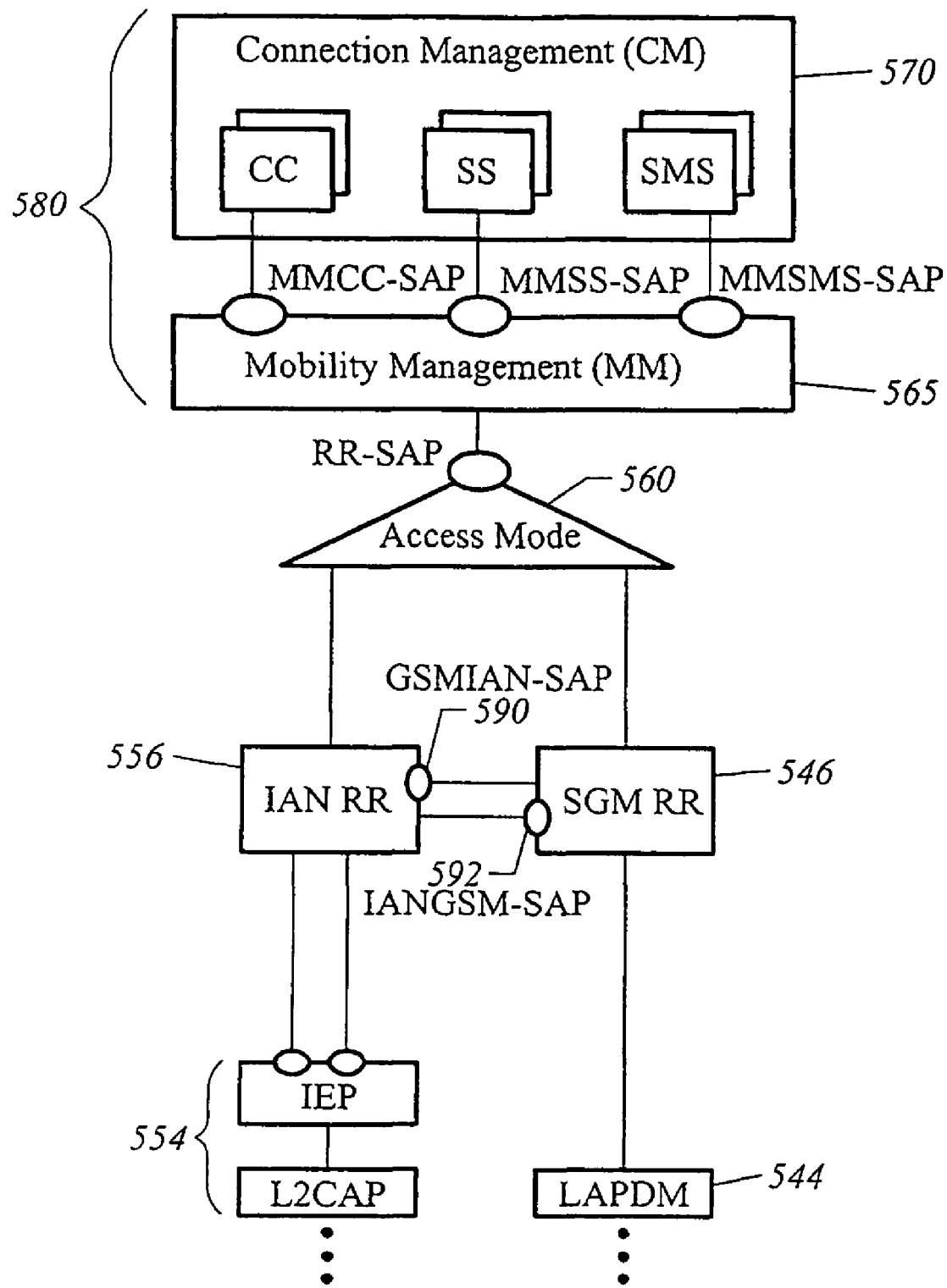
FIG. 6 illustrates components of mobile set for providing level 1, level 2, and level 3 layers for a GSM licensed wireless service and an unlicensed wireless service in accordance with one embodiment of the present invention.

FIG. 6 illustrates an embodiment of the mobile station 102 showing portions of the level 2 and level 3 layers. In this embodiment, there is provided IANGSM-SAP 592, GSMIAN-SAP 590 interface handlers for access mode switching and handover. The IAN RR entity 556 provides coordination with the GSM RR entity 546 through the IANGSM-SAP 592, specifically for access mode switching and "handout" (i.e., from indoor to outdoor) procedures. The GSM RR entity 546 provides coordination with the IAN RR entity 556 through the GSMIAN-SAP 590, specifically for access mode switching and "handing over" (i.e., from outdoor to indoor) procedures. The function of mobility management layer 565 and connection management layer 570 will be described below in more detail.

Figure 7A:
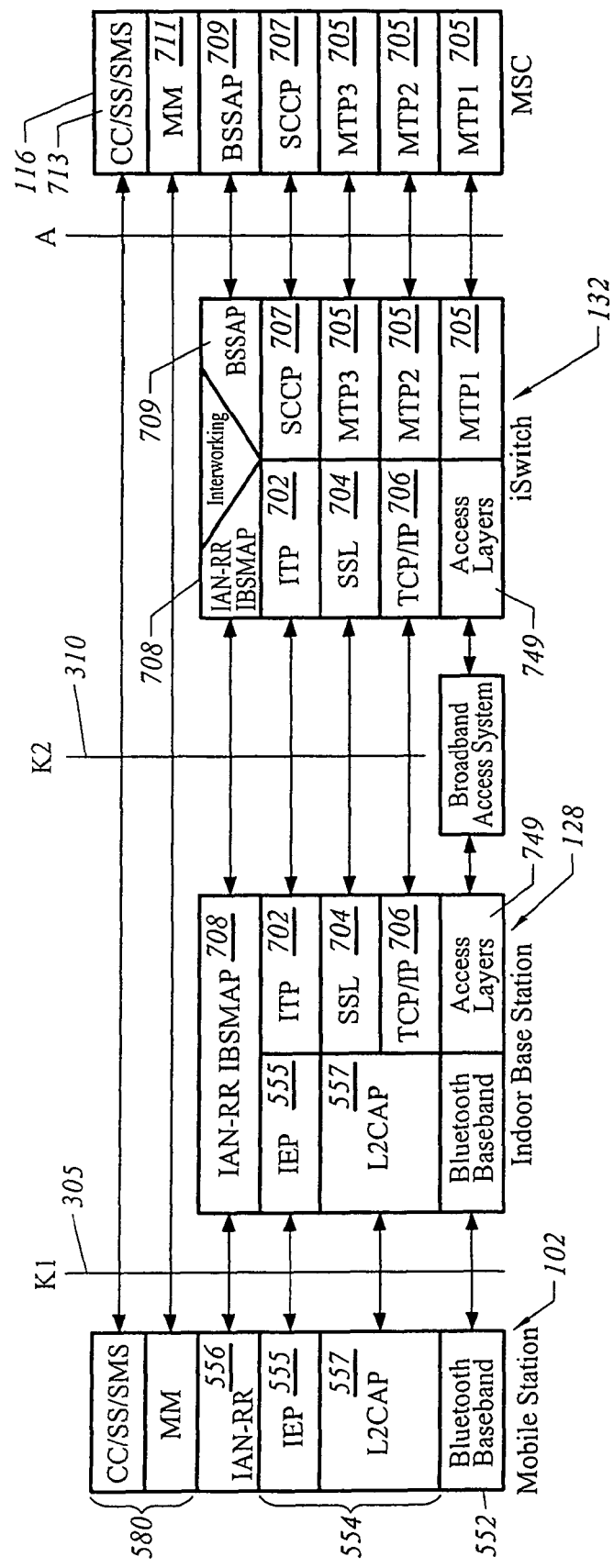
FIG. 7A illustrates an IAN protocol architecture in support of GSM mobility management (MM) and connection management (CM) signaling, as well as IAN-specific signaling in accordance with one embodiment of the present invention.

FIG. 7A illustrates an embodiment in which an IAN protocol architecture supports GSM MM and CM signaling, as well as IAN-specific signaling for the unlicensed wireless service. The MSC sublayers are conventional, well known features known in the art in regards to the message transfer part ((MTP) interfaces 705, signaling connection control part, (SCCP) 707, base station system application part (BSSAP) 709, mobility management interface 711, and connection management interface 713.

The IAN-RR protocol supports the IAN "layer 3" signaling functions. This includes the end-to-end GSM signaling between the indoor network controller 132 and mobile station 102, via IAN-RR message relay functions in the indoor base station 128. The indoor network controller 132 is responsible for the interworking between these messages and the analogous A-interface messages. The IAN-RR protocol also supports IAN-specific signaling between the mobile station 102, indoor base station 128 and indoor network controller 132; e.g., for mobile station-to-indoor base station bearer path control.

The radio resource layers in the mobile station include an IAN-RR sub-layer 556 and an IEP sublayer 557. The IAN-radio resource (RR) protocol is conveyed in an IAN Encapsulation Protocol (IEP) over the K1 interface 305, with the IEP being administered by the IEP sublayer 555. The IEP packets are transferred over the K1 interface 305 using the services of an unlicensed wireless service layer 2 connection access procedure (L2CAP) link layer.

The IAN-RR protocol is conveyed in an IAN Transfer Protocol (ITP) over the K2 interface 310 using an ITP module 702. The ITP messages are transferred using an IAN Secure Tunnel (IST) connection between the indoor base station 128 and the indoor network controller 132. The IST may be provided using standard security protocols. The use of the standard Secure Socket Layer (SSL) protocol 704 running over TCP/IP 706 is shown in FIG. 7A. Another option is to use IPSec. An intervening broadband access system 719 supports lower level IP connectivity.

The ITP module also supports non IAN-RR signaling between the indoor base station 128 and the indoor network controller 132. This includes the IBS-to-INC bearer path control signaling. This signaling may trigger, or be triggered by, IAN-RR signaling. We refer to this signaling as the indoor base station Management Application Protocol (IBSMAP) 708.

Figure 7B:
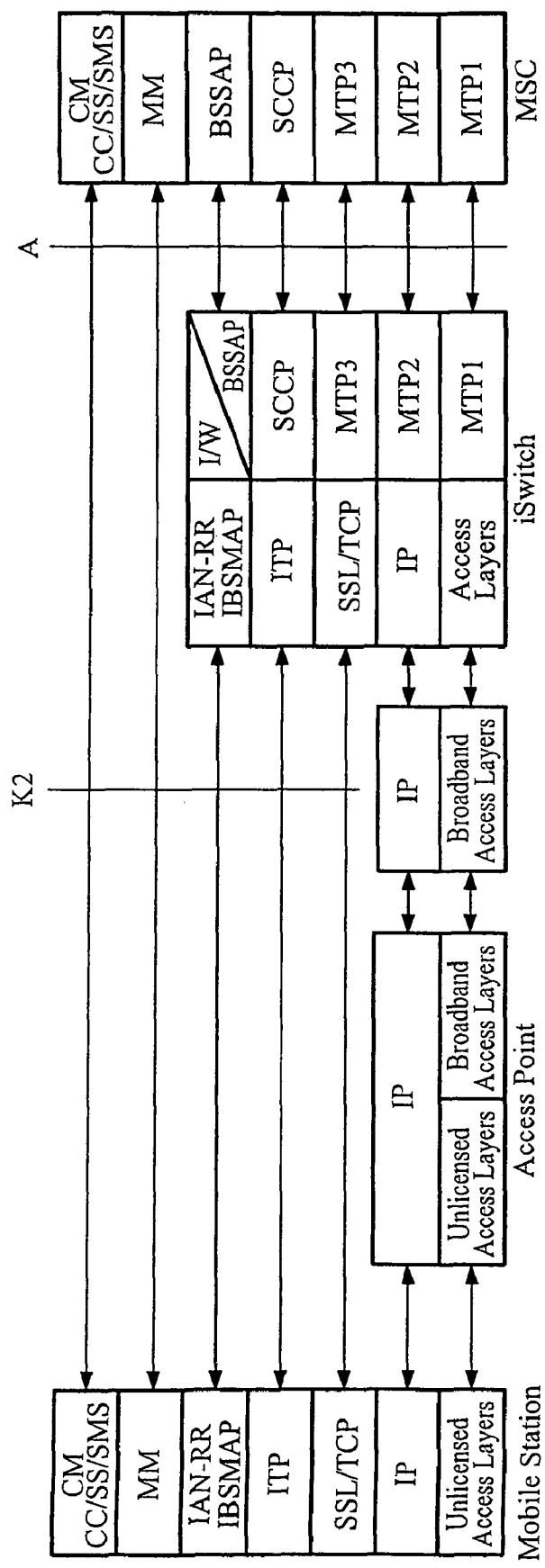
FIG. 7B illustrates an IAN protocol architecture in support of GSM mobility management (MM) and connection management (CM) signaling, as well as IAN-specific signaling in accordance with one embodiment of the present invention.

FIG. 7B illustrates an alternate embodiment in which the IAN-specific protocol functions of indoor base station 128 are moved to mobile station 102, allowing the use of unlicensed access points that do not support IAN-specific functionality but do support generic IP connectivity; for example, standard Bluetooth or IEEE 802.11b access points. As illustrated, in this embodiment, the SSL-based IAN Secure Tunnel and all upper layer protocols terminate on the mobile station. From the perspective of indoor network controller 132, there is no difference between the embodiment illustrated in FIG. 7A and that illustrated in FIG. 7B.

Figure 8:
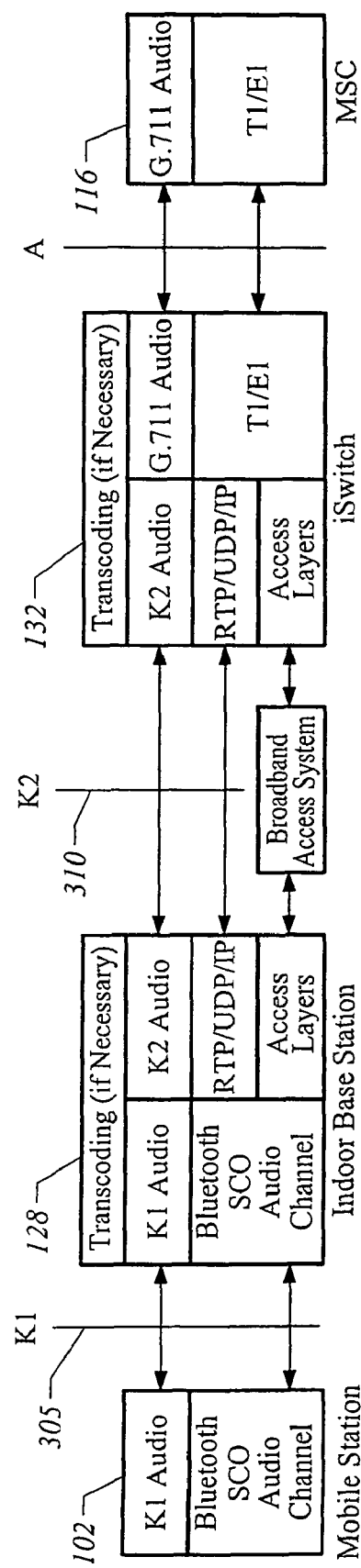
FIG. 8 illustrates an IAN protocol architecture in support of GSM voice transmission in accordance with one embodiment of the present invention.

FIG. 8 illustrates one embodiment of an IAN protocol architecture in support of GSM voice transmission. Audio flows over the K1 interface in a format illustrated as the "K1 Audio Format." For example, the K1 audio format may be the 64 kbps continuous variable slope delta modulation (CVSD) format running over Synchronous Connection Oriented (SCO) channels, as specified in the Bluetooth V1.1 standards. It is also possible to use standard voice over IP techniques using Bluetooth, 802.11 or other unlicensed technology over the K1 interface. Audio flows over the K2 interface in a format illustrated as the "K2 Audio Format." For example, a number of RTP-based audio formats may be used; e.g., G.711 (A-law or mu-law) and G.729A. Audio flows over the indoor network controller 132 to MSC interface, A, in 64 kbps pulse code modulation (PCM) format (G.711 A-law or mu-law). If the K2 audio format is something other than G.711, then transcoding is required in the indoor network controller 132; likewise, if the K1 and K2 audio formats are not the same, then transcoding is required in the indoor base station 128.

Figure 9:
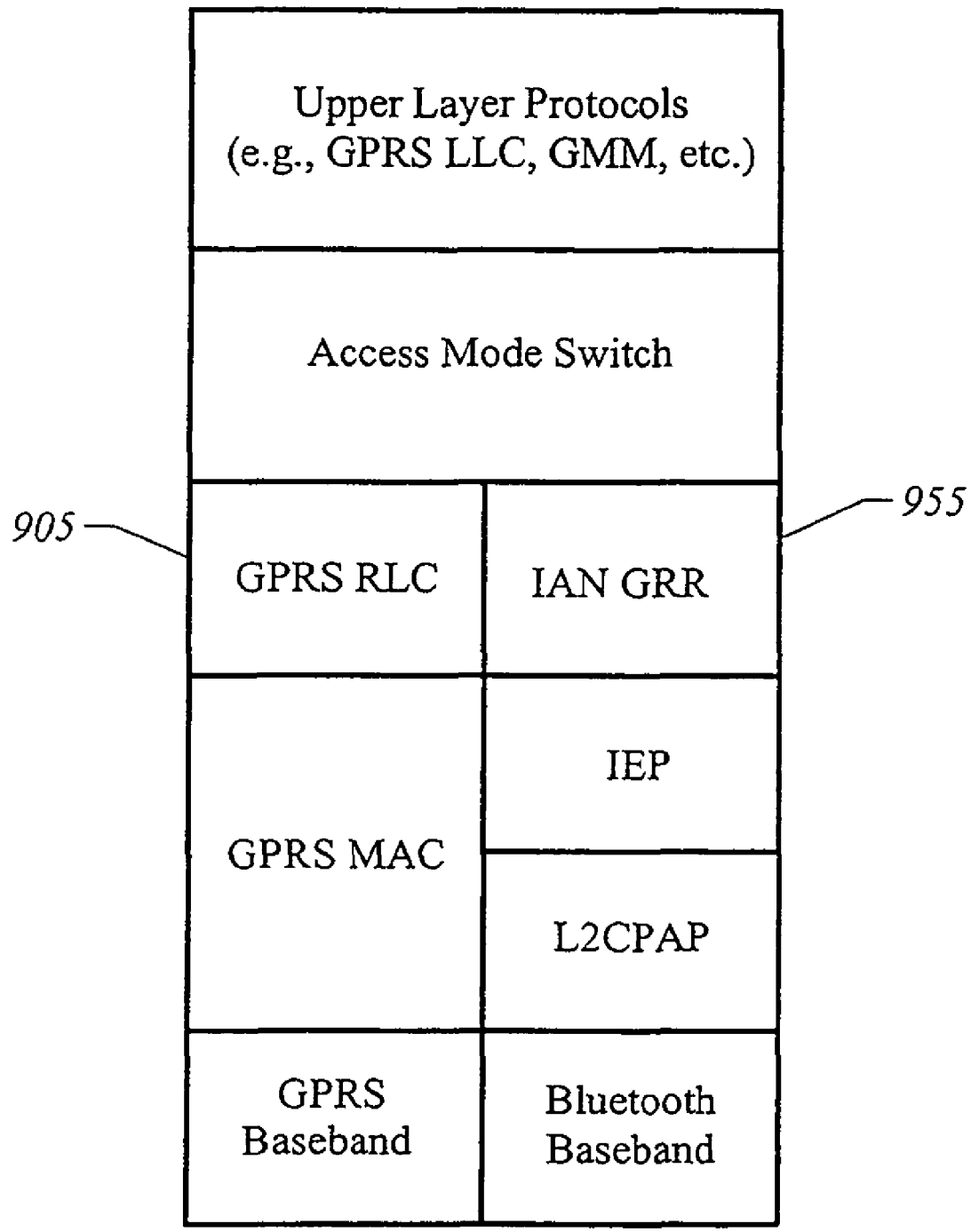
FIG. 9 illustrates components for level 1, level 2, and level 3 layers in a GPRS mobile set in accordance with one embodiment of the present invention.
Figure 10:
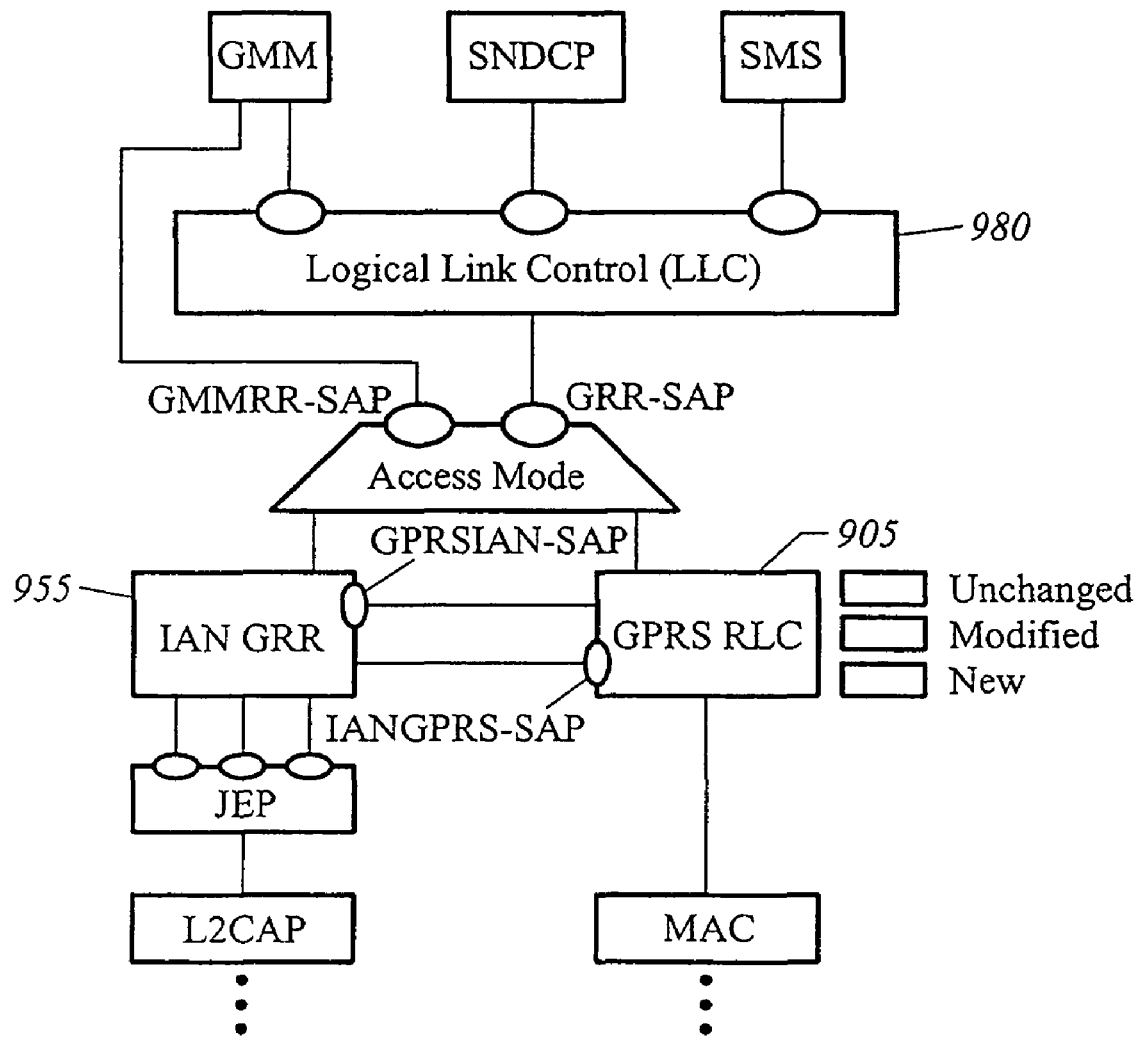
FIG. 10 illustrates components for level 1, level 2, and level 3 layers in a GPRS mobile set in accordance with one embodiment of the present invention.
Figure 11A:
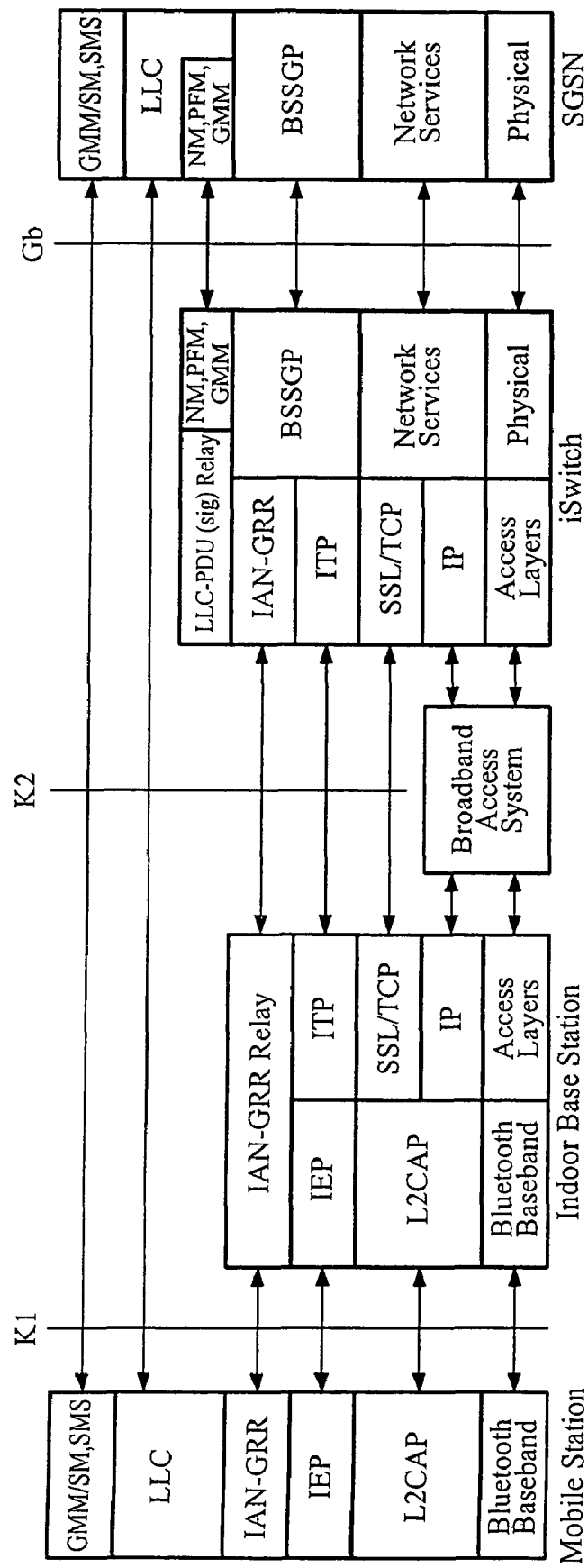
FIG. 11A illustrates an IAN protocol architecture in support of GPRS data transmission in accordance with one embodiment of the present invention.
Figure 11B:
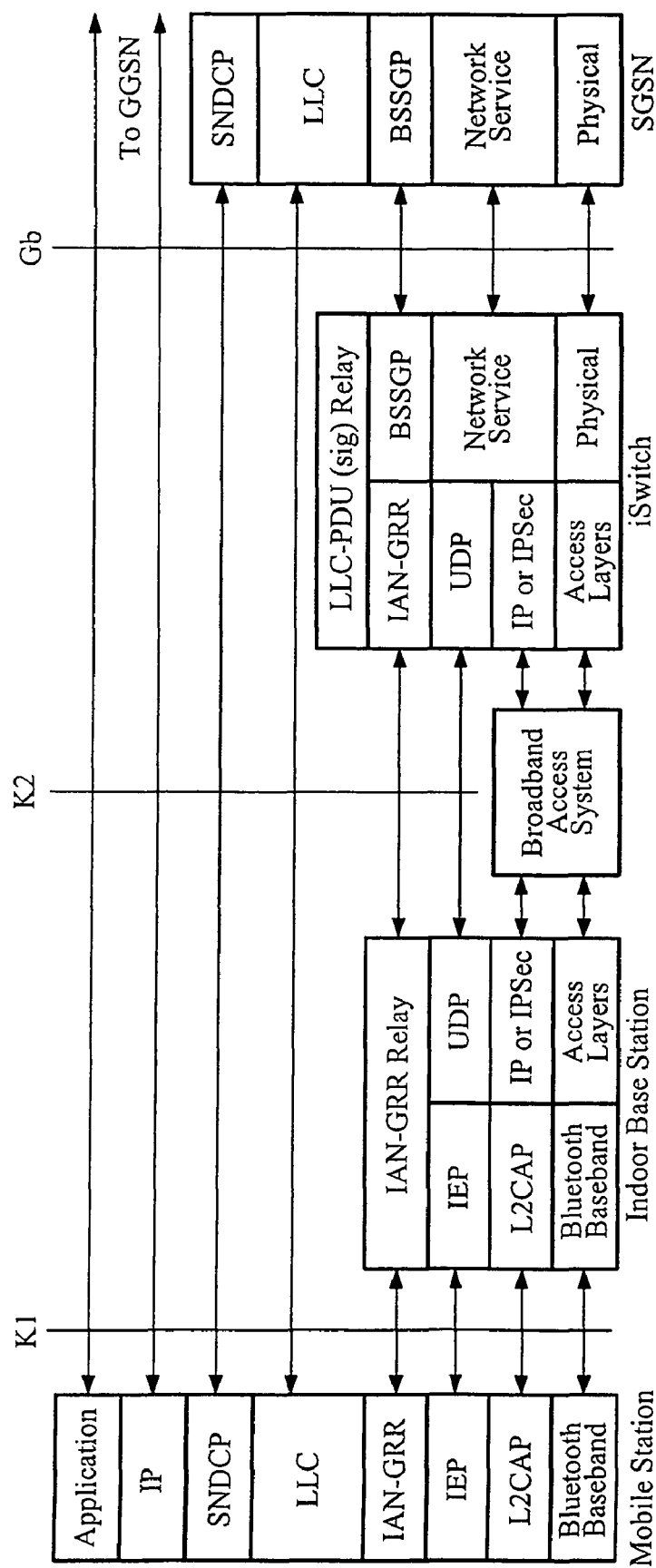
FIG. 11B illustrates an IAN protocol architecture in support of GPRS data transmission in accordance with one embodiment of the present invention.

FIGS. 9-11 illustrate a corresponding GPRS implementation. FIG. 9 provides an overview of the GPRS-related protocol architecture for the IAN mobile station. FIG. 10 shows details of one embodiment of an internal IAN/GPRS protocol architecture of the mobile station. FIG. 11A shows the corresponding GPRS signaling mode when the mobile station is operating using the unlicensed wireless service. FIG. 11B shows the corresponding GPRS data transmission mode when the mobile station is operating using the unlicensed wireless service. The IAN GPRS protocol architecture effectively enables the tunneling of GPRS signaling and data packets through the IAN utilizing the unlicensed spectrum; the IAN-GRR protocol serves the same tunneling function as the IAN-RR protocol, but for packet-switched traffic between the mobile station 102 and SGSN 118.

Referring to FIG. 10, the IAN/GPRS architecture includes two logical GPRS radio resource (RR) entities: the GPRS RLC 905 entity and the IAN GRR entity 955. In IAN mode, the IAN GRR entity is the current "serving" RR entity providing service to the logical link control 980 (LLC) layer via the designated service access point (GRR-SAP). The GPRS RLC entity is detached from the LLC layer in this mode.

The IAN-GRR RLC entity 955 is responsible for the following tasks. First, it emulates the GPRS RLC layer 905 to provide the expected services to the upper layer protocols. Second, it coordinates with the GPRS RLC 905 entity to manage access mode switching. In one embodiment, the IAN GRR layer includes IANGPRS-SAP and GPRSIAN-SAP interface handlers for access mode switching and modified PLMN/cell reselection behavior in IAN mode.

The IAN GRR entity 955 provides coordination with the GPRS RLC entity 905 through an IAN GPRS-SAP, specifically for access mode switching procedures. The GPRS RLC entity 905 provides coordination with the IAN GRR entity through the GPRSIAN-SAP, specifically for access mode switching procedures.

FIG. 11A illustrates an embodiment in which an IAN protocol architecture supports GPRS signaling. The SGSN layers are conventional, well known features known in the art in regards to the GPRS network management (NM), packet flow management (PFM), base station system GPRS protocol (BSSGP), network service (NS), GPRS mobility management (GMM), logical link control (LLC), session management (SM) and short message service (SMS) interfaces. The IAN-GRR protocol supports message encapsulation or tunneling functions. The indoor network controller 132 is responsible for terminating the NM, PFM, GMM, BSSGP, and NS layers and for relaying LLC protocol data units (PDUs) conveying GPRS signaling between the IAN-GRR encapsulated form present on the K2 interface and the analogous Gb-interface messages. The indoor base station provides simple IAN-GRR message relay functions between the K1 and K2 interfaces. The IAN protocol architecture in support of GPRS signaling makes use of the ITP, SSL, TCP/IP, and IEP layers described in reference to FIG. 7A. GPRS data transmission may also be supported via the architecture of FIG. 11A, whereby LLC PDUs conveying GPRS data packets are relayed by the INC and IBS between the SGSN and MS. FIG. 11B illustrates an alternate embodiment in which the transport protocol on the K2 interface is not the connection-oriented TCP protocol, but is instead the connectionless UDP protocol. This approach has the advantage of improved support for application protocols that are best matched with connectionless transports (e.g., voice over IP). Data transfer security over the K2 provided by SSL in FIG. 11A can be provided by IPSec as shown in FIG. 11B.

The basic operation of embodiments of the mobile station, base station, and indoor network controller 132 having been described above in regards to the operation of level 1, level 2, and level 3 layers and voice bearer operation, registration, mobility management, and call management procedures will now be discussed for several embodiments.

Conventional licensed wireless systems include procedures for handing off a communication session to different components of the licensed wireless system. These include, for example, handing off a session to different cells under control of the same base station controller, switching cells under control of different base station controllers but belonging to one MSC, and switching cells under control of different MSCs. In embodiments of the present invention, these protocols have been further adapted to initiate a handoff of a communication session to the unlicensed wireless system when the mobile station is within range of at least one indoor base station controller.

Figure 12:
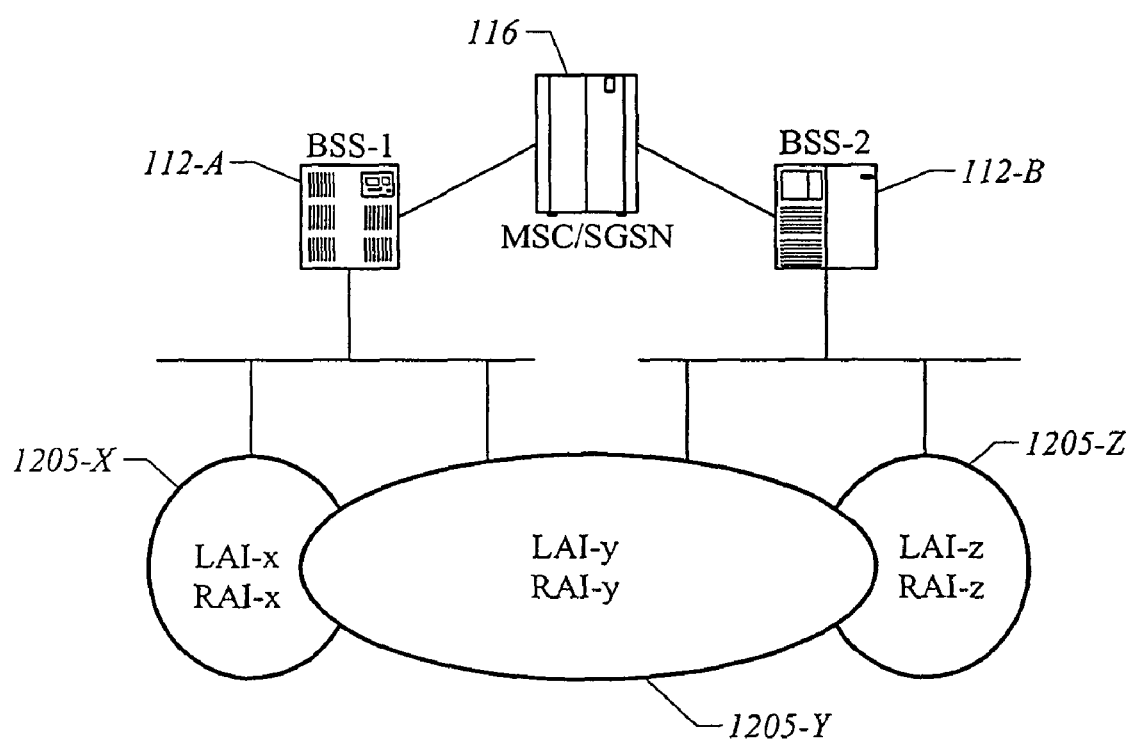
FIG. 12 illustrates a conventional GSM/GPRS registration area concept in accordance with one embodiment of the present invention.

FIG. 12 illustrates the concept of registration used for mobility management in GSM/GPRS. A MSC 116 may have more than one BSC 112 and associated base station subsystems (BSSs) linked to it, such as BSS 112-A and BSS 112-B. The coverage area is split into a plurality of logical registration areas 1205, such as 1205-x, 1205-y, and 1205-z called Location Areas (LA) (for GSM) and Routing Areas (RA) (for GPRS).

A mobile station 102 is required to register with the base subsystem (BSS) of the network each time the serving location area (or routing area) changes. This provides the network with information regarding the location of the mobile station that may, for example, be used to determine which BTS 108 and BSC 112 will service the communication session. One or more location areas identifiers (LAIs) may be associated with each visitor location register (VLR) in a carrier's network. Likewise, one or more routing area identifiers (RAIs) may be controlled by a single SGSN. In actual implementations, the number of different registration areas controlled by each VLR/SGSN is decided based upon a tradeoff between minimizing network paging and location updating load. The fewer registration areas, the less location updates on the system but the higher the paging load. The higher the number of registration areas, the lower the system paging load but the higher the number of user registrations. A single location area/routing area 1205-y may be associated with multiple base station subsystems (BSS). If this is the case, a mobile-terminated call to a subscriber that is registered in a particular location area will result in paging requests to each BSS associated with that location area. Note that there is not necessarily a one-to-one relationship between LAI and RAI; there may be multiple GPRS routing areas within a single location area.

Figure 13:
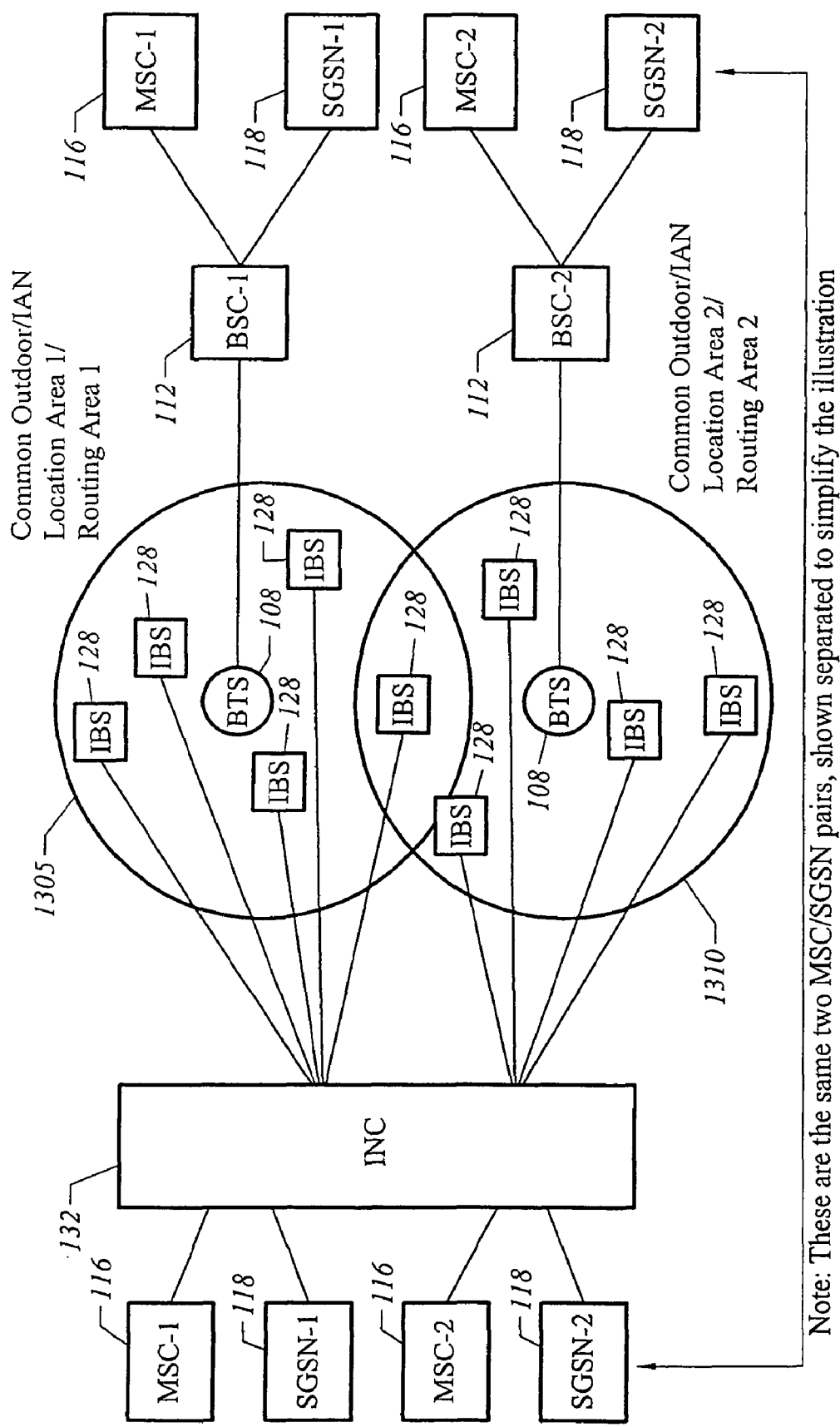
FIG. 13 illustrates registration areas for a licensed wireless network and an unlicensed wireless network in accordance with one embodiment of the present invention.
Figure 14:
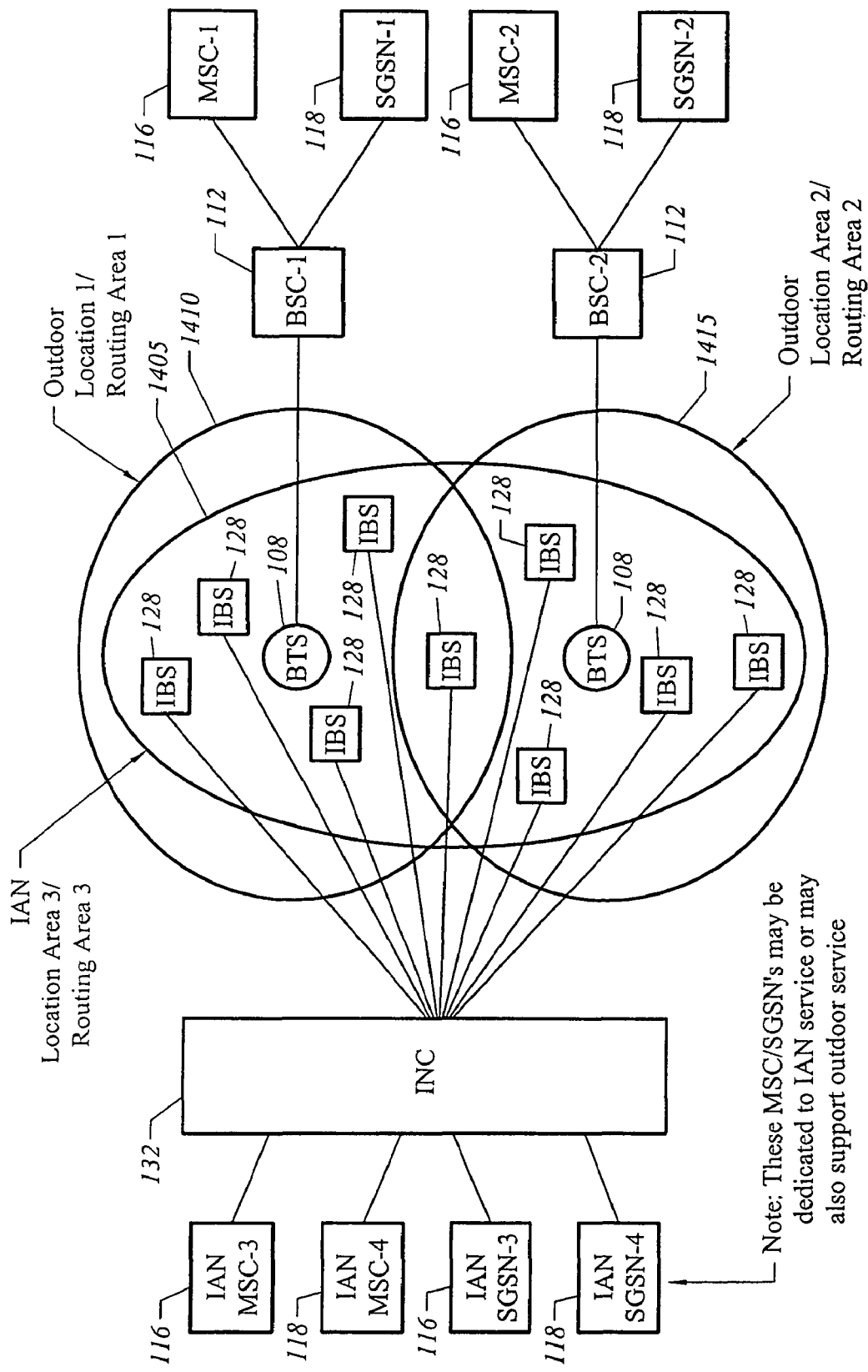
FIG. 14 illustrates registration areas for a licensed wireless network and an unlicensed wireless network in accordance with one embodiment of the present invention.

Referring to FIGS. 13 and 14, in embodiments of the present invention, the registration concept is adapted to describe services by one or more indoor base stations 128 to facilitate roaming and handoff between the licensed wireless system and the unlicensed wireless system, as described below in more detail. In the present invention, a set of IAN LAI/RAI pairs defines a set of at least one indoor base stations 128 under the control of one indoor network controller 132. Thus, referring to FIG. 13, a single indoor network controller 132 may have one or more indoor base stations defining location area/routing areas 1305 and 1310 serviced by the unlicensed wireless system. One or more licensed wireless service area local area/routing areas may overlap with the IAN LAI/RAI. In a first IAN configuration illustrated in FIG. 13, Location Area and Routing Area identity or identities are shared between the IAN system and the umbrella GSM network.

As illustrated in FIG. 13, the indoor network controller 132 may be connected to a different MSC/SGSN than those that provide the umbrella GSM/GPRS coverage. For this reason, the mobile set 102 is preferably provided with the IAN LAI/RAI pair that is associated with the serving indoor base station 128 by the indoor network controller 132 as part of the "IAN Registration" procedure. This information is used in the mobile set to determine Mobility Management actions while the mobile set is "switched-on" in the GSM/IAN domain; e.g., if a location update is required upon leaving the indoor coverage area.

In a second umbrella IAN configuration illustrated in FIG. 14, Location Area and Routing Area identity or identities are not shared between the IAN system and the umbrella GSM network. Consequently, the indoor LAI and RAI 1405 may be substantially different than the outdoor LAI and RAI zones 1410 and 1415. The IAN system is identified by one or a set of registration identifiers (LAI and RAI). The IAN mobile station arbitrates between the two networks and avoids presenting the GSM network with an overload of registration requests during transient conditions; i.e., temporary movement into and out of the IAN network.

In one embodiment, an IAN registration is performed by the mobile station 102 to manage signal load on the public land mobile network (PLMN) infrastructure. An IAN registration is preferably automatically performed by the mobile set on initial detection of IAN coverage or following a temporary interruption of IAN coverage under certain specific conditions. As described below in more detail, this proactive registration process facilitates seamless handoff for a variety of environments and situations that may be encountered. In one embodiment, an IAN registration does not involve any signaling to the PLMN infrastructure and is wholly contained within the IAN system (i.e., the mobile station, indoor base station and indoor network controller). The IAN registration message delivered to the indoor network controller 132 preferably includes (among other parameters): IMSI; GSM update status, and associated parameters (e.g., LAI and TMSI, if available); GPRS update status, and associated parameters (e.g., RAI and P-TMSI, if available).

In one embodiment, the IAN registration procedure is also used by the indoor network controller 132 to provide the mobile station 102 with the operating parameters associated with the IAN service on the indoor base station 128. This is analogous to the use of the GSM broadcast control channel (BCCH) to transmit system parameters to mobile stations in GSM cells. In this embodiment, the information that is transmitted includes (among other parameters): IAN-LAI (Location Area Identification); IAN-RAI (Routing Area Identification); IAN-CL (Cell Identification); IAN-ARFCN value (for handover purposes); IAN-BSIC value (for handover purposes); Attach/Detach Allowed (ATT) flag setting; GPRS network operating mode; CELL_RESELECT_OFFSET, used to "bias" GSM cell selection in favor of cells with the same registration area as the IAN system; BA (BCCH Allocation) List: and Timer values. These parameters are packaged in an IAN-System-Information wrapper. This package is included in the IAN registration response to the mobile station. The package may also be included in other messages to the mobile station in the event that a system parameter update is required.

Figure 15:
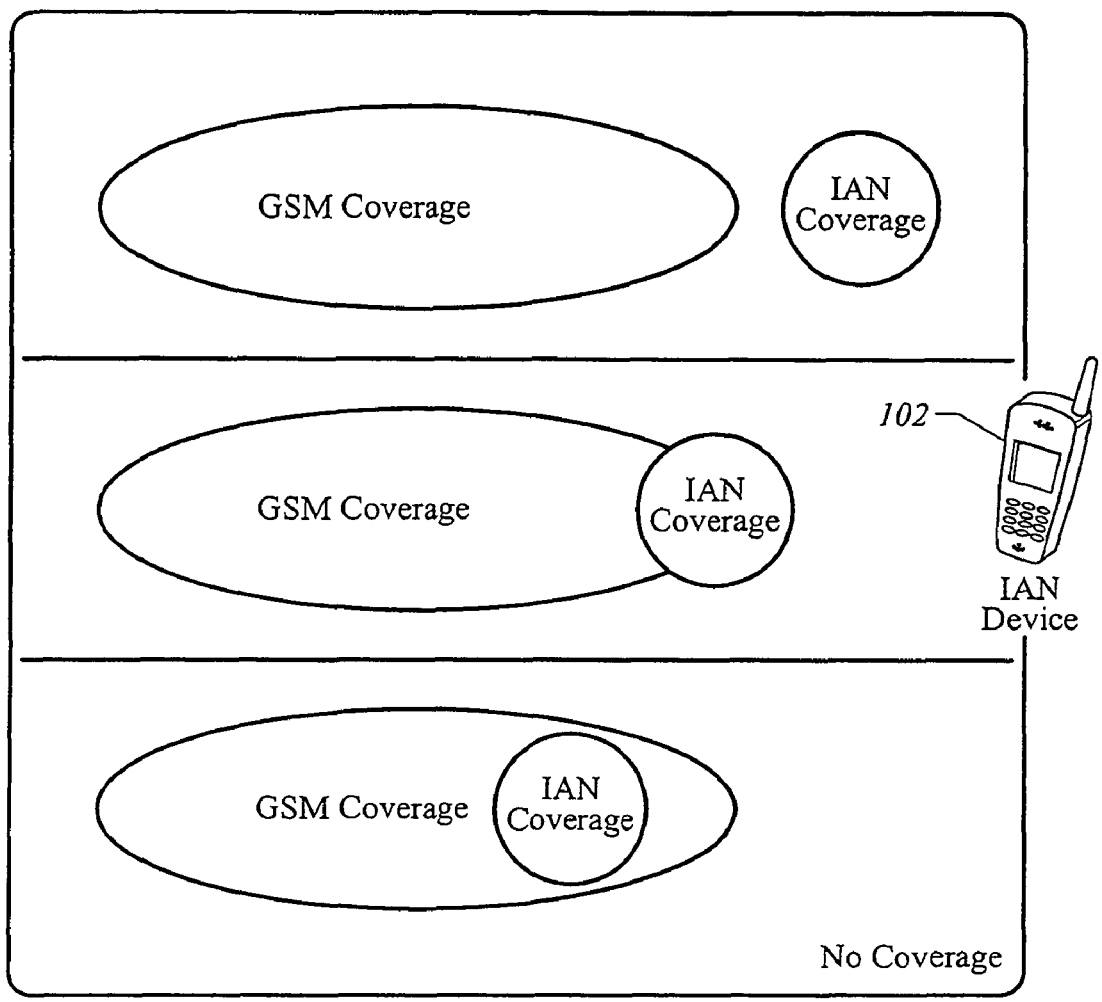
FIG. 15 illustrates several possible GSM and IAN coverage scenarios in accordance with one embodiment of the present invention.

FIG. 15 illustrates several different radio environments that may be encountered by an IAN mobile station 102. In the first environment, the GSM and IAN coverage are completely separate and non-overlapping. The second possibility shows partially overlapping GSM and IAN coverage. In the final scenario, and perhaps the most common, the IAN coverage is completely encapsulated within the GSM coverage. An IAN device may power on in any of these environments and may transition between coverage areas in a number of attached states.

In one embodiment the mobile station 102 scans for both GSM and IAN radio coverage at power on or anytime when the mobile station 102 is idle and there is no coverage of any type. If only GSM coverage is detected, then the normal GSM mobility management procedure is initiated. If only IAN coverage is detected, then the mobile station 102 establishes a link to the indoor base station 128 and waits for a IAN-LINK-ATTACH message from the indoor base station 128. On receipt of the IAN-LINK-ATTACH message (indicating that the received signal level at the indoor base station 128 has passed a predefined threshold), the mobile station 102 performs the IAN registration procedure. Based upon the information returned, the mobile station 102 then determines if a full network registration is required and if so what type (e.g., GSM or GPRS). If both GSM and IAN coverage are detected, then the mobile station 102 performs the normal GSM mobility management procedure, then performs the IAN registration procedure.

There is also the possibility that a mobile user may initially be outside of the IAN coverage zone but eventually move into the IAN coverage zone. Consequently, in one embodiment, at anytime when the mobile station 102 is idle, in GSM coverage and there is no IAN coverage, the mobile station 102 periodically scans for IAN coverage. If IAN coverage is detected, the mobile station 102 initiates the IAN registration procedure described above.

In some environments, such as inside a building, there may be IAN coverage but no GSM coverage. For this case, it is desirable that GSM scanning and other procedures be performed to enable the mobile station 102 to handoff to GSM upon exiting the IAN coverage zone. In one embodiment, at anytime when the mobile station 102 is idle, in IAN coverage and there is no GSM coverage, the mobile station 102 continues to perform normal GSM PLMN search procedures. If GSM coverage is detected, the mobile station 102 records the identification of the preferred GSM cell for handover or loss of IAN coverage situations. At anytime when the mobile station is idle, in IAN coverage and there is GSM coverage, the mobile station 102 continues to perform normal GSM cell reselection procedures.

In one embodiment, the mobile station 102 records the identification of the preferred GSM cell for handover or loss of IAN coverage situations. At power off with IAN coverage, a detach indication (if required by the PLMN network or normally sent by the mobile station at power off) is sent by the mobile station 102 to the PLMN via the IAN. This indication is encoded per the current GSM mode of operation (e.g., GSM or GPRS). At anytime when the mobile station 102 is operating in IAN mode (i.e., after successful IAN registration on the IAN), the mobile station 102 takes the CELL_RESELECT_OFFSET value into account in it GSM PLMN search and cell reselection procedures; i.e., the offset value "encourages" the mobile station 102 to show preference for a GSM cell in the same registration area as the indoor base station 128.

Figure 16:
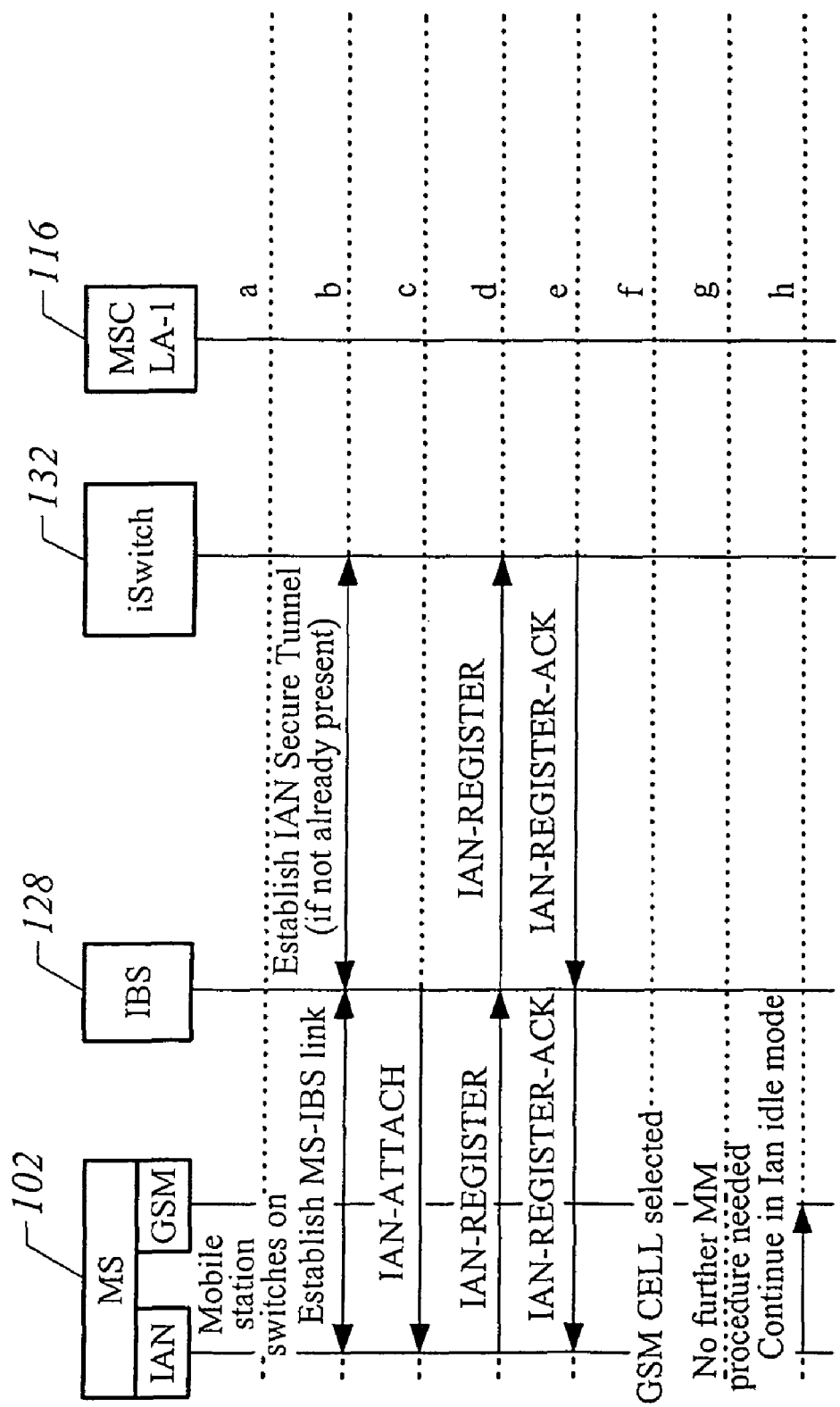
FIG. 16 illustrates exemplary message flows involved in the normal, successful case when a mobile station is powered on in an area with both GSM and IAN coverage in accordance with one embodiment of the present invention.

FIG. 16 illustrates one embodiment of initial registration message flows between the mobile station 102, indoor base station 128, and indoor network controller 132 at power-on between a mobile station, indoor base station, and indoor network controller involved in the normal, successful case when a mobile station is powered on in an area with both GSM and IAN coverage. This scenario illustrates the case where the IAN cell is in the location area where the mobile station was already registered such that an IMSI ATTACH message is not required and a periodic location update is also not required. In step a, upon "switch on" the mobile station will search for GSM and IAN coverage. The mobile station may first find GSM coverage and perform a location update using the outdoor network. In step b, IAN coverage is detected; therefore, secure links are established between the mobile station 102 and indoor base station 128 and (if not already established) between the indoor base station 128 and indoor network controller 132. In step c, when the indoor base station 128 determines that the received signal from the mobile station is acceptable for IAN service, it sends a IAN-LINK-ATTACH message to the mobile station 102. In step d, the mobile station 102 sends a IAN-REGISTER message to the indoor base station 128. The indoor base station 128 relays the IAN-REGISTER message to the indoor network controller 132 using IBSAP. The indoor network controller 132 begins monitoring for page requests from the GSM network targeted at the mobile station in question. In step e, the indoor network controller 132 returns an IAN-REGISTER-ACK message to the indoor base station 128. An indication of the CI and LAI associated with the indoor base station 128 is included in this message, contained in the IAN-System-Information parameter. The indoor base station 128 transparently passes this information to the mobile station 102. The indoor base station 128 stores an indication that the mobile station 102 is registered for IAN service. In step f, the mobile station has selected a GSM cell based on normal GSM cell selection procedures. In step g, the mobile station 102 has the following information: 1) The GSM update status and associated parameters stored on the SIM; 2) the selected GSM cell information based on normal GSM cell selection procedures; 3) the indoor base station 128 cell information provided by the indoor network controller 132 (i.e., this and the GSM cell information allow the mobile station to determine whether the IAN configuration is type 1 or 2). Based on this information, the mobile station is required to determine if additional mobility management procedures are necessary. In this example, the mobile station determines that no further mobility management procedure is necessary (i.e., that the service state is for NORMAL SERVICE with the GSM cell selected). In step h, the IAN portion of the mobile station continues in IAN idle mode.

Figure 17:
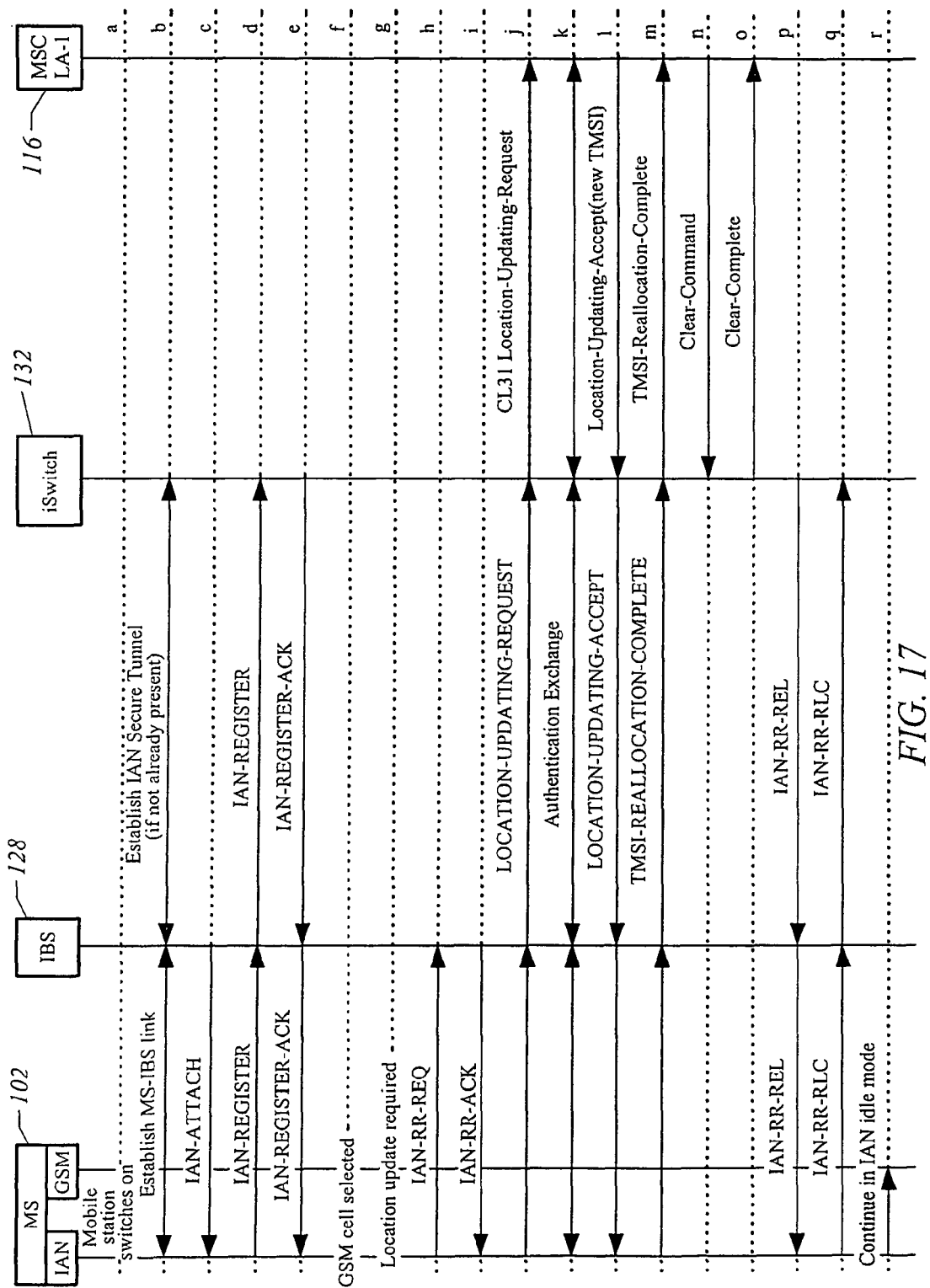
FIG. 17 illustrates exemplary message flows involved in the normal, successful case when a mobile station is powered on in an area with both GSM and IAN coverage in accordance with one embodiment of the present invention.

FIG. 17 illustrates one embodiment of registration message flows and location update message flows at power-on involved in the normal, successful case when a mobile station is powered on in an area with both GSM and IAN coverage. This scenario illustrates the case (for example) where the IAN cell is in the location area where the mobile station was already registered, but an IMSI Attach or Location Update is required. Steps a-f are the same as those described with respect to FIG. 16. In the example of FIG. 17, in step g, the mobile station determines that a location update via the IAN is necessary. In step h, the mobile station 102 requests the establishment of a logical IAN-RR session from the indoor base station 128 using the IAN-RR-REQUEST message. This message includes the resources that are required for the session (e.g., signaling channel only or signaling channel and voice channel). The indoor base station 128 verifies that it can provide the necessary resources to handle the request (i.e., air interface resources and indoor network controller connectivity). In step i, the indoor base station 128 signals its acceptance of the IAN-RR session request. In steps j-m, location update signaling takes place between the mobile station 102 and MSC 116. In step n, the MSC 116 sends the CLEAR-COMMAND message to the indoor network controller 132 to release the radio resource. In step o, the indoor network controller 132 acknowledges the release of the radio resources in the CLEAR-COMPLETE message. The SCCP connection associated with the session between the indoor network controller 132 and the MSC 116 is released (signaling not shown). In step p, the indoor network controller 132 signals the indoor base station 128 to release the IAN-RR session and associated resources via the IAN-RR-RELEASE message. The indoor base station 128 forwards the message to the mobile station. In step q, the mobile station acknowledges the release of the previously established IAN-RR session, using the IAN-RR-RELEASE-COMPLETE message. The indoor base station 128 forwards the acknowledgement to the indoor network controller 132. In step r, the mobile station 102 continues in IAN idle mode.

Figure 18:
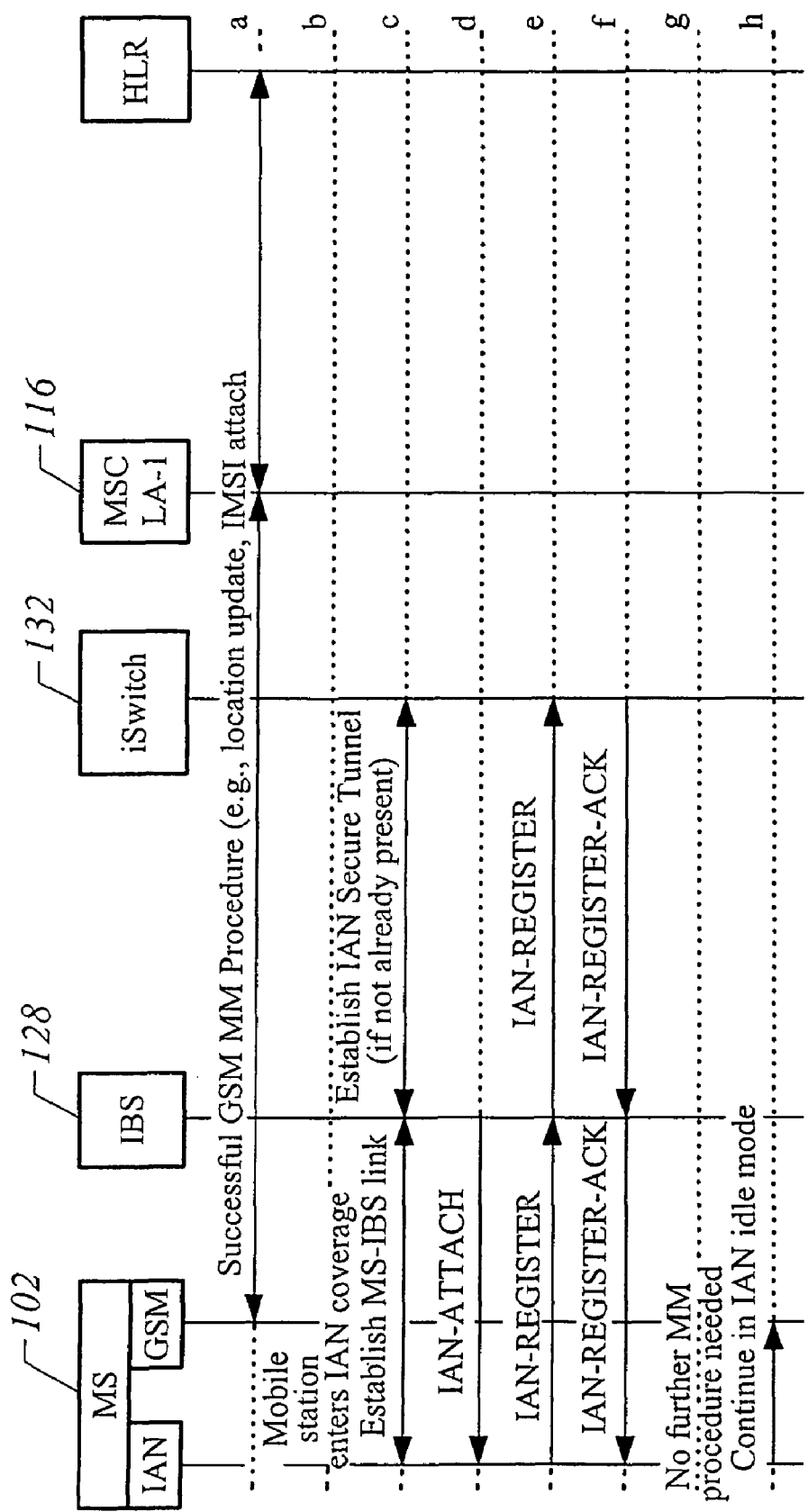
FIG. 18 illustrates exemplary message flows involved in the normal, successful case when a powered up mobile station enters IAN coverage from GSM coverage while in the idle mode in accordance with one embodiment of the present invention.

FIG. 18 illustrates one embodiment of registration message flows involved in the normal, successful case when a powered up mobile station 102 enters IAN coverage from GSM coverage while in the idle mode. In step a, the mobile station 102 performs the appropriate GSM mobility management procedure (e.g., normal or periodic location update or IMSI attach) while in GSM coverage. This may involve communication between the MSC and the home location register (HLR) using standard protocols such as the Mobile Application Part (MAP) protocol. In step b, IAN coverage is detected. Steps c-f are the same as steps b-e in FIG. 17. In step g, the mobile station 102 determines that no further mobility management procedure is necessary. In step h, the mobile station begins IAN idle mode operation.

Figure 19:
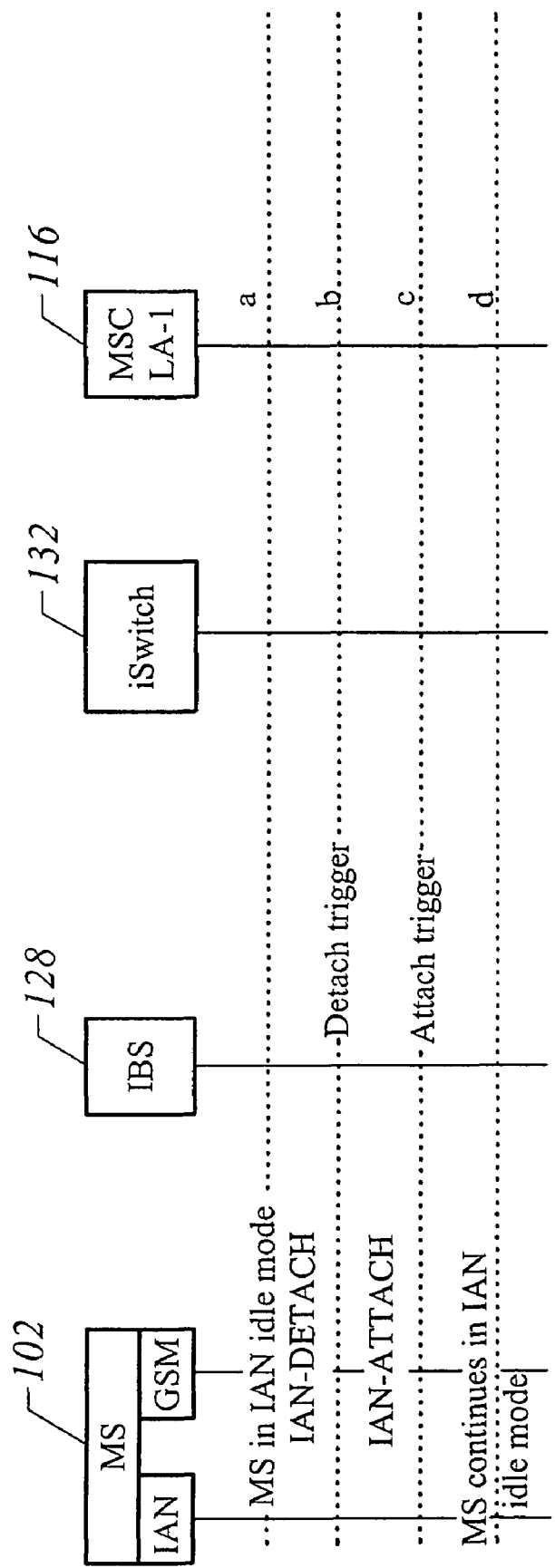
FIG. 19 illustrates exemplary message flows involved in the normal, successful case when a powered up, idle mobile station re-enters IAN coverage following a temporary absence and prior to the expiration of timer T1 in accordance with one embodiment of the present invention.

FIG. 19 illustrates embodiment of attachment/detachment message flows involved in the normal, successful case when a powered up, idle mobile station 102 re-enters IAN coverage following a temporary absence and prior to the expiration of a timer T1. In step a, the mobile station 102 is in IAN idle mode operation. In step b, the indoor base station 128 determines that the received signal from the mobile station is no longer acceptable for IAN service. The indoor base station 128 sends a IAN-LINK-DETACH message to the mobile station 102. The mobile station 102 starts timer T1. If the link is lost before the indoor base station 128 can send IAN-LINK-DETACH, the mobile station 102 and indoor base station 128 start timers T1 and T2, respectively. If the link is lost after sending IAN-LINK-DETACH, the indoor base station 128 starts timer T2. At some later point, the mobile station 102 and indoor base station 128 may re-establish the IAN link, in which case the indoor base station 128 stops timer T2. The secure link between the indoor base station 128 and indoor network controller 132 is still established. In step c, the indoor base station 128 determines that the received signal from the mobile station 102 is acceptable for IAN service and sends a IAN-LINK-ATTACH message to the mobile station, prior to the expiry of timer T1. The mobile station 102 stops timer T1. In step d, the mobile station 102 continues in IAN idle mode operation.

Figure 20:
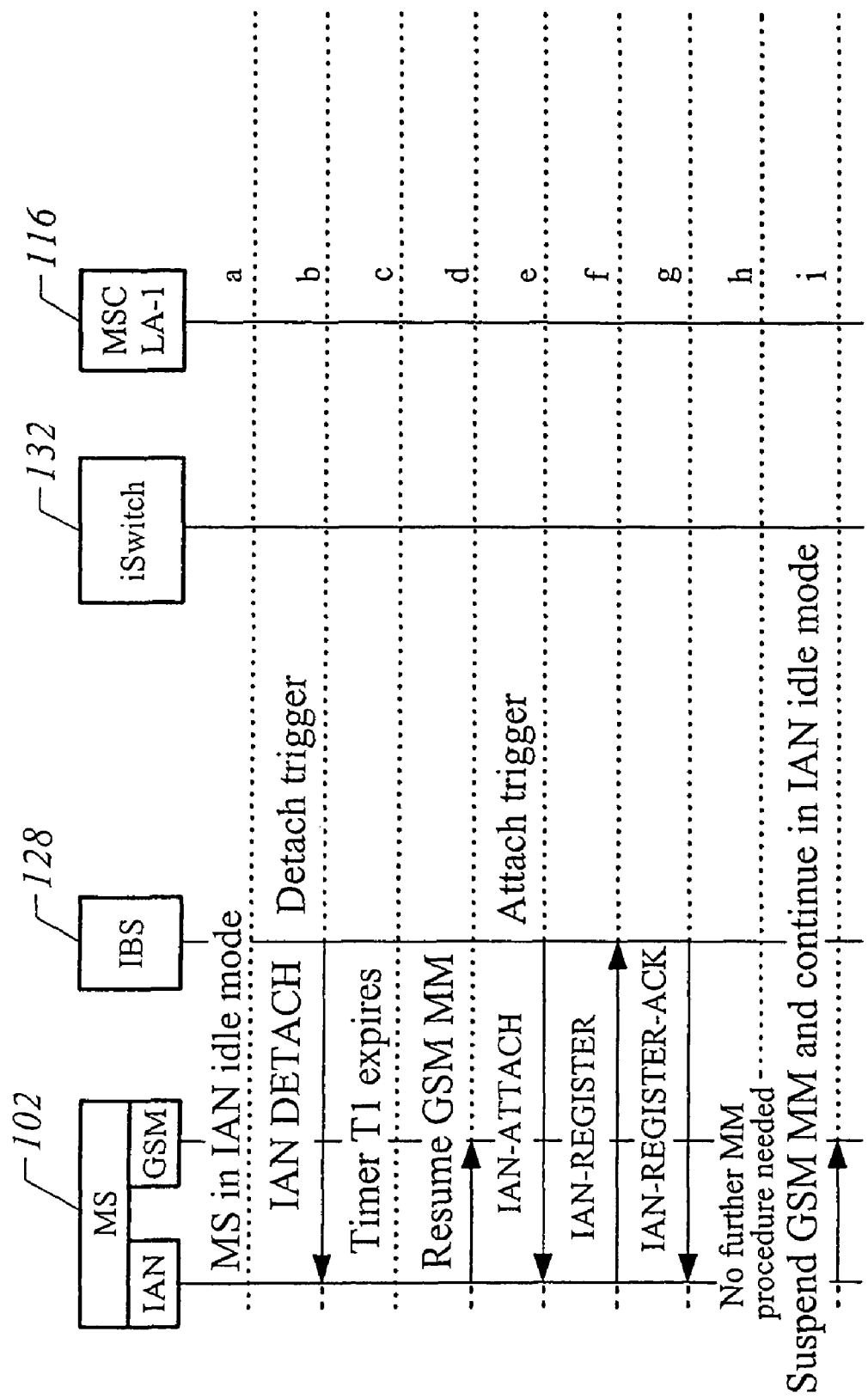
FIG. 20 illustrates exemplary message flows involved in the normal, successful case when a powered up mobile station re-enters IAN coverage following a temporary absence and after the expiration of timer T1 but prior to the expiration of timer T2 in accordance with one embodiment of the present invention.

FIG. 20 illustrates an embodiment of detach, attach, and registration message flows involved in the normal, successful case when a powered up mobile station re-enters IAN coverage following a temporary absence and after the expiration of timer T1 but prior to the expiration of timer T2. Steps a-b are the same as in the previous example of FIG. 19. In step c, timer T1 expires at the mobile station 102. In step d, the IAN application directs the mobile station 102 to resume normal GSM MM operation. The mobile station 102 selects the GSM cell, which has the same LAI as the IAN IBS; therefore, there is no need for a location update. In step e, the indoor base station 128 determines that the received signal from the mobile station 102 is now acceptable for IAN service. The indoor base station 128 sends an IAN-LINK-ATTACH message to the mobile station 102. Note that between step-b and step-e, the link between the mobile station and indoor base station 128 may be lost and then re-established. In step f, the mobile station 102 sends an IAN-REGISTER message to the indoor base station 128. In step g, since the indoor base station 128 considers the mobile station 102 to still be active, it returns an IAN-REGISTER-ACK message to the mobile station 102 without notifying the indoor network controller 132. The indoor base station 128 includes the previously stored IAN-System-Information parameter. In step h, the mobile station determines that no further mobility management procedure is necessary. In step I, the IAN application suspends GSM MM procedures and begins IAN idle mode operation.

Figure 21:
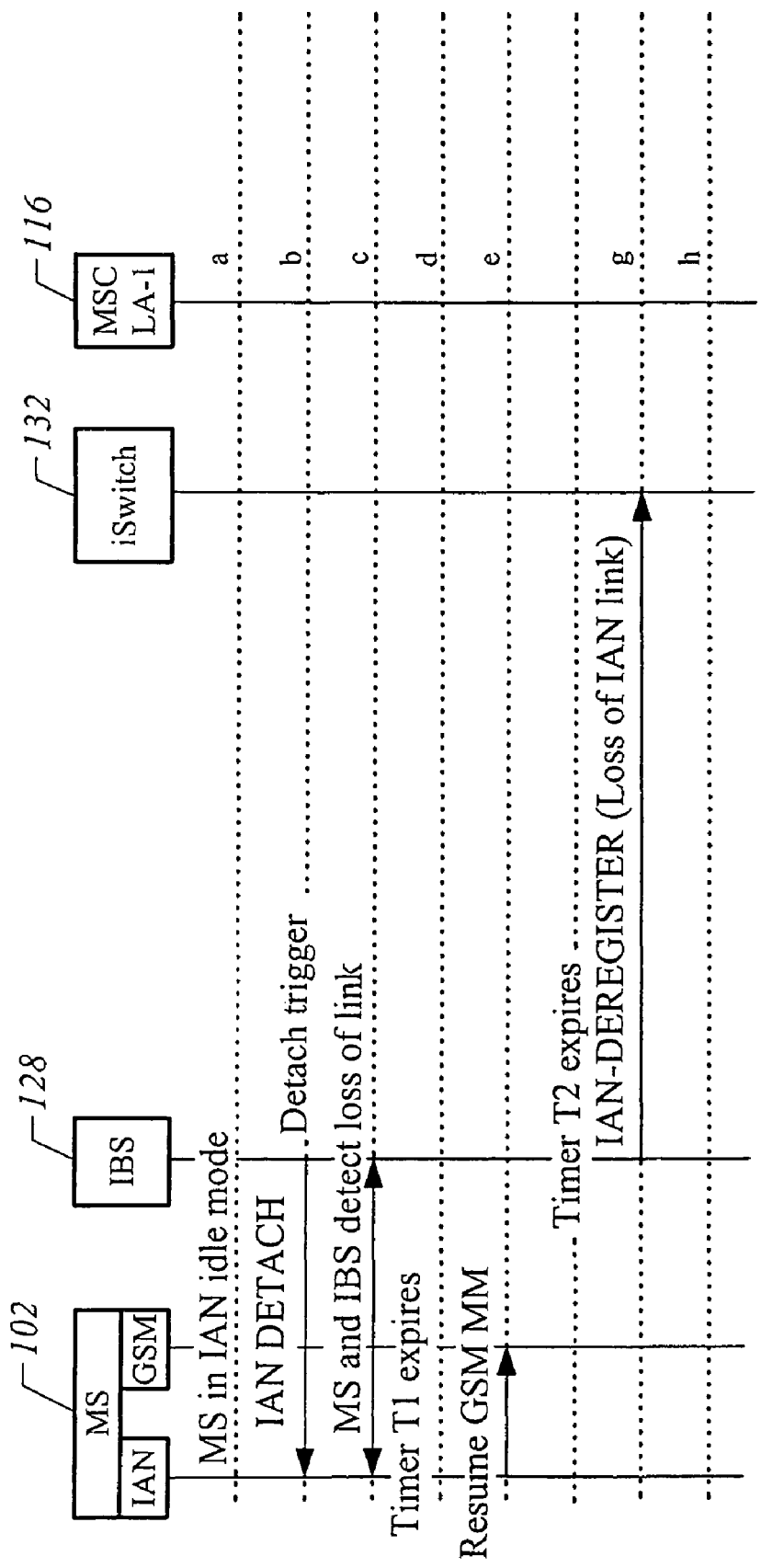
FIG. 21 illustrates exemplary message flows involved in the normal, successful case when the IBS and mobile station detect the loss of the IAN connection and both timer T1 and T2 expire in accordance with one embodiment of the present invention.

FIG. 21 illustrates one embodiment of detachment and deregistration message flows involved in the normal, successful case when the indoor base station 128 and mobile station 132 detect the loss of the IAN connection and both timers T1 and T2 expire for the idle mode. In step a, the mobile station 102 is in IAN idle mode operation. In step b, the indoor base station 128 determines that the received signal from the mobile station 102 is no longer acceptable for IAN service. The indoor base station 128 sends an IAN-LINK-DETACH message to the mobile station 102. The mobile station starts timer T1. If the link is lost before the indoor base station 128 can send IAN-LINK-DETACH, the mobile station 102 and indoor base station 128 may start timers T1 and T2, respectively. In step c, the link between the mobile station 102 and indoor base station 128 is lost. The indoor base station 128 starts timer T2. In step d, timer T1 expires at the mobile station 102. In step e, the IAN application directs the mobile station 102 to resume normal GSM MM operation. The mobile station 102 selects the GSM cell, which has the same LAI as the IAN IBS; therefore, there is no need for a location update. The mobile station 102 may also find that no GSM coverage is available, in which case it proceeds per normal GSM procedures. In step f, timer T2 expires at the indoor base station 128. In step g, the indoor base station 128 sends an IAN-DEREGISTER message to the indoor network controller 132 containing the reason for the deregistration (i.e., loss of IAN link). The indoor base station 128 releases any resources assigned to the mobile station 102. The indoor network controller 132 changes the mobile station state to "Inactive" or a similar state. Subsequent page requests for the mobile station 102 from the GSM network are ignored.

Figure 22:
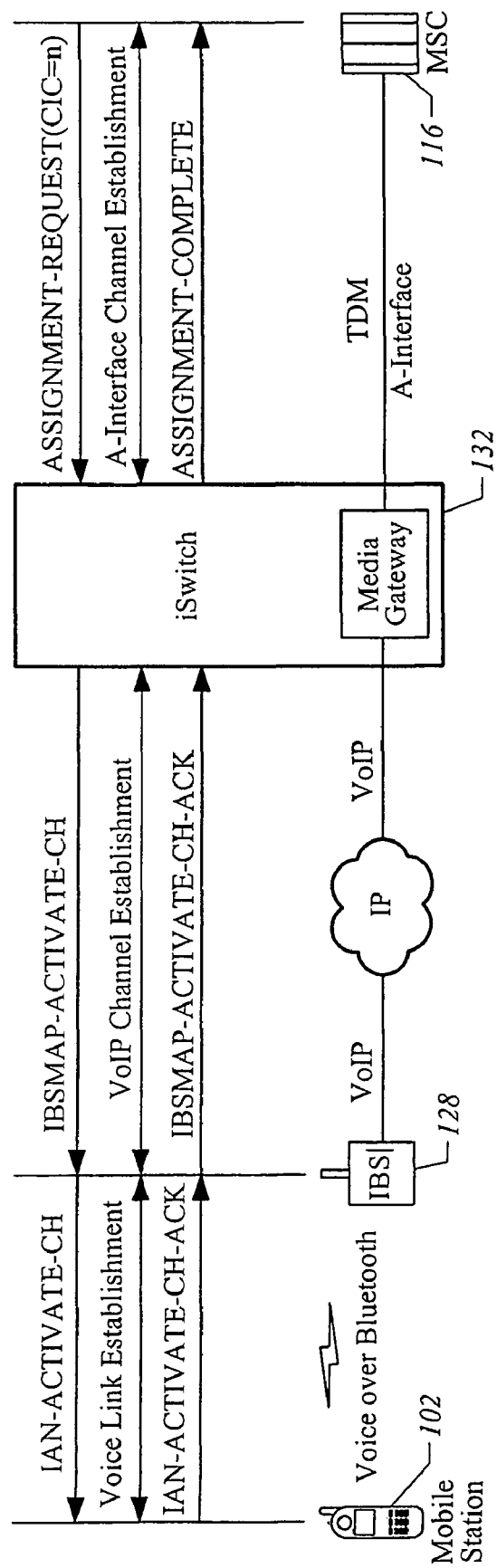
FIG. 22 illustrates exemplary message flows in a first stage of voice bearer establishment for the IAN broadband architecture in accordance with one embodiment of the present invention.
Figure 23:
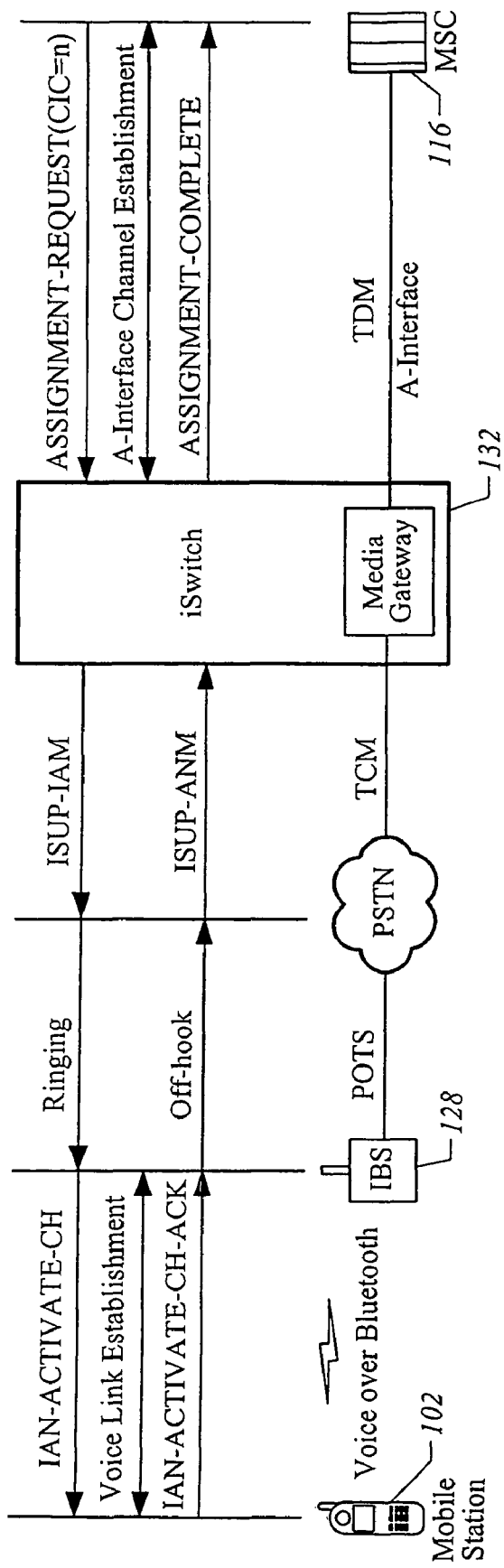
FIG. 23 illustrates exemplary message flows in a first stage of bearer establishment for the IAN hybrid architecture in accordance with one embodiment of the present invention.

FIG. 22 illustrates an embodiment of channel activation and assignment request message flows for Voice bearer establishment for the IAN broadband architecture. FIG. 23 illustrates an embodiment of the analogous case for the IAN hybrid architecture. The indoor network controller 132 provides the signaling interworking functionality that allows the switched establishment of bearer paths between the MSC 116 and the indoor base station 128.

In one embodiment, voice bearer establishment between the MSC 116 and the mobile station 102 takes place in three stages in the IAN broadband architecture solution: First, the indoor network controller 132 establishes a connection to the MSC-INC circuit allocated by the MSC 116 during the A-interface circuit assignment process. In the broadband architecture, this is a TDM-to-VoIP connection, converting the TDM channel to the MSC 116 into a VoIP channel to the indoor base station 128. Second, the indoor network controller 132 sends a message to the indoor base station 128, directing it to establish VoIP connectivity to the VoIP channel established in step one. Finally, the indoor base station 128 directs the mobile station 102 to establish a voice link over the unlicensed air interface, and the indoor base station 128 connects this channel to the channel established in step two. Acknowledgements are returned from mobile station 102 to indoor base station 128 to indoor network controller 132 to MSC 116, completing the process.

In both cases illustrated in FIGS. 22-23, the GSM mobile originating and mobile terminating voice call signaling is exchanged between the mobile station 102 and the indoor network controller 132, flowing over the IAN Secure Tunnel between the indoor network controller 132 and the indoor base station 128. The indoor network controller 132 provides the necessary interworking between this signaling and the A-interface signaling to the MSC 116. During the call setup process the MSC 116 sends a BSSAP Assignment-Request message over the A-interface to the indoor network controller 132. A Circuit Identity Code (CIC) identifying a DS0 path between the MSC 116 and the indoor network controller 132 is provided in this message. The DS0 terminates on the media gateway element within the indoor network controller 132. In the broadband case, on reception of the BSSAP Assignment Request message: The indoor network controller 132 translates the Assignment-Request message into a voice over IP (VoIP) call setup request to the IP address associated with the indoor base station 128. The indoor network controller 132 sends a IBSMAP-ACTIVATE-CH message to the indoor base station 128. This message triggers VoIP channel establishment in the indoor base station 128. The indoor base station 128 sends a IAN-ACTIVATE-CH message to the mobile station 102, triggering voice link establishment over the air interface. The mobile station 102 sends acknowledgement (IAN-ACTIVATE-CH-ACK) to the indoor base station 128 and the indoor base station 128 sends acknowledgement (IBSMAP-ACTIVATE-CH-ACK) to the indoor network controller 132. The indoor network controller 132 translates the IBSMAP-ACTIVATE-CH-ACK message from the indoor base station 128 into a BSSAP Assignment Complete message, completing the process.

Referring to the hybrid case of FIG. 23, the indoor network controller 132 translates the Assignment-Request message into a ISUP call setup request to the PSTN phone number associated with the indoor base station 128. The indoor base station 128 answers the call (i.e., goes off-hook) and the indoor network controller 132 translates the ISUP answer signal into a BSSAP Assignment-Complete message. Using ISUP signaling allows this connection to take place in sub-second timeframes. The indoor network controller 132 Application Server subsystem controls the Media Gateway subsystem via MGCP or Megaco (H.248) signaling to provide the switching between the TDM circuit from the MSC and the TDM circuit to the PSTN.

Figure 24:
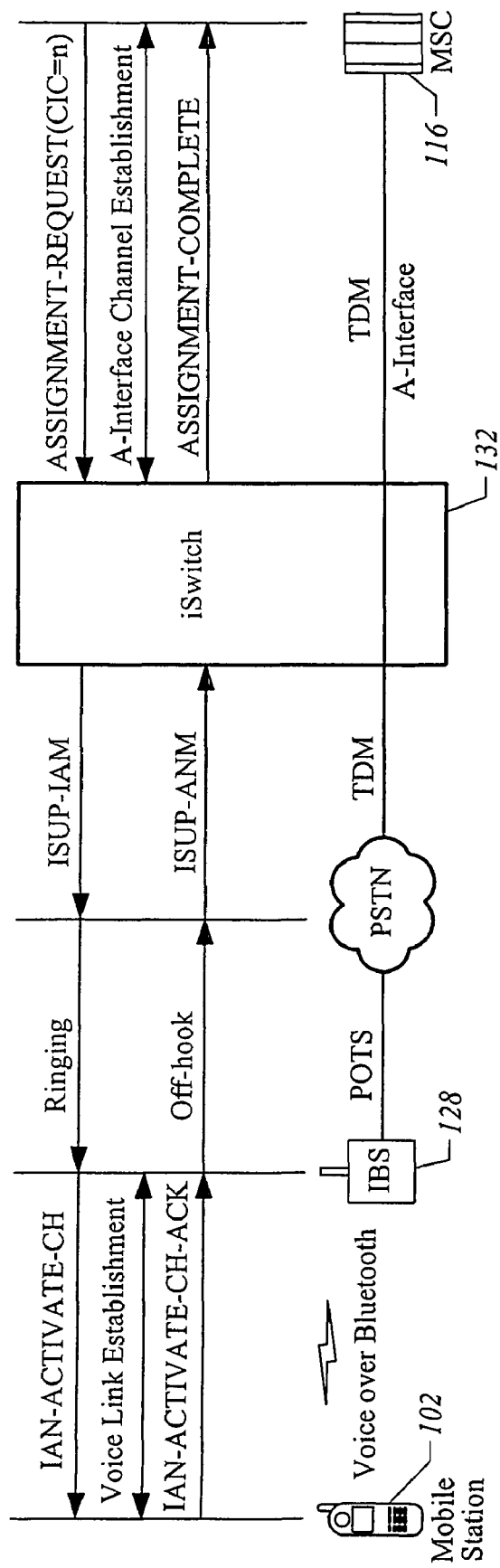
FIG. 24 illustrates exemplary message flows in an optimized IAN voice bearer establishment process associated with the hybrid architecture in accordance with one embodiment of the present invention.

Referring to FIG. 24, in one embodiment a further indoor network controller optimization is supported in a hybrid approach. The voice bearer is in the form of TDM DS0 circuits in the indoor network controller 132 from the MSC 116 and TDM DS0 circuits out of the indoor network controller 132 to the PSTN (or, potentially, a tandem switch in the PLMN), thus the media gateway function is not necessary, as shown in FIG. 24. In this case, the indoor network controller 132 performs only signaling interworking between the A-interface BSSAP protocol and the ISUP protocol. This strategy assumes that the MSC 116 is configured to provide the circuit allocation function (i.e., the assignment of DS0s). This is the normal operating mode in GSM networks (non-remote-MSC-transcoder operation) as opposed to the alternative where the BSC provides this function. Circuits may be allocated in pools at the MSC 116. A pool of circuits will be required for the support of the indoor network controller 132. These bearer circuits will of course not be directly connected to the indoor network controller 132 but rather to a voice switch. The MSC 116 may need to allocate GSM descriptors (full rate, half rate etc.) to this trunk pool. For indoor network controller support, these channels may be described in the same manner as full rate channels; however, this description will bear no relevance to the IAN system. No transcoding and rate adaptation unit (TRAU) resources will be required for the origination or termination of IAN calls.

FIGS. 25-29 illustrate the message flows involved for various call management scenarios via the IAN network.

Figure 25:
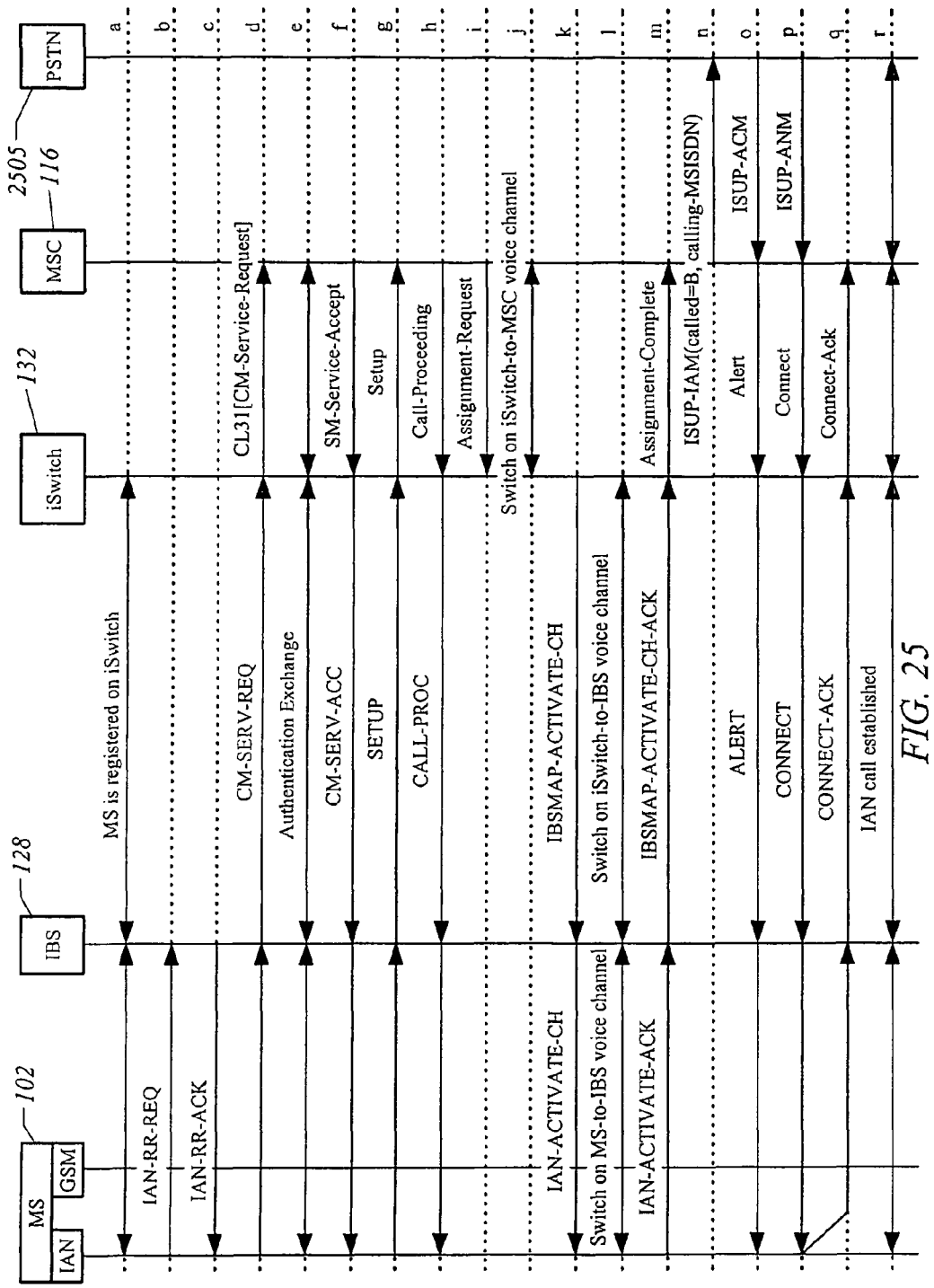
FIG. 25 illustrates exemplary message flows involved in the normal, successful case for a mobile originated call in accordance with one embodiment of the present invention.

FIG. 25 illustrates the message flows involved in the normal, successful case of a mobile originated call that includes registration with the indoor network controller 132, service request to the MSC 116, assignment requests, establishment of a voice channel, and connection. In step a, the mobile station 102 is registered for IAN service on the indoor network controller 132. In step b, the user enters or selects a called party number (B) and presses SEND. In step c, the mobile station requests the establishment of a logical IAN-RR session from the indoor base station 128 using the IAN-RR-REQUEST message. This message includes the resources that are required for the session (i.e., signaling channel and voice channel). The indoor base station 128 verifies that it can provide the necessary resources to handle the request (i.e., air interface resources and indoor network controller connectivity). In step c, the indoor base station 128 signals its acceptance of the IAN-RR session request. In step d, the mobile station 102 sends a CM-SERVICE-REQUEST message to the indoor base station 128. The indoor base station 128 relays the message to the indoor network controller 132 in an IBSAP message. The IBSAP header contains the mobile station identification, which is used to access the mobile station's 102 IAN record in the indoor network controller 132. The indoor network controller 132 constructs a DTAP CM-SERVICE-REQUEST message. The identifier included is the identifier provided by the mobile station. This message is encapsulated inside a BSSMAP COMPLETE-LAYER-3-INFO message and sent to the MSC 116. In an optional step e, the MSC 116 may initiate the standard GSM authentication procedure.

In step f, if ciphering is not necessary, the MSC 116 signals service acceptance via the CM-SERVICE-ACCEPT message. The indoor network controller 132 relays this message to the mobile station 102. The procedure continues at step-g. If ciphering is necessary from the MSC's perspective (not shown in figure), the MSC 116 sends a BSSMAP CIPHER-MODE-COMMAND message to the indoor network controller 132, including the Encryption Information parameter. The indoor network controller 132 relays this to the mobile station 102 in the CIPHER-MODE-COMMAND message. The mobile station 102 responds with a CIPHER-MODE-COMPLETE message, which the indoor network controller 132 encapsulates in a BSSMAP CIPHER-MODE-COMPLETE message to the MSC 116. The mobile station 102 stores the Cipher Mode Setting. Note that this is only needed to enable ciphering if the call is subsequently handed over to GSM; the request for GSM ciphering does not result in the activation of GSM ciphering for the IAN call. If the BSSMAP CIPHER-MODE-COMMAND message includes an identity request (i.e., Cipher Response Mode parameter indicates IMEISV request), then the mobile station 102 includes the mobile station identity in the CIPHERING-MODE-COMPLETE message.

Receipt of either the CM-SERVICE-ACCEPT message or the CIPHER-MODE-COMMAND message indicates to the mobile station 102 that the MM connection is established. In step g, on receipt of a confirmation that the MM connection is established (i.e., receipt of the CM-SERVICE-ACCEPT), the mobile station 102 sends a SETUP message to the indoor network controller 132 and the indoor network controller 132 relays a DTAP SETUP message to the MSC 116. The Bearer Capability IE indicates "speech". In step h, a DTAP CALL-PROCEEDING message is returned to the indoor network controller 132 by the MSC 116. This message is delivered to the mobile station. In step i, a BSSMAP ASSIGNMENT-REQUEST message is sent by the MSC 116 to the indoor network controller 132. A circuit identity code (CIC) for the selected trunk is included in this message. In step j, The indoor network controller 132 establishes a media gateway connection to the endpoint identified by the CIC. In step k, the indoor network controller 132 sends a IBSMAP-ACTIVATE-CH message to the indoor base station 128; this message triggers VoIP channel establishment in the indoor base station 128. The indoor base station 128 relays an IAN-ACTIVATE-CH message to the mobile station 102, triggering voice link establishment between the mobile station 102 and indoor base station 128. In step l, the mobile station-IBS and IBS-INC voice channels are now established and a voice path exists between the indoor network controller 132 and mobile station 102.

In step m, the mobile station returns an IAN-ACTIVATE-CH-ACK message to the indoor base station 128 and the indoor base station 128 returns an IBSMAP-ACTIVATE-CH-ACK message to the indoor network controller 132. The indoor network controller 132 sends a BSSMAP ASSIGNMENT-COMPLETE message to the MSC 116. An end to end bearer path is now established between the MSC 116 and mobile station 102. In step n, the MSC 116 constructs an ISUP IAM using the B subscriber address, and sends it towards the called party's destination exchange PSTN 2505. In step o, the destination exchange responds with an ISUP ACM message. The MSC 116 sends a DTAP ALERTING or PROGRESS message to the indoor network controller 132. The message is propagated to the mobile station 102. ALERTING is used, for example, to direct the mobile station 102 to provide a ringback signal to the calling user; PROGRESS is used, for example, to notify the mobile station that the ringback signal is available inband from the network. Either way, the user hears the ringback tone. In step p, the called party answers and the destination exchange indicates this with an ISUP ACM message. The MSC 116 sends a DTAP CONNECT message to the indoor network controller 132. This in turn is delivered to the mobile station 102. In step q, a chain of acknowledgements are returned completing the two way path at each hop. In step r, the end-to-end two way path is now in place and voice communication begins.

Figure 26:
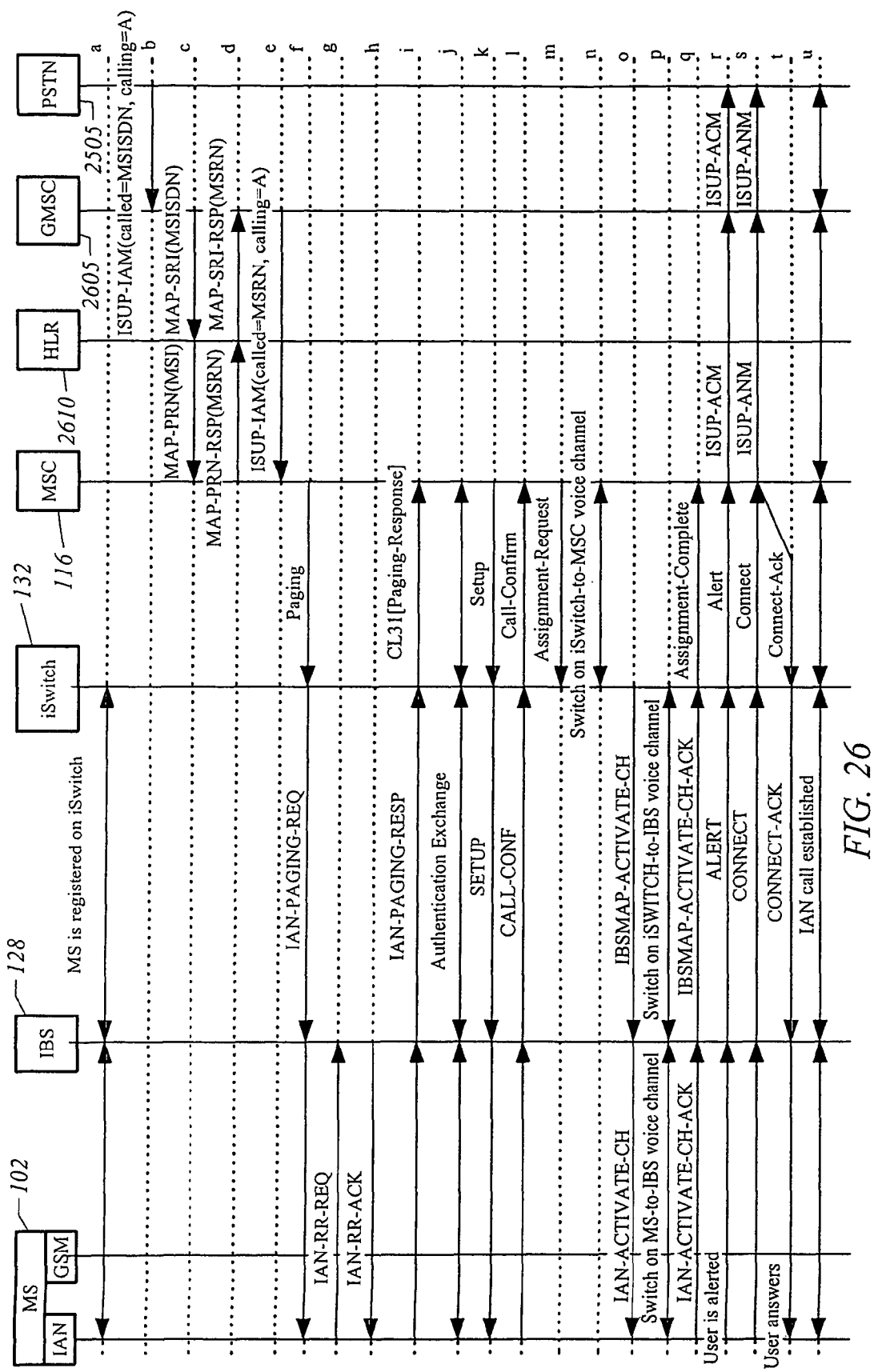
FIG. 26 illustrates exemplary message flows involved in the normal, successful case for a mobile terminated call in accordance with one embodiment of the present invention.

FIG. 26 illustrates the message flows involved in the normal, successful case for a mobile terminated IAN-mode call. Step a shows the mobile station 102 is registered for IAN service on the indoor network controller 132. In step b, the GMSC receives a call from party A intended for the IAN subscriber from PSTN 2505.

In step c, the GMSC 2605 queries the home location register (HLR) 2610 for routing, sending the MAP Send-Routing-Information request message. The HLR 2610 queries the current serving MSC 116 using the MAP Provide-Roaming-Number request message. In step d, the MSC 116 returns a roaming number, MSRN, in the MAP Provide-Roaming-Number response message and the HLR 2610 relays this to the GMSC 2605 in the MAP Send-Routing-Information response message. In step e, the GMSC 2605 relays the call to the MSC 116. In step f, the MSC 116 sends a BSSMAP PAGING message to all BSCs in the location area, including the indoor network controller. The indoor network controller 132 retrieves the user IAN record corresponding to the IMSI in the PAGING message. If no record is found, or a record is found but the user is not in the active state, the indoor network controller 132 ignores the PAGING message. Otherwise, it sends an IAN-PAGING-REQUEST message to the mobile station. In step g, the mobile station requests the establishment of a logical IAN-RR session from the indoor base station 128 using the IAN-RR-REQUEST message. This message includes the resources that are required for the session (i.e., signaling channel and voice channel). The indoor base station 128 verifies that it can provide the necessary resources to handle the request (i.e., air interface resources and indoor network controller connectivity). In step h, the indoor base station 128 signals its acceptance of the IAN-RR session request. In step I, the mobile station sends an IAN-PAGING-RESPONSE message to the indoor network controller. In step j, optionally, the MSC 116 may initiate the standard GSM authentication procedure. If ciphering is necessary from the MSC's 116 perspective (not shown in figure), the MSC 116 sends a BSSMAP CIPHER-MODE-COMMAND message to the indoor network controller 132, including the Encryption Information parameter. The indoor network controller 132 relays this to the mobile station in the CIPHER-MODE-COMMAND message. The mobile station 102 responds with a CIPHER-MODE-COMPLETE message, which the indoor network controller 132 encapsulates in a BSSMAP CIPHER- MODE-COMPLETE message to the MSC 116. The mobile station stores the Cipher Mode Setting. Note that this is only needed to enable ciphering if the call is subsequently handed over to GSM; the request for GSM ciphering does not result in the activation of GSM ciphering for the IAN call. If the BSSMAP CIPHER-MODE-COMMAND message includes an identity request (i.e., Cipher Response Mode parameter indicates IMEISV request), then the mobile station 102 includes the mobile station identity in the CIPHERING-MODE-COMPLETE message.

In step k, the MSC sends a DTAP SETUP message to the indoor network controller. The indoor network controller 132 relays the message to the mobile station 102. In step l, on receipt of the SETUP message, the mobile station sends a CALL-CONFIRMED message to the indoor network controller 132. A DTAP CALL-CONFIRMED message is returned to the MSC 116 by the indoor network controller 132. Steps i-m are the same as those described above for FIG. 24. In step r, the user is alerted. The mobile station 102 sends an ALERTING message to the indoor network controller 132 to indicate that the user is being alerted. The indoor network controller 132 translates this into a DTAP ALERTING message, and the MSC 116 returns an ISUP ACM message to the GMSC which forwards an ACM to the originating exchange. In step s, the user answers. The mobile station 102 sends a CONNECT message to the indoor network controller 132 to indicate that the user has answered. The indoor network controller 132 translates this into a DTAP CONNECT message, and the MSC 116 returns an ISUP ANM message to the GMSC which forwards an ANM to the originating exchange. In step t, a chain of acknowledgements are returned completing the two way path at each hop. In step u, the end-to-end two way path is now in place and voice communication begins.

Figure 27:
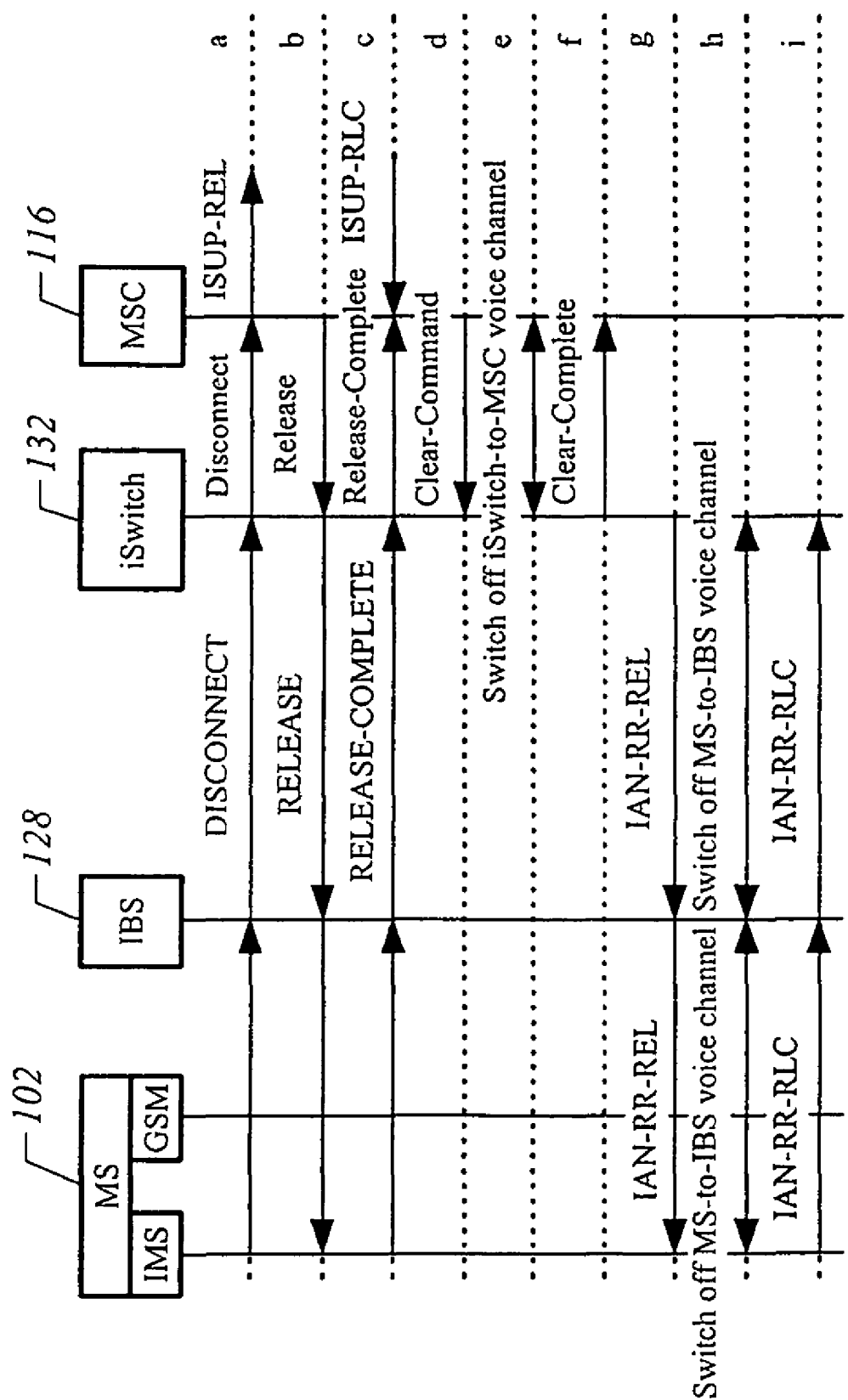
FIG. 27 illustrates exemplary message flows involved in the normal, successful case when a IAN-mode call is released by the IAN mobile station in accordance with one embodiment of the present invention.
Figure 28:
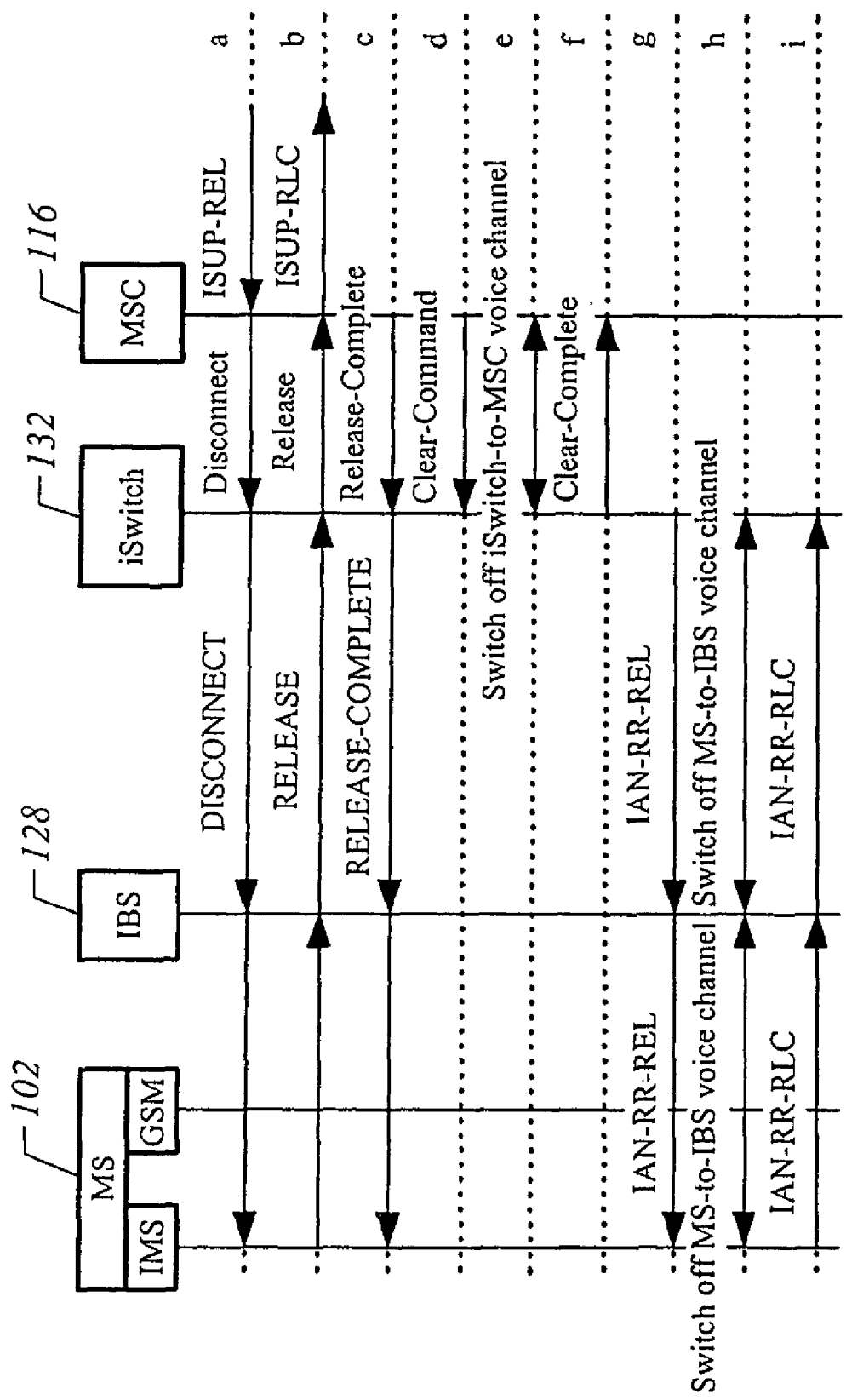
FIG. 28 illustrates exemplary message flows involved in the normal, successful case when a IAN-mode call is released by the other, non-IAN party in the call in accordance with one embodiment of the present invention.

FIGS. 27-28 illustrate examples of call release by an IAN subscriber. FIG. 27 illustrates the message flows involved in the normal, successful case when an IAN-mode call is released by the mobile station 102. In step a, the IAN subscriber ends the call (e.g., by pressing the END button). The mobile station 102 sends a DISCONNECT message to the indoor network controller 132 and the indoor network controller 132 relays a DTAP DISCONNECT message to the MSC 116. The MSC 116 sends an ISUP RELEASE message towards the other party. In step b, the MSC 116 sends a DTAP RELEASE message to the indoor network controller 132. The indoor network controller 132 relays this to the mobile station 102. In step c, the mobile station 102 sends a RELEASE-COMPLETE message to the indoor network controller 132 and the indoor network controller 132 relays a DTAP RELEASE-COMPLETE message to the MSC. At this point, the MSC 116 considers the connection released. The MSC 116 should have received a ISUP RLC message from the other party's exchange. In step d, the MSC 116 sends BSSMAP CLEAR COMMAND to the indoor network controller 132 indicating a request to release the old resources. The SCCP Connection Identifier is used to determine the corresponding call. In step e, the indoor network controller 132 releases the INC-to-MSC circuit associated with the call. In step f, the indoor network controller 132 acknowledges the release in a BSSMAP CLEAR-COMPLETE message to the MSC 116. The SCCP connection associated with the call between the indoor network controller 132 and the MSC 116 is released (signaling not shown). In step g, the indoor network controller 132 sends an IAN-RR-RELEASE message to the indoor base station 128. The indoor base station 128 relays the message to the mobile station 102. In step h, the mobile station 102 and the indoor base station 128 releases the voice channels and other resources allocated for the call.

In step i, the mobile station 102 confirms the call release with the IAN-RR-RELEASE message to the indoor base station 128 and the indoor base station 128 relays this message to the indoor network controller 132.

FIG. 28 illustrates the message flows involved in the normal, successful case when a IAN-mode call is released by the other, non-IAN party in the call. Referring to step a, the other party ends the call (e.g., by hanging up). The MSC 116 receives a ISUP RELEASE message from the other party's exchange. The MSC 116 sends a DTAP DISCONNECT message to the indoor network controller 132 and the indoor network controller 132 relays a DISCONNECT message to the mobile station 102. In step b, the mobile station 102 sends a RELEASE message to the indoor network controller 132. The indoor network controller 132 relays this to the MSC 116 in the DTAP RELEASE message. The MSC 116 sends a ISUP RLC message towards the other party. In step c, the MSC 116 sends a DTAP RELEASE-COMPLETE message to the indoor network controller 132 and the indoor network controller 132 relays a RELEASE-COMPLETE message to the mobile station 102. Steps d-i are similar to those described above in regards to FIG. 27.

Embodiments of the present invention also permit supplementary GSM services to be provided. GSM has standardized a large number of services. Beyond call origination and termination, the following services shall be supported by the IAN system: Service Standard (Stage 3); Short Message Services 04.11; Supplementary Service Control 04.80; Calling Line Identification Presentation (CLIP) 04.81; Calling Line Identification Restriction (CLIR) 04.81; Connected Line Identification Presentation (CoLP) 04.81; Connected Line Identification Restriction (CoLR) 04.81; Call Forwarding Unconditional 04.82; Call Forwarding Busy 04.82; Call Forwarding No Reply 04.82; Call Forwarding Not Reachable 04.82; Call Waiting (CW) 04.83; Call Hold (CH) 04.83; Multi Party (MPTY) 04.84; Closed User Group (CUG) 04.85; Advice of Charge (AoC) 04.86; User User Signaling (UUS) 04.87; Call Barring (CB) 04.88; Explicit Call Transfer (ECT) 04.91; and Name Identification 04.96.

These supplementary services involve procedures that operate end-to-end between the mobile station 102 and the MSC 116. Beyond the basic GSM 04.08 direct transfer application part (DTAP) messages already described for MO and MT calls, the following 04.08 DTAP messages are used for these additional supplementary service purposes: CP-DATA; CP-ACK; CP-ERROR; REGISTER; FACILITY; HOLD; HOLD-ACKNOWLEDGE; HOLD-REJECT; RETRIEVE; RETRIEVE-ACKNOWLEDGE; RETRIEVE-REJECT; RETRIEVE-REJECT; RETRIEVE-REJECT; RETRIEVE-REJECT; USER-INFORMATION; CONGESTION-CONTROL. These DTAP message are relayed between the mobile station 102 and MSC 116 by the indoor base station 128 and indoor network controller 132 in the same manner as in the other call control and mobility management embodiments.

Figure 29:
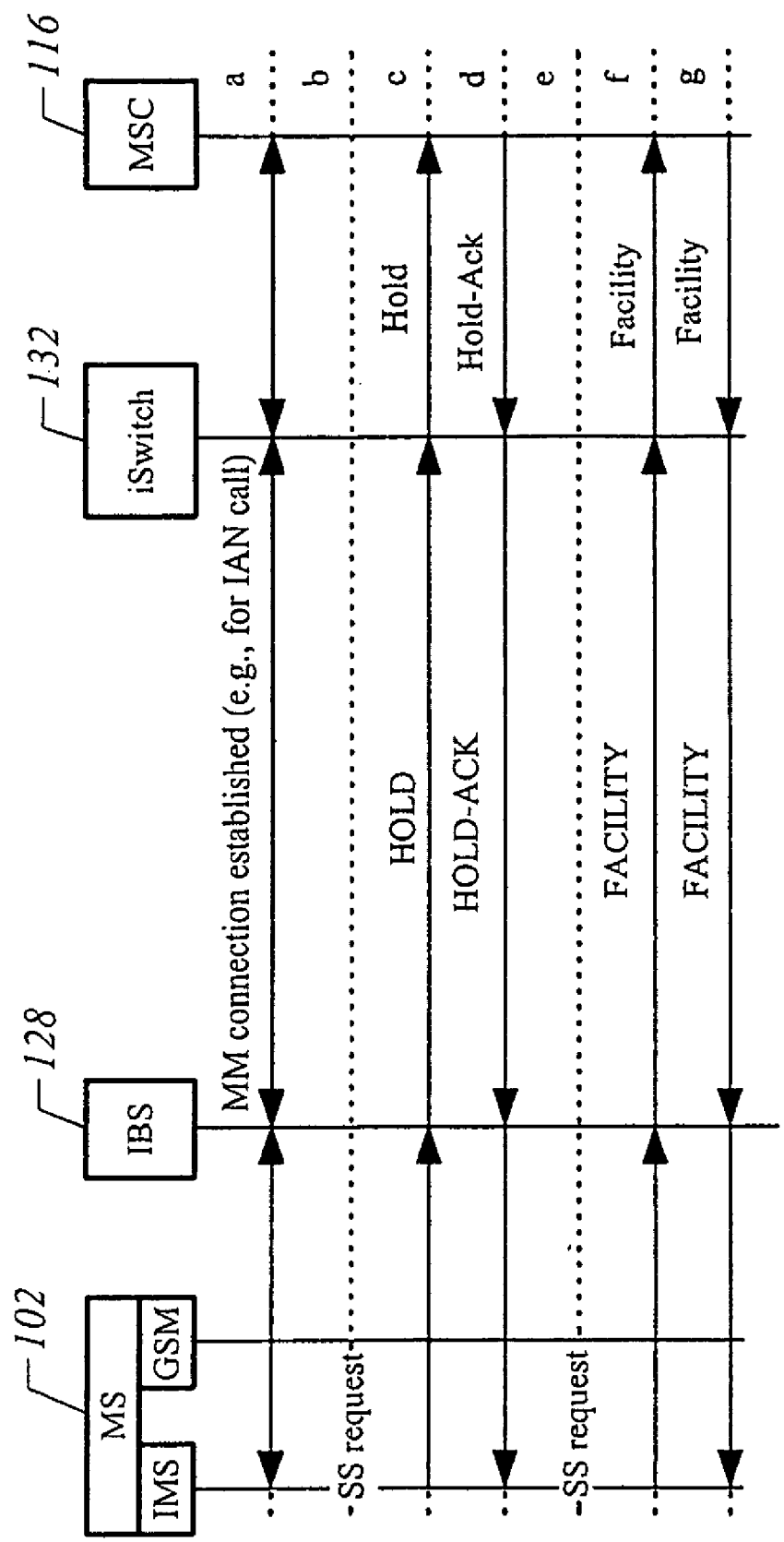
FIG. 29 is an example of the relay of DTAP supplementary service messages in accordance with one embodiment of the present invention.

FIG. 29 illustrates one embodiment of message flows for providing supplementary GSM services. Referring to step a, an MM connection is established between the mobile station 102 and the MSC 116 for an ongoing call. In step b, a user requests a particular supplementary service operation (e.g., to put the call on hold). In step c, the mobile station 102 sends the HOLD message over the K1 interface to the indoor base station 128. The indoor base station 128 relays the HOLD message over the K2 interface to the indoor network controller 132. The indoor network controller 132 relays the DTAP HOLD message to the MSC 116 over the A-interface. In step d, the DTAP HOLD-ACK message is sent from MSC 116 to mobile station 102 in an analogous manner. In step e, later in the call, the user requests another supplementary service operation (e.g., to initiate a MultiParty call). In step f, the mobile station sends the FACILITY message over the K1 interface to the indoor base station 128. The indoor base station 128 relays the FACILITY message over the K2 interface to the indoor network controller 132. The indoor network controller 132 relays the DTAP FACILITY message to the MSC 116 over the A-interface. In step g, the DTAP FACILITY message containing the response is sent from MSC 116 to mobile station 102 in an analogous manner.

It will be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

APPENDIX I

Table Of Acronyms

| | |
|---|---|
| ARFCN | Absolute RF Channel Number |
| ATM | Asynchronous Transfer Mode |
| ATM VC | ATM Virtual Circuit |
| BA | BCCH Allocation |
| BAS | Broadband Access System |
| BB | Broadband |
| BCCH | Broadcast Common Control Channel |
| BRAS | Broadband Remote Access System (e.g., Redback Networks SMS) |
| BSC | Base Station Controller |
| BSS | Base Station Subsystem |
| BSSGP | Base Station System GPRS Protocol |
| BSSMAP | Base Station System Management Application Part |

APPENDIX I-continued

Table Of Acronyms

| | |
|---|---|
| BTS | Base Transceiver Station |
| CDMA | Code Division Multiple Access |
| CGI | Cell Global Identification |
| CIC | Circuit Identity Code |
| CLIP | Calling Line Presentation |
| CM | Connection Management |
| CPE | Customer Premises Equipment |
| CS | Circuit Switched |
| CVSD | Continuous Variable Slope Delta modulation |
| DSL | Digital Subscriber Line |
| DSLAM | DSL Access Multiplexer |
| DTAP | Direct Transfer Application Part |
| ETSI | European Telecommunications Standards Institute |
| FCAPS | Fault-management, Configuration, Accounting, Performance, and Security |
| FCC | US Federal Communications Commission |
| GGSN | Gateway GPRS Support Node |
| GMM/SM | GPRS Mobility Management and Session Management |
| GMSC | Gateway MSC |
| GSM | Global System for Mobile Communication |
| GPRS | General Packet Radio Service |
| GSN | GPRS Support Node |
| GTP | GPRS Tunnelling Protocol |
| HLR | Home Location Register |
| IAN | Indoor Access Network |
| IAN-RR | Indoor Access Network Radio Resource Management |
| IBS | Indoor Base Station. The indoor base station is the fixed part of the customer premise solution. The indoor base station provides indoor unlicensed wireless coverage, and connects to the access network to enable indoor service delivery. An IBS can be a single access point, or a set of access points with a centralized controller |
| IBSAP | IBS Application Protocol |
| IBSMAP | IBS Management Application Protocol |
| IEP | IAN Encapsulation Protocol |
| IETF | Internet Engineering Task Force |
| IMEI | International Mobile Station Equipment Identity |
| IMSI | International Mobile Subscriber Identity |
| INC | Indoor Network Controller |
| INC | Indoor Network Controller (also referred to as the "iSwitch" in this document). The indoor network controller is the component of the IAN network equipment that manages the indoor access network, and provides the physical layer interface(s) to the access network. |
| IP | Internet Protocol |
| ISDN | Integrated Services Digital Network |
| ISP | Internet Service Provider |
| ISP IP | Internet Service Provider's IP Network (i.e., typically provided by broadband service provider) |
| IST | IAN Secure Tunnel |
| ISUP | ISDN User Part |
| ITP | IAN Transfer Protocol |
| K1 | Interface between mobile station and indoor base station |
| K2 | Interface between indoor base station and indoor network controller |
| LA | Location Area |
| LAI | Location Area Identification |
| LLC | Logical Link Control |
| MAC | Medium Access Control |
| MAP | Mobile Application Part |
| MDN | Mobile Directory Number |
| MG | Media Gateway |
| MM | Mobility Management |
| MM | Mobility Management |
| MS | Mobile Station |
| MSC | Mobile Switching Center |
| MSC | Mobile Switching Center |
| MSISDN | Mobile Station International ISDN Number |
| MSRN | Mobile Station Roaming Number |
| MTP1 | Message Transfer Part Layer 1 |
| MTP2 | Message Transfer Part Layer 2 |
| MTP3 | Message Transfer Part Layer 3 |
| NAPT | Network Address and Port Translation |
| NAT | Network Address Translation |
| NS | Network Service |
| PCM | Pulse Code Modulation |
| PCS | Personal Communication Services |
| PCS | Personal Communications Services |

APPENDIX I-continued

Table Of Acronyms

| | |
|---|---|
| PLMN | Public Land Mobile Network |
| POTS | Plain Old Telephone Service |
| PPP | Point-to-Point Protocol |
| PPPoE | PPP over Ethernet protocol |
| PSTN | Public Switched Telephone Network |
| P-TMSI | Packet Temporary Mobile Subscriber Identity |
| QoS | Quality of Service |
| RA | Routing Area |
| RAC | Routing Area Code |
| RAI | Routing Area Identification |
| RAI | Routing Area Identity |
| RF | Radio Frequency |
| RFC | Request for Comment (IETF Standard) |
| RLC | Radio Link Control |
| RR | Radio Resource Management |
| RTCP | Real Time Control Protocol |
| RTCP | Real Time Control Protocol |
| RTP | Real Time Protocol |
| RTP | Real Time Protocol |
| SAP | Service Access Point |
| SCCP | Signaling Connection Control Part |
| SCO | Synchronous Connection-Oriented |
| SDCCH | Standalone Dedicated Control Channel |
| SGSN | Serving GPRS Support Node |
| SMC | Short Message Service Centre |
| SMS | Short Message Service |
| SM-SC | Short Message Service Centre |
| SMS-GMSC | Short Message Service Gateway MSC |
| SMS-IWMSC | Short Message Service Interworking MSC |
| SNDCP | SubNetwork Dependent Convergence Protocol |
| SS | Supplementary Service |
| SSL | Secure Sockets Layer |
| TCAP | Transaction Capabilities Application Part |
| TCP | Transmission Control Protocol |
| TCP | Transmission Control Protocol |
| TLLI | Temporary Logical Link Identity |
| TMSI | Temporary Mobile Subscriber Identity |
| TRAU | Transcoder and Rate Adaptation Unit |
| TTY | Text telephone or teletypewriter |
| UDP | User Datagram Protocol |
| UMTS | Universal Mobile Telecommunication System |
| VLR | Visited Location Register |
| VMSC | Visited MSC |
| WSP IP | Wireless Service Provider's IP Network (i.e., provider of IAN service) |

What is claimed is:

1. A method comprising:
at a network controller of a first unlicensed wireless communication system that communicatively couples a plurality of service regions of the first communication system to a licensed wireless second communication system, establishing a Transmission Control Protocol over IP (TCP/IP) connection between the network controller and a mobile station that is at a particular service region of the first communication system;
at the network controller, determining that an unlicensed session between the network controller and the mobile station in the particular service region of the first communication system needs to be released; and
sending a release message from the network controller to the mobile station at the particular service region over the TCP/IP connection to cause a release of the unlicensed session.

2. The method of claim 1, wherein the licensed wireless communication system comprises a mobile switching center (MSC), wherein the network controller determines that the unlicensed session needs to be released after the network controller receives a clear command from the MSC.

3. The method of claim 2 further comprising sending a clear complete message from the network controller to the MSC.

4. The method of claim 1 further comprising:
receiving, at the network controller, a release confirmation from the mobile station indicating that the mobile station has released voice channels and other resources allocated for the unlicensed session.

5. The method of claim 1, wherein the release of the unlicensed session comprises a release of voice channels that the mobile station had allocated to the unlicensed session.

6. The method of claim 5, wherein the release of the unlicensed session further comprises a release of resources other than the voice channels that the mobile station had allocated to the unlicensed session.

7. In a communication system that includes a licensed wireless communication system for communicatively connecting to a mobile station using a licensed wireless frequency and an unlicensed wireless communication system for communicatively connecting to the mobile station using an unlicensed wireless frequency, a non-transitory computer readable storage medium storing a computer program for execution by an unlicensed wireless network controller, the computer program comprising sets of instructions for:
connecting the network controller to an unlicensed wireless base station, said base station communicatively coupled to the mobile station using the unlicensed wireless frequency;
establishing a Transmission Control Protocol over IP (TCP/IP) connection between the network controller and the mobile station; and
sending a release message from the network controller over the TCP/IP connection through the base station to command the mobile station to release an unlicensed session between the network controller and the mobile station.

8. The non-transitory computer readable storage medium of claim 7, wherein the computer program further comprises sets of instructions for receiving a release confirmation sent from the mobile station indicating that the mobile station has released voice channels and other resources allocated for the unlicensed session.

9. The non-transitory computer readable storage medium of claim 7, wherein the computer program further comprises sets of instructions for receiving a clear command from a mobile switching center (MSC) of the licensed wireless communication system.

10. The non-transitory computer readable storage medium of claim 9, wherein the computer program further comprises sets of instructions for sending a clear complete message to the MSC.

11. The non-transitory computer readable storage medium of claim 7, wherein the release of the unlicensed session comprises a release of voice channels that the mobile station has allocated to the unlicensed session.

12. A method comprising:
at a network controller of a first communication network that communicatively couples a plurality of service regions of the first communication network to a licensed wireless second communication network, establishing a Transmission Control Protocol over IP (TCP/IP) connection between the network controller and a telecommunication device that is at a particular service region of the first communication network;
at the network controller, determining that a set of resources for facilitating a communication session between the telecommunication device in the particular service region of the first communication network and the network controller needs to be released; and sending a message from the network controller to the telecommunication device at the particular service region over the TCP/IP connection to cause a release of the set of resources.

13. The method of claim 12, wherein said sending of the message comprises sending the message over a broadband interface to an access point of the first communication network for wirelessly coupling the telecommunication device at the particular service region to the network controller.

14. The method of claim 12 further comprising receiving, at the network controller, a release complete message from the telecommunication device when the set of resources have been released.

15. The method of claim 12, wherein said sending of the message to release the set of resources comprises sending a message to the telecommunication device for releasing voice channels allocated between the telecommunication device and the network controller.

16. The method of claim 12, wherein said determining that the set of resources for facilitating the communication session needs to be released comprises receiving, at the network controller, a message from the second communication network to initiate a disconnect of the communication session.

17. The method of claim 12 further comprising sending a message to the licensed wireless second communication network to initiate a release of a set of resources allocated for facilitating the communication session between the network controller and the second communication network before sending the message from the network controller to the telecommunication device.

18. The method of claim 12, wherein the set of resources comprises a communication channel used to route communication session data between the telecommunication device at the particular service region and the second communication network through the network controller.

19. The method of claim 12 further comprising receiving, at the network controller, a release complete message from the telecommunication device.

20. The method of claim 12, wherein the first communication network is an unlicensed wireless network, wherein the telecommunication device is a dual mode device comprising a first mode for communicating with the second communication network using licensed wireless frequencies and a second mode for communicating with the first communication network using unlicensed wireless frequencies.

21. The method of claim 12, wherein the telecommunication device comprises a device for communicatively coupling to a Plain Old Telephone Service (POTS) device.

22. A network controller of a first communication network, said network controller comprising:
    a first interface for communicatively coupling to a plurality of service regions of the first communication network;
    a second interface for communicatively coupling to a licensed wireless second communication network; and
    circuits for:
        (i) establishing a Transmission Control Protocol over IP (TCP/IP) connection between the network controller and a telecommunication device that is at a particular service region of the first communication network;
        (ii) determining that a set of resources for facilitating a communication session between the telecommunication device in the particular service region of the first communication network and the network controller needs to be released; and
        (iii) sending a message from the network controller to the telecommunication device at the particular service region over the TCP/IP connection to cause a release of the set of resources.

23. The network controller of claim 22, wherein the first interface communicatively couples the particular service region to the network controller through the Internet using Voice over IP (VoIP).

24. The network controller of claim 22, wherein the second interface communicatively couples the network controller to a mobile switching center (MSC) of the second communication network.

25. The network controller of claim 22, wherein the network controller determines that the set of resources needs to be released based on a message received from the second communication network over the second interface, said message for initiating a disconnect of the communication session.

26. The network controller of claim 22, wherein the network controller determines that the set of resources needs to be released based on a message received from the telecommunication device at the particular service region over the first interface, said message for initiating a disconnect of the communication session.

* * * * *